United States Patent
Gilles et al.

(10) Patent No.: US 6,411,935 B1
(45) Date of Patent: *Jun. 25, 2002

(54) TRANSACTION SETS FOR AUTOMATED ELECTRONIC ORDERING OF TELECOMMUNICATIONS PRODUCTS AND SERVICES

(75) Inventors: Timothy Mark Gilles, Schaumburg, IL (US); Therese A Wierzbicki, Franklin, WI (US); Donna Jean Marie Motto, Bartlett, IL (US)

(73) Assignee: Ameritech Corporation, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/563,319

(22) Filed: May 3, 2000

Related U.S. Application Data

(63) Continuation of application No. 09/055,846, filed on Apr. 6, 1998, now Pat. No. 6,104,999.

(51) Int. Cl.[7] .............................................. G06F 17/00
(52) U.S. Cl. ............................................. 705/1; 705/26
(58) Field of Search ..................... 705/1, 26; 370/392, 370/393, 394; 379/27; 395/500.48, 500.54

(56) References Cited

U.S. PATENT DOCUMENTS

| | | |
|---|---|---|
| 4,232,199 A | 11/1980 | Boatwright et al. |
| 4,782,519 A | 11/1988 | Patel et al. |
| 4,951,196 A | 8/1990 | Jackson |
| 5,012,511 A | 4/1991 | Hanle et al. |
| 5,086,461 A | 2/1992 | Thorn et al. |
| 5,222,125 A | 6/1993 | Creswell et al. |
| 5,283,887 A | 2/1994 | Zachery |
| 5,416,833 A | 5/1995 | Harper et al. |
| 5,491,742 A | 2/1996 | Harper et al. |
| 5,528,667 A | 6/1996 | Butler et al. |
| 5,557,780 A | 9/1996 | Edwards et al. |
| 5,644,619 A | 7/1997 | Farris et al. |
| 5,794,206 A | 8/1998 | Wilkinson |
| 5,794,234 A | 8/1998 | Church et al. |
| 5,870,394 A | 2/1999 | Optea |

Primary Examiner—Creighton Smith
(74) Attorney, Agent, or Firm—Brinks Hofer Gilson & Lione

(57) ABSTRACT

A system and method for electronically exchanging information related to telecommunication services includes separating data representing the information to be exchanged into predefined segments corresponding to telecommunication services, associating a segment identification code with each segment, and grouping each segment identification code with corresponding data. The system and method also include concatenating the segment identification codes and associated data according to a predefined sequence to form an electronic transaction and transmitting the electronic message to a telecommunications wholesaler or reseller. Preferably, the information is exchanged over a TCP/IP connection in an interactive, transaction-based exchange.

12 Claims, 7 Drawing Sheets

TRANSACTION SETS FOR AUTOMATED ELECTRONIC ORDERING OF TELECOMMUNICATIONS PRODUCTS AND SERVICES

CROSS-REFERENCE TO RELATED APPLICATIONS

This application is a continuation of application Ser. No. 09/055,846, filed Apr. 6, 1998, now U.S. Pat. No. 6,104,999.

This application is related to commonly owned applications Ser. No. 09/056,023 titled "Automated Electronic Telecommunications Order Translation And Processing" and application Ser. No. 09/056,001 titled "Interactive Electronic Ordering For Telecommunication Products And Services" all filed the same day, Apr. 6, 1998, the disclosures of which are hereby incorporated by reference in their entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present invention relates to electronic ordering of telecommunications services and products.

BACKGROUND ART

Businesses of all sizes rely on computers and communication systems now more than ever before. However, the widespread use of computers has not brought about the paperless office anticipated by the visionaries of the 1970s. Electronic Data Interchange (EDI) has been developed to provide a standard format for exchanging basic business data among firms that regularly conduct business with one another. EDI may be used to replace a wide variety of common business forms including purchase orders, invoices, shipping and packing slips, and numerous others, to eliminate costs associated with handling paper documents resulting in more efficient utilization of resources and increased accuracy.

The structure and content of electronic documents are defined by transaction sets. Similar to their physical counterparts, standard transaction sets include line items, referred to as data segments, and specific items, referred to as data elements. For example, data elements in an invoice might include quantity, product identification, unit price, and extended price. Hundreds of approved (standardized) transaction sets have been published by standards committees for various industries.

Telecommunications services and products are currently ordered from wholesalers primarily in a manual fashion, either by voice contact or exchange of paper forms. Where electronic methods are in use, they are generally batch-oriented, form-based file exchange processes, or utilize proprietary interfaces which may include Internet browser technology, for example. While some telecommunication companies have implemented EDI ordering systems, these systems typically require manual intervention to enter received EDI orders into the company's internal order system. Although EDI has been proposed for ordering of telecommunication products and services for several years, there has not yet been a significant implementation of EDI for this purpose.

Telephone Local Exchange Carriers (LEC) are now required to provide some type of system and method for Telecommunications Carriers to electronically place orders with an LEC for wholesale bundled exchange products and/or services in addition to unbundled elements of the telecommunications network. The various LECs have developed differing solutions such as providing direct access to their internal ordering systems, creating Internet browser forms for order entry, or creating proprietary application-to-application interface protocols.

The various objects, advantages, and features of the present invention will be readily apparent from the following detailed description of the best mode for carrying out the invention when taken in connection with the accompanying drawings.

DETAILED DESCRIPTION OF PREFERRED EMBODIMENTS

Automated electronic processing of orders for telecommunications products and services according to the present invention minimizes or eliminates human intervention to reduce or eliminate costs associated with handling paper documents. The present invention provides a real-time, interactive interface for telecommunications resellers to increase accuracy and reduce turn-around time. The development of transaction sets particularly suited for telecommunications services and products provides a standard method for electronic ordering where external access to dynamic data is required. Automated translation to and from unique or proprietary interfaces used by individual resellers to standard transaction sets further reduces manual intervention while providing increased flexibility for telecommunication product/services resellers.

Figure 1:
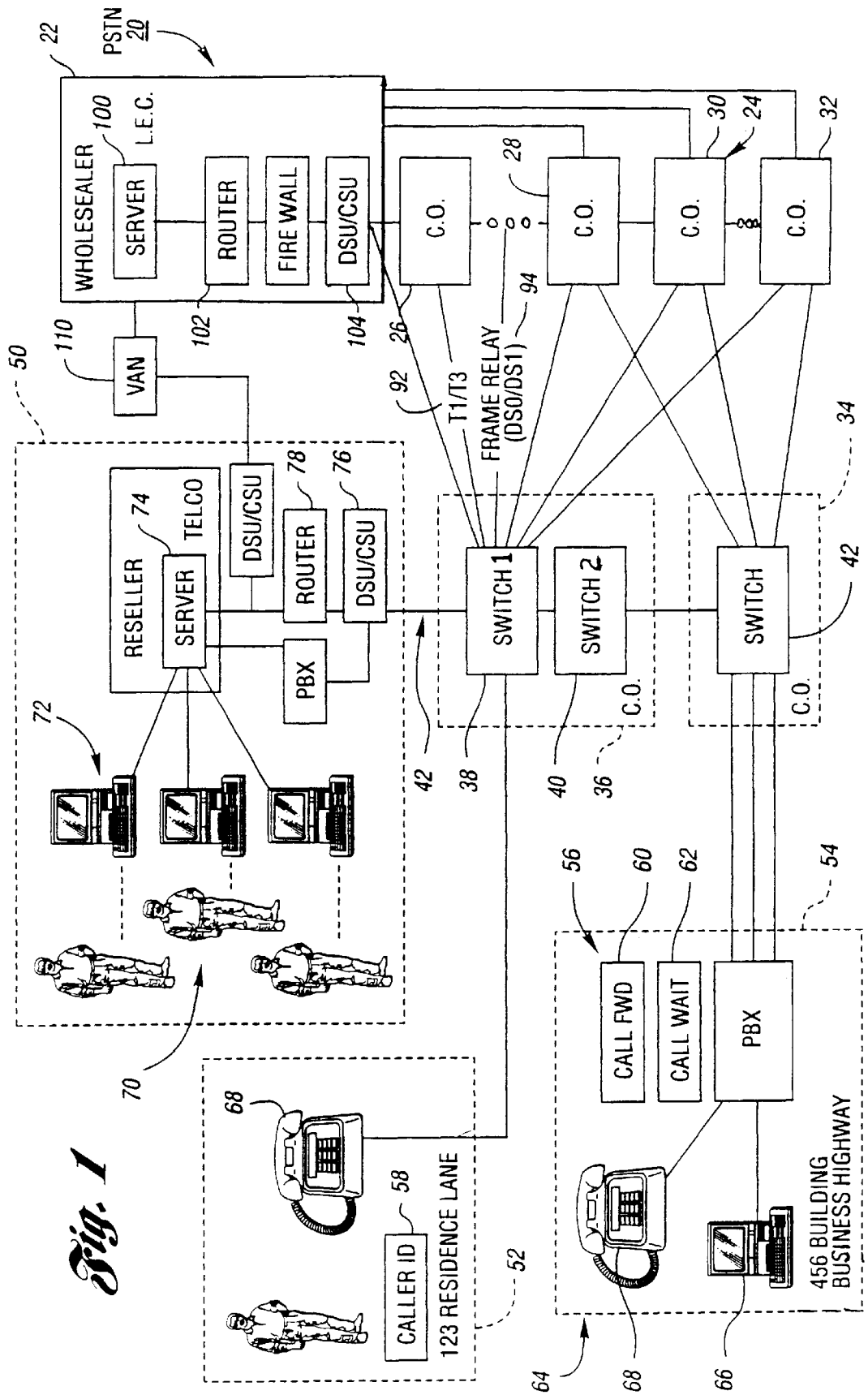
FIG. 1 is a diagram illustrating a Public Switched Telephone Network (PSTN) for application of automated electronic telecommunications product/service ordering according to the present invention.

FIG. 1 is a diagram illustrating a Public Switched Telephone Network (PSTN) for application of automated electronic telecommunications product/service ordering according to the present invention. The PSTN, indicated generally by reference numeral 20, includes a number of Local Exchange Carriers (LEC), such as LEC 22, which function as wholesalers for telecommunication products and services. Each LEC 22 owns and/or manages one or more Central Offices (CO), indicated generally by reference numeral 24, such as Central Offices 26–36. As is known, each CO 24 typically serves a particular geographic area and includes various hardware and software to deliver telecommunication services. Such hardware includes one or more switches 38, 40 to provide a communication path for a telephone call. The various COs 24 are typically connected using one or more circuits 42 which are classified based on bandwidth capability, signal protocol, or the like, as also well known in the art.

A telecommunications reseller 50 interfaces with end users or customers 52, 54 to provide various retail telecommunications products and services 56 such as caller ID 58, remote access call forwarding 60, and call waiting 62, for example. Reseller 50 provides the customer service functions including invoicing, collections, service inquiries, new telephone numbers, directory listings, and the like. Each customer 52, 54 may have one or more telecommunications devices 64 such as a computer 66 or telephone 68, sometimes referred to as premises equipment (PE). Customers typically include both residential customers, such as customer 52, and business or commercial customers, such as customer 54. Business customer 54 may have a Private Branch exchange (PBX) which interfaces with a switch such as switch 42 in the local CO 34. The PBX provides connections between and among internal PE in addition to coordinating access to external lines (circuits).

To provide prompt and efficient customer support, reseller 50 preferably utilizes automated electronic ordering according to the present invention to provide telecommunications products/services 64 to customers 52, 54. Reseller 50 employs customer service agents 70 which process requests from customers 52, 54 relative to telecommunications products and services. Customer service agents 70 preferably utilize one or more computers 72 to enter information received from customers 52, 54 which is then communicated to a message server 74 which preforms two primary functions. Message server 74 manages communications between itself and computers (clients) 72 while also providing a single access point for communication with telecommunications wholesaler 22. Message server 74 communicates with a router 76 which preferably permits only messages conforming to the Transmission Control Protocol/Internet Protocol (TCP/IP) between reseller 50 and wholesaler 22. Router 76 communicates with DSU/CSU (Digital Service Unit/Customer Service Unit) 78 to facilitate digital communications. Depending upon the particular bandwidth requirement of reseller 50, i.e., the quantity, complexity, and frequency of transactions between reseller 50 and wholesaler 22, a particular class of circuit 42 is selected and installed. This may include DS0 (Digital Service Level 0–56 Kbps)/DS1 (Digital Service Level 1–1.5 Mbps) 90, T1 92, frame relay 94, or the like.

Wholesaler 22 includes similar equipment such as a message server 100, router 102, and DSU/CSU 104. Messaging between reseller 50 and wholesaler 22 is preferably accomplished using a dedicated connection which may be facilitated by one or more of the circuits described above. In an alternative embodiment, reseller 50 may communicate with wholesaler 22 via a Value Added Network (VAN) provider 110 operated by a third party. Preferably, messaging between server 100 of wholesaler 22 and server 74 of reseller 50 is performed using a simple character protocol, such as the Enterprise Access Protocol (EAP). In a preferred embodiment, EAP commands are sent from the server 74 of reseller 50 to server 100 of wholesaler 22 over a TCP/IP socket connection. The EAP commands are used to establish an application session to exchange electronic information between reseller 50 and wholesaler 22. Each message preferably includes a sender's reference (SNRF) which is generated by reseller 50 and used for routing purposes. This facilitates the distribution of messages by server 74 to customer service agents 70 via computers 72. In a preferred embodiment, the SNRF contains a unique identification code in the first six characters corresponding to a particular reseller 50. The last six characters of the SNRF are reserved for assignment by reseller 50 to uniquely identify a particular customer service agent 70 or computer 72. This enables reseller 50 to appropriately route messages received from wholesaler 22 through message server 74.

Preferably, each message server 74 which interacts with message server 100 of wholesaler 22 has a unique identification and password. To improve configuration flexibility, in one embodiment of the present invention passwords are required only at the start of a particular session and are not required for each transaction set or electronic document exchanged. Also preferably, a packet filter firewall is used which permits only packets destined for a correctly defined static IP address and service port to further improve security. The connection established between reseller 50 and wholesaler 22 may be used to transfer files in addition to the defined transaction sets as described in greater detail below.

Functional descriptions for representative transaction sets applicable to automated electronic telecommunications ordering according to the present invention are set forth in Table 1 below. Detailed specifications for the transaction sets along with examples of use for representative transactions are provided in the Section II preceding the claims.

TABLE 1

Telecommunications Transaction Sets

| Transaction Set | Description |
|---|---|
| 836 | Reseller notification (Contract Award) |
| 850 | Purchase order |
| 855 | Purchaser order acknowledgment |
| 860 | Buyer initiated purchaser order change request |
| 864 | Text message |
| 865 | Purchase order change acknowledgment |
| 870 | Reseller order status |
| 997 | Functional acknowledgment |

Preferably, all transaction sets are approved by a recognized standards organization such as the American National Standards Institute (ANSI), or the International Standards Organization (ISO). In one preferred embodiment of the present invention the transaction sets conform to the ANSI Accredited Standards Committee (ASC) X12, the committee that develops and maintains generic requirements for EDI in the United States.

The electronic reseller notification transaction set is used to convey advance notice of a change of local service provider, confirmation when that change is completed, and notice if the planned change is cancelled. This transaction set is referred to as a contract award by ANSI.

The purchase order transaction set (850) may be used to provide for customary and established business and industry practice relative to the placement of purchase orders for telecommunications goods and services. For example, the reseller would use this transaction set to request telecommunications services from the wholesaler. Preferably, the purchase order is used to request any of the following types of services, each based on unique transaction identifiers contained within the transaction set: telephone number inquiries, reservations, reservation cancellations, and reservation confirmations; due date inquiries, reservations, reservation cancellations, and reservation confirmations; customer service record requests; and service requests.

The purchase order acknowledgment transaction set (855) is preferably used as an acknowledgment from the wholesaler to the reseller. This transaction set provides scheduling information, telephone and circuit number information, and the like, in response to receipt of a purchase order transaction (850) for one of the transactions identified above. Purchase order changes are preferably communicated using the Purchase Order Change Request—Buyer Initiated transaction set (860). For example, the reseller would use this transaction set to request a change to a previously submitted purchase order.

The Text Message transaction set (864) is intended to provide electronic communication for people, not necessarily for computer processing as with the other transaction sets. The use of this transaction set requires that the sender have certain detailed information about the recipient in some human-readable form. The recipient's network dictates the available capabilities for delivery of the information contained within the transaction. It is the responsibility of the sender to obtain this information and include it in the transmission. This transaction set may be used to respond to a customer service record request to provide information about an existing customer of the wholesaler to the reseller.

The Purchase Order Change Acknowledgment transaction set (865) is used to convey acceptance or rejection of changes to a previously submitted purchase order by the wholesaler or to notify the reseller of changes initiated by the wholesaler to a previously submitted purchase order by the wholesaler. This transaction is also used to notchy the wholesaler that an order has been completed.

The reseller order status transaction set may be used to convey jeopardies which occur on an order after the 855 transaction set has been communicated. This transaction set may be used to provide status on individual line items of a purchase order or on the entire order.

The Functional Acknowledgment transaction set (997) is used to define the control structures for a set of acknowledgments to indicate the results of the syntactical analysis of the electronically encoded documents using other transaction sets. This transaction set includes data segments used to identify which electronic document (transaction set) contains an error and where the error occurred within the document.

Figure 2:
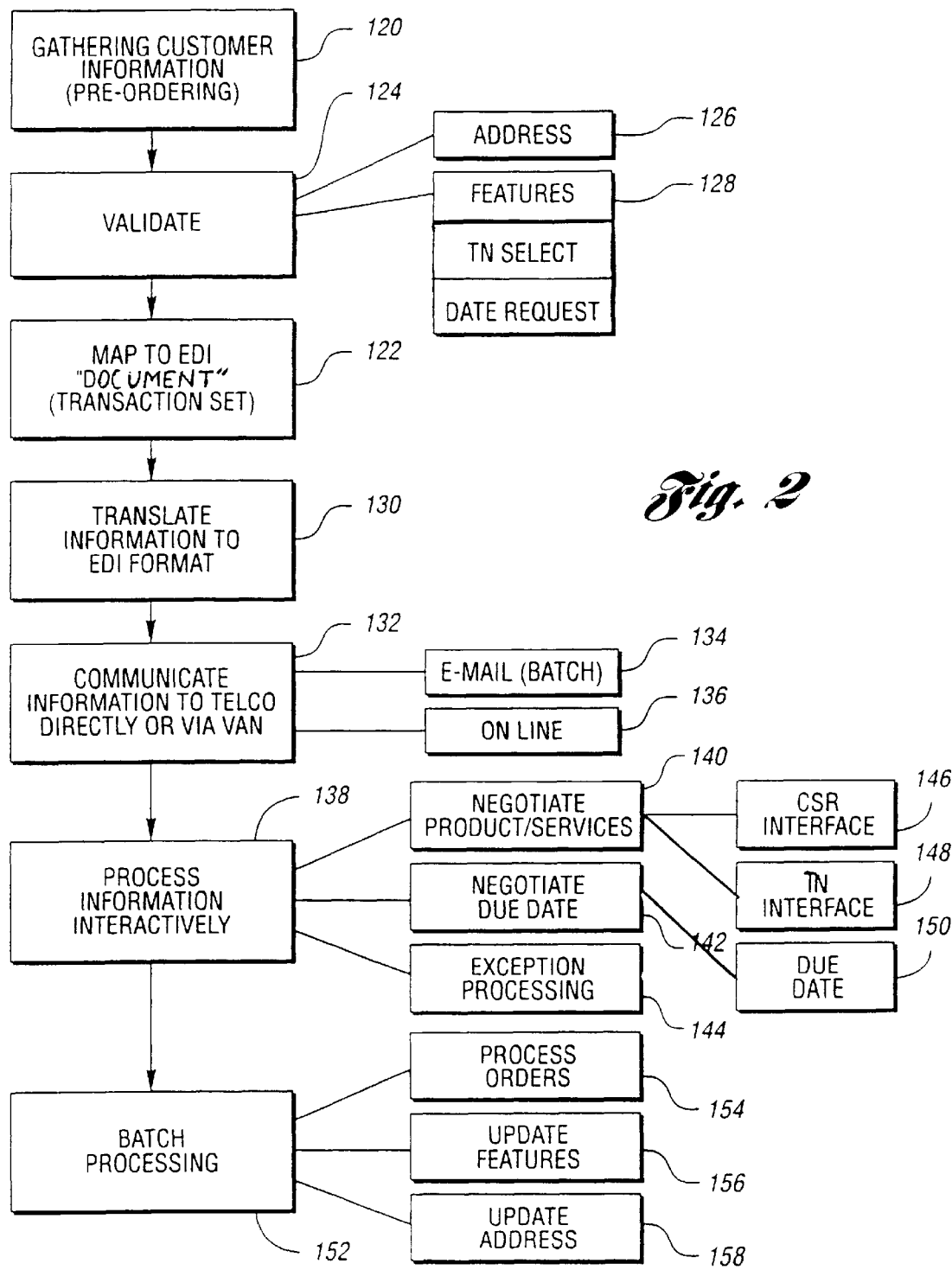
FIG. 2 is a flow chart illustrating one embodiment of a process for automated electronic ordering of telecommunication products and/or services according to the present invention.

FIG. 2 is a flow chart illustrating one embodiment of a process for automated electronic ordering of telecommunication products and/or services according to the present invention. As will be appreciated by one of ordinary skill in the art, the various steps, tasks, or functions illustrated are not necessarily sequential in nature. As such, the present invention is generally independent of the particular sequence or order in which the tasks or steps are completed. Various steps, tasks, or functions may be completed simultaneously, virtually simultaneously, or may be separated by minutes, hours, or days without departing from the spirit or scope of the present invention. Preferably, the present invention performs automatic electronic ordering of telecommunications using computer-to-computer communications exclusively, meaning that no human intervention is required to reduce or eliminate keying errors, mishandled or lost forms, and the like. However, the present invention incorporates exception processing which may include some level of human intervention to process unique or as yet undefined transactions.

The functions, steps, or tasks illustrated in the figures are preferably performed by a programmed microprocessor executing instructions stored in or on a computer readable storage medium. One of ordinary skill in this art will recognize that the functions, steps, or tasks are independent of the particular type of instruction set, storage medium, microprocessor, or processing strategy and may be performed by software, hardware, integrated circuits, firmware, microcode, and the like, operating alone or in combination. Likewise, processing strategies may include multi-processing, multi-tasking, parallel processing, and the like without departing from the spirit or scope of the present invention. Computer readable storage media may include various types of volatile and non-volatile storage media including but not limited to random access memory (RAM), read-only memory (ROM), programmable read-only memory (PROM), electrically programmable read-only memory (EPROM), electrically erasable read-only memory (EEPROM), flash memory, magnetic tape or disk, optical media, and the like.

Block 120 of FIG. 2 represents gathering customer information during a pre-ordering process. This is typically performed by the reseller in response to a customer inquiry or request for a service. However, this step may also be initiated by the reseller or wholesaler under particular circumstances, such as in the event of termination of service for non-payment, area code changes, feature availability changes, and the like. For a representative transaction, the reseller gathers appropriate information depending upon the particular telecommunications service or product. The resellers use internal computing systems, such as computers 72, and/or databases to collect the appropriate items which constitute a particular transaction set for an electronic exchange of information. However, the information necessary for a particular transaction set may be scattered about various fields and/or databases depending upon the particular reseller's implementation. As such, the information or data is collected or mapped to a particular transaction set to form an electronic "document" as indicated by reference numeral 122.

The gathered information is validated as represented by block 124 using an address validation file 126 (illustrated and described with reference to FIG. 4) and a feature availability file 128 (illustrated and described with reference to FIGS. 5–6).

The information is translated into a standard EDI format as represented by block 130. Likewise, block 130 represents the reciprocal function of translating an EDI transaction received by the reseller back to the reseller's internal format. The translation function 130 allows the reseller to format the data conveniently for the customer service representatives rather than being forced to conform to the pre-defined EDI format. Automatic translation according to the present invention reduces or eliminates human intervention to transfer the data contained in an EDI transaction into the reseller's internal forms and format. However, the standardized EDI format allows the reseller and/or wholesaler to conduct business with other wholesalers and resellers who conform to the standard, respectively.

Once validated, the information is communicated from the reseller to the wholesaler (or vice versa) as represented by block 132. This may be accomplished using a dedicated or direct connection between the reseller and the wholesaler, or by using a VAN as described above. While this communication may be completed in a batch mode 134, it is preferably communicated using a TCP/IP socket connection during an interactive, substantially real-time session, i.e., while the reseller is "on-line" as represented by reference numeral 136. While batch processing may be used to take advantage of lower volume traffic during off-peak times, it delays processing and reduces efficiency, especially if any errors are present in the electronic data, regardless of their source.

The information communicated to the wholesaler is processed by the message server, preferably interactively as indicated by block 138. This processing may include negotiating products and services 140, negotiating due dates 142, and exception processing 134. Preferably, the processing by the wholesaler is facilitated by a customer service record interface 146, a telephone number interface 148, and a due date interface 150. These interfaces are illustrated and described in detail with reference to FIGS. 7–9, respectively.

Batch processing, represented by block 152, may include processing orders 154, in addition to transferring files to update feature availability, represented by block 156, and to update the address validation file, represented by block 158. In one preferred embodiment of the present invention, a commercial electronic file transfer program is used to transfer the address and feature availability files such as the Connect Direct software which is commercially available.

Figure 3:
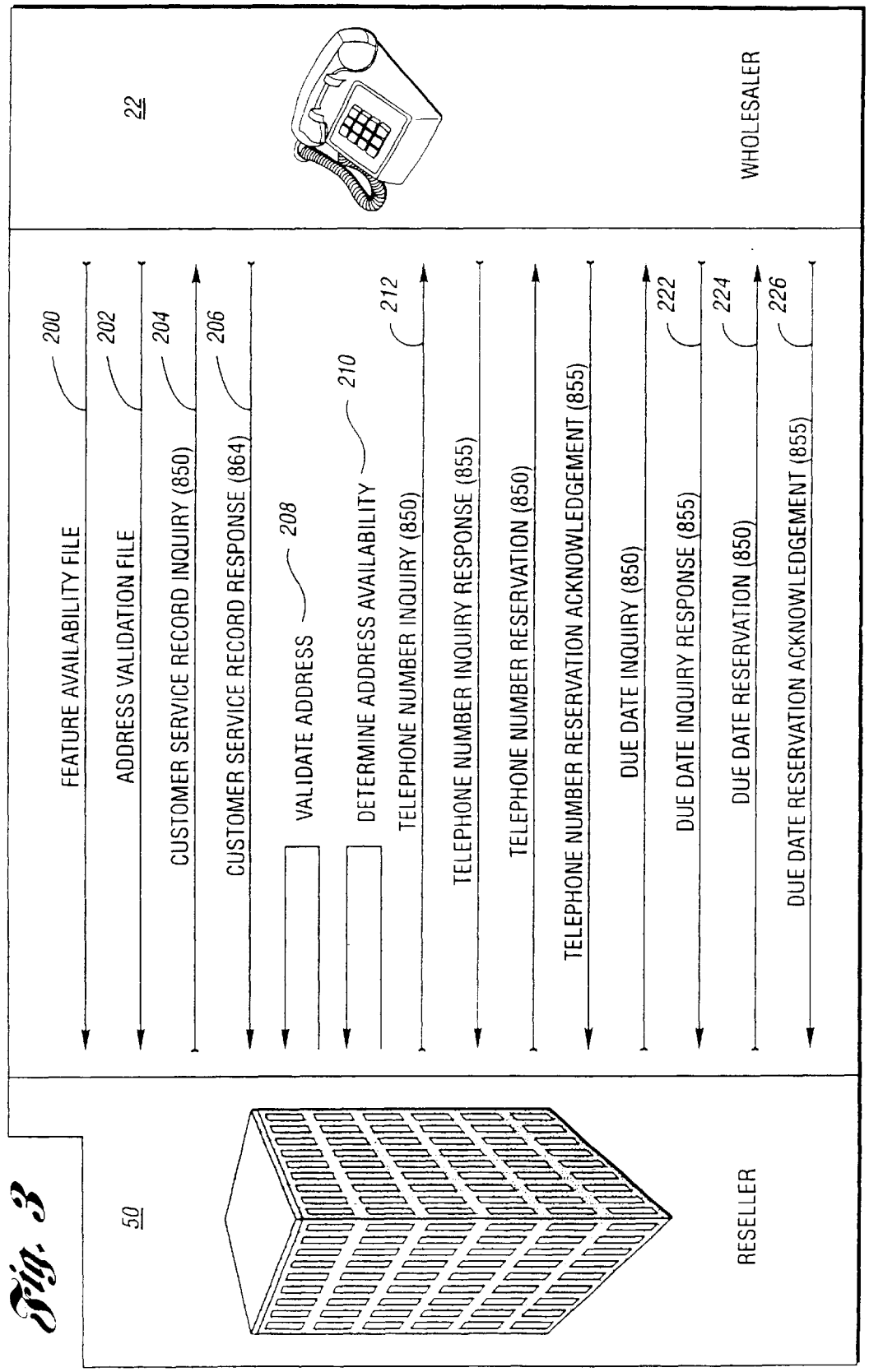
FIG. 3 is a transaction flow diagram illustrating a pre-ordering exchange between a telecommunications provider and a telecommunications reseller as implemented in one embodiment of the present invention.

FIG. 3 is a transaction flow diagram illustrating a pre-ordering exchange between a telecommunications provider and a telecommunications reseller as implemented in one embodiment of the present invention. Once a relationship has been established between reseller 50 and wholesaler 22, reseller 50 receives regular transmissions of a feature availability file 200 and address validation file 202 for subsequent use in processing customer orders. When reseller 50 receives an order or inquiry from a customer, reseller 50 initiates an electronic request for customer service record information and transmits the request to wholesaler 22 using either the purchaser order transaction set (850) as indicated by reference numeral 204. If the customer service record request has appropriate authorization, the corresponding customer service record is forwarded to the reseller using the customer service record response transaction set (864) as indicated by reference numeral 206.

Reseller 50 uses the feature availability file and address validation file which was previously transmitted to verify the availability of the requested feature for a particular address and to authenticate or validate the address as indicated at reference numerals 208 and 210. As part of the same transaction, or as part of a separate transaction, a telephone number inquiry may be initiated by reseller 50 and sent to wholesaler 22 using purchase order transaction set (850) with a transaction code of T10, for example, as indicated by reference numeral 212. Wholesaler 22 generates a response using purchase order acknowledgment transaction set (855) as indicated by reference numeral 214. A telephone number reservation may then be initiated by reseller 50 and transmitted to wholesaler 22 using purchase order transaction set (850) with a transaction code or type of T20 as indicated by reference numeral (216). In response, wholesaler 22 confirms the telephone number reservation to reseller 50 using purchase order acknowledgment transaction set (855) as indicated by reference numeral 218.

A due date inquiry, initiated by reseller 50 is sent to wholesaler 22 using purchase order transaction set (850) with a transaction type of R10 as indicated by reference numeral 220. Wholesaler 22 responds using purchase order acknowledgment transaction set (855) as indicated by reference numeral 222. This is followed by a due date reservation initiated by reseller 50 and forwarded to wholesaler 22 using purchase order transaction set (850) indicating a transaction type of R20 as indicated by reference numeral 224. The purchase order acknowledgment transaction set (855) is again used to confirm the due date reservation as indicated by reference numeral 226.

Various other transaction pairs utilizing the purchase order transaction set (850) and purchase order acknowledgment transaction set (855) may also be exchanged. For example, a telephone number reservation cancellation may be initiated by reseller 50 and then confirmed by wholesaler 22. Likewise, a telephone number reservation inquiry may be initiated by reseller 50 with an appropriate transaction code or type, such as T40 and confirmed by wholesaler 22 when appropriate. In a similar fashion, due date reservation cancellations and confirmations may be initiated and confirmed by reseller 50 and wholesaler 22, respectively.

Figure 4:
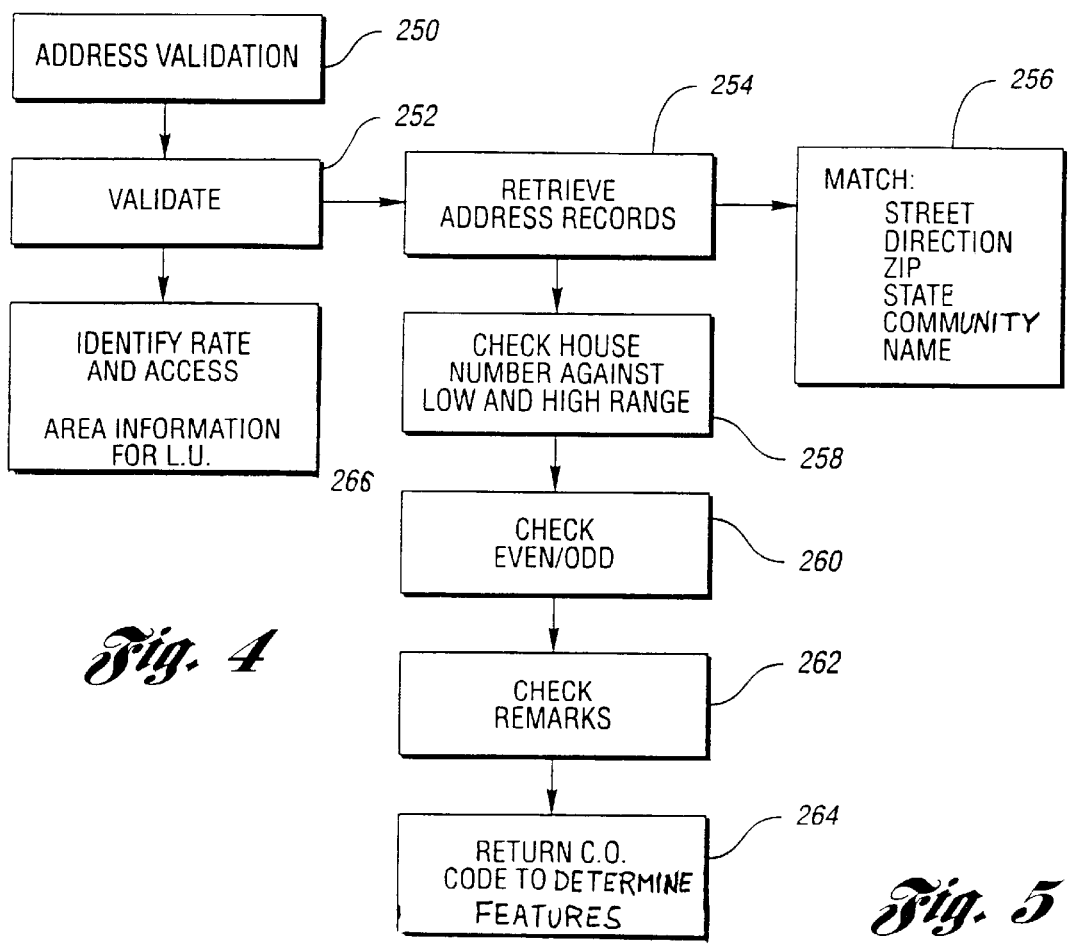
FIG. 4 is a block diagram illustrating one embodiment of an address validation interface for automated electronic telecommunications ordering according to the present invention.

FIG. 4 is a block diagram illustrating one embodiment of an address validation interface for automated electronic telecommunications ordering according to the present invention. Address validation interface 250 provides regular address validation information updates from the wholesaler to the reseller. Preferably, the reseller is provided with a text file having fixed length fields for a particular geographic area, such as one address file for each state. This allows the reseller to determine which central office (CO) services a particular customer's address or Living Unit (LU). This information is validated as represented by block 252.

Using the address information provided by the customer and transmitted by the reseller, each set of address records is retrieved from the address file as represented by block 254. Each set of records is selected by matching one or more of the data fields including street, direction, zip code, state, and community name, as represented by block 256. The house or building number is compared to determine whether it is within a valid range for the particular street and direction as represented by block 258. Subsequently, an odd/even check may be performed where appropriate as represented by block 260. Any remarks which may provide additional information to be submitted on the service order are represented by block 262. The system determines a unique central office code corresponding to the address information to identify the particular central office which services that address as represented by block 264. This information is then used to identify a rate band and access area information for the customer's address as represented by block 266.

Figure 5:
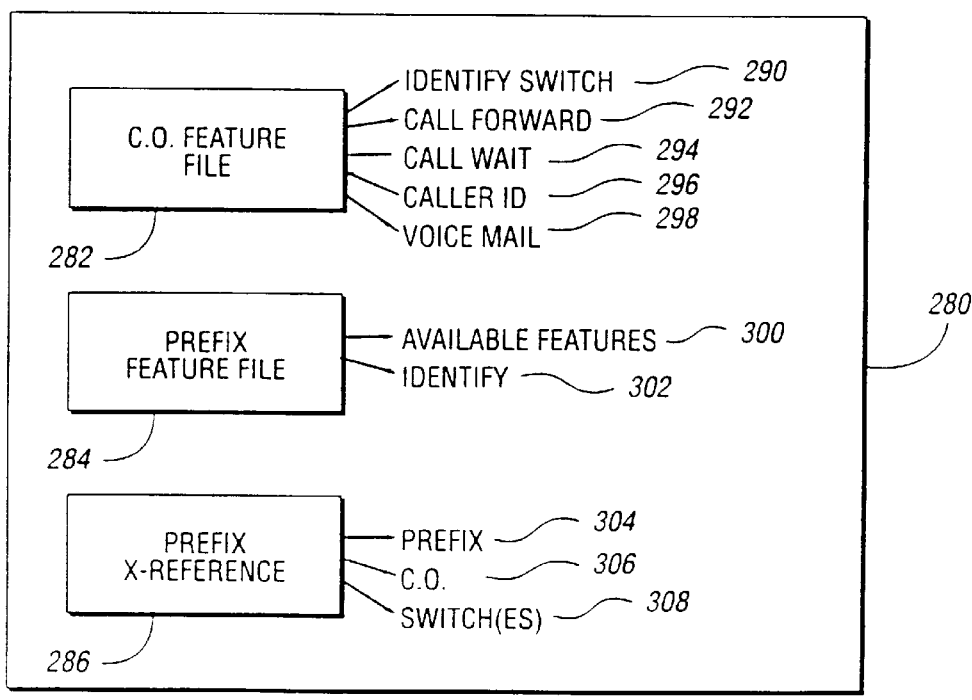
FIG. 5 is a block diagram illustrating one embodiment of a feature availability file for automated electronic telecommunications ordering according to the present invention.

FIG. 5 is a block diagram illustrating one embodiment of a feature availability file for automated electronic telecommunications ordering according to the present invention. In a preferred embodiment, feature availability interface 280 provides regular feature availability information updates to resellers from the wholesalers as described above. In this embodiment, the reseller is provided with three types of text files having fixed length fields including a central office feature file 282, a prefix feature file 284, and a prefix cross-reference file 286. Preferably, each geographic region, such as a state, has associated feature files 282, 284, and 286.

Central office feature file 282 contains feature information for each central office in a particular area code and one or more exchanges. Where a central office includes more than one switch, central office feature file 282 contains information about which switch provides each feature as represented by reference numeral 290. Feature file 282 may include information relative to features such as remote access call forwarding 292, call waiting 294, caller ID 296 and voice-mail 298. Preferably, data elements within feature file 282 include the Numbering Plan Area (NPA), commonly known as the area code, the exchange which serves the customer, the central office code, the date on which the most recent changes became effective, the feature Universal Service Ordering Code (USOC), the switch identification, a feature exception indicator, an additional exception indicator, and a call-waiting exception indicator.

Prefix feature file 284 preferably contains feature information 300 for each prefix within the NPA, while also identifying the central office that the prefix belongs to as represented by reference numeral 302. In one preferred embodiment, prefix file 284 includes data fields for the NPA, exchange, central office ID, prefix, the date on which the most recent changes became effective, and indicators for: exception call-waiting, remote access call forwarding, feature exception, additional exceptions, and the USOC.

Prefix cross-reference file 286 preferably provides a cross-reference between the prefix 304 and central office 306 containing the prefix in addition to the switches 308 which service the prefix. The information in this file is not required for standard processing of a customer order, unless specific prefixes are requested.

Figure 6:
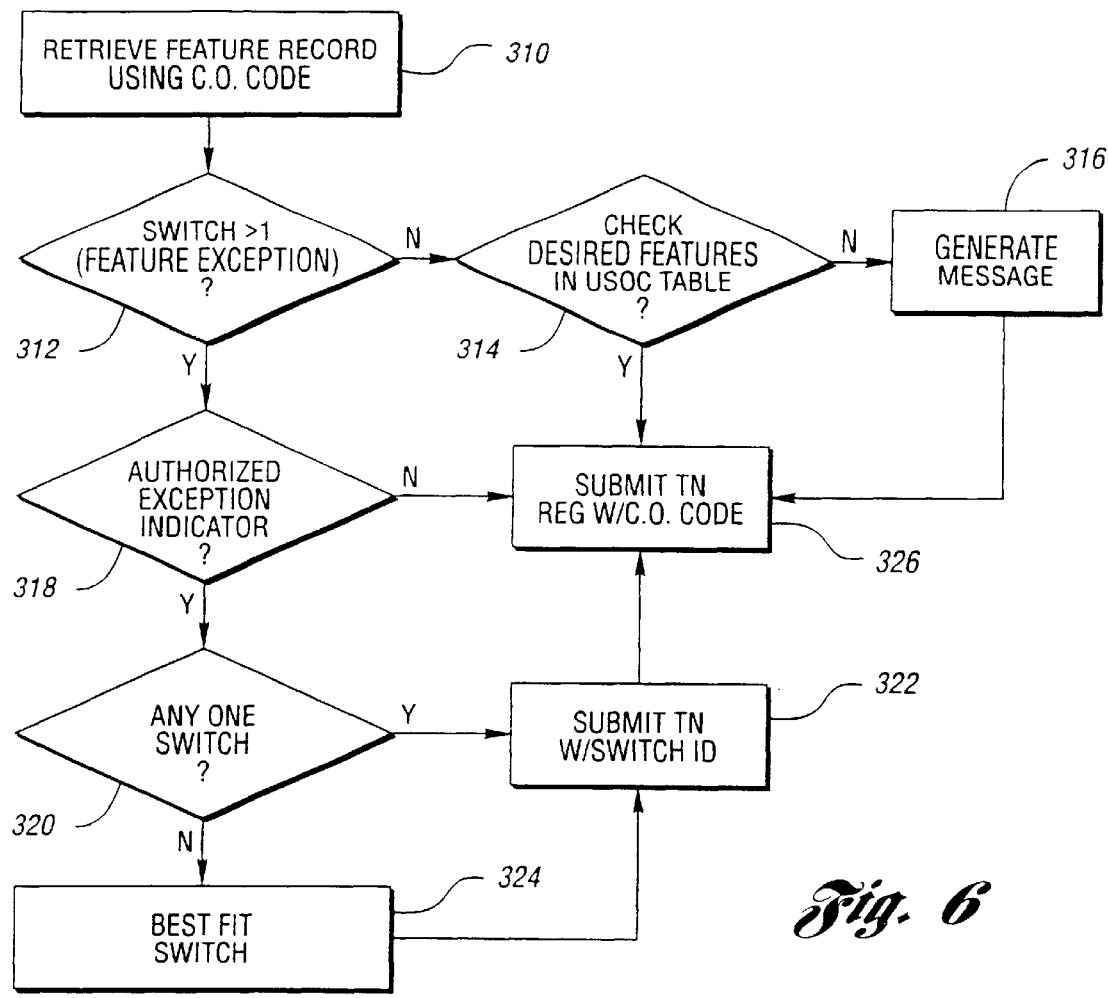
FIG. 6 is a flow chart illustrating one embodiment for feature availability processing for automated electronic telecommunications ordering according to the present invention.

FIG. 6 is a flow chart illustrating one embodiment for feature availability processing for automated electronic telecommunications ordering according to the present invention. This process is preferably used in determining available features in a particular CO as well as determining switch identification for COs serviced by more than one switch. When necessary, the CO code or switch identification may be used in a telephone number request. Using the CO code retrieved from the address validation process described above, the system retrieves the feature record from the central office feature file by matching with the central office field as represented by block 310. The feature exception indicator is examined to determine whether the particular CO is serviced by more than one switch as represented by block 312. If the CO is not serviced by more than one switch with differing features, the USOC table will contain all of the available features for that particular CO. Using this list, the system verifies that the requested features are available within the identified CO as represented by block 314. If any feature is not available, an appropriate message may be generated before submitting the request for a telephone number using the CO code as represented by block 326.

If the CO is serviced by more than one switch with varying features as determined by block 312, then the additional exception indicator field is examined as represented by block 318. If none of the desired features contain an appropriate code in the additional exception indicator field, the desired features are available for all switches within the CO so the telephone number request is submitted with the CO code as represented by block 326. If any of the desired features do contain an appropriate code in the additional exception indicator field, not all of the desired features are available in each switch servicing the CO. In this case, the USOC table is examined to determine if all of the desired features are provided by any one switch as represented by block 320. If any one switch provides all of the desired features, then the switch ID is added to the telephone number request as represented by block 322.

If all of the desired features are not provided by any one switch, all of the requirements will not be able to be met and the system (or a service representative) must select the switch which provides either the greatest number of features, or the most important features. For this process, each feature may be assigned a code indicating its relative importance. The code may be determined by the reseller, the wholesaler, or the ultimate customer depending upon the particular application. The switch ID which satisfies a greater number of selection criteria is then added to the telephone number request as represented by block 322. The telephone number request is then submitted with the CO code and the switch ID (where appropriate) as represented by block 326.

Using the feature availability interface in an interactive mode, the telecommunications reseller can ensure that the desired features are available for the serving CO retrieved through the address validation process. Where the CO serving the customer includes more than one switch, the feature availability interface determines the switch which contains the desired features, or selects the switch which contains the most features based on quantity or importance. The reseller can use the various feature files to determine all of the areas in which a particular feature is offered, determine which features are offered for a particular prefix (exchange), and determine valid prefixes for a particular CO.

Figure 7:
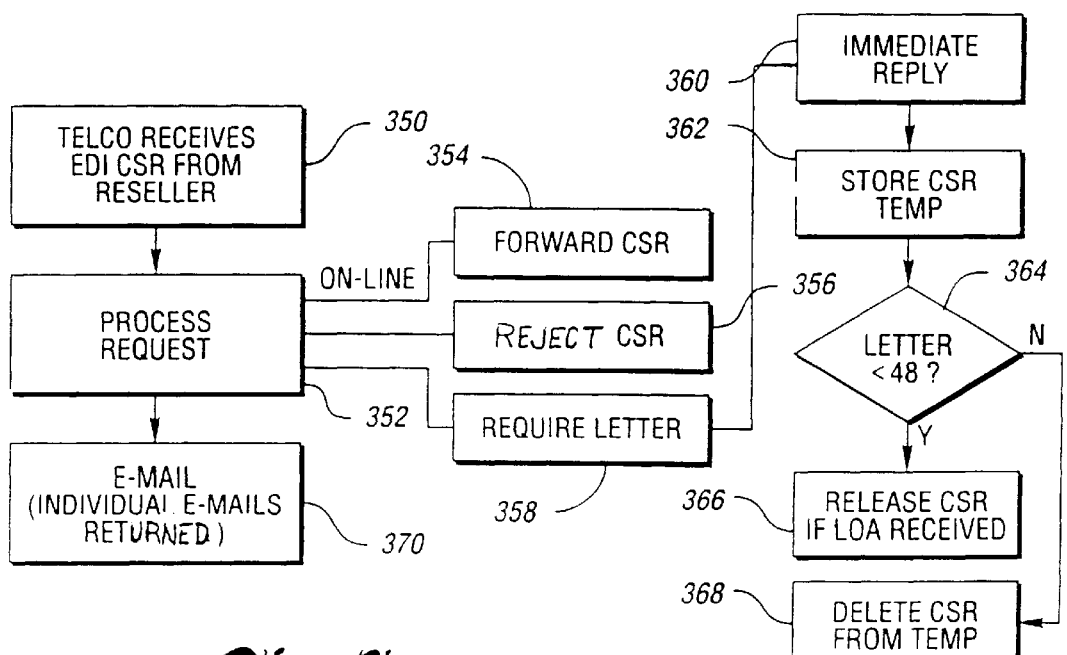
FIG. 7 is a block diagram illustrating one embodiment of a Customer Service Record (CSR) interface for automated electronic telecommunications ordering according to the present invention.

FIG. 7 is a block diagram illustrating one embodiment of a Customer Service Record (CSR) interface for automated electronic telecommunications ordering according to the present invention. The CSR provides the reseller with on-line customer service records. The reseller obtains customer account information by submitting EDI transactions and receiving EDI responses. The reseller transmits a request for a Customer Service Record using the appropriate transaction set (preferably 850-ASCX12 version 003030) which is received by the wholesaler as represented by block 350. The wholesaler processes the request as represented by block 352 and generates one of three responses represented by blocks 354, 356, and 358. Preferably, the responses are returned using a different transaction set, such as the 864-ASCX2 version 003030.

Typically, the request will result in forwarding of the appropriate CSR to the reseller as represented by block 354. However, the request may be rejected with an appropriate message as represented by block 356. For some transactions, a letter of authorization is required as represented by block 358. If the transaction requires a letter of authorization, exception processing is performed by the wholesaler as represented by blocks 360–368. An immediate reply is generated using the appropriate transaction set (preferably 864) and forwarded to the reseller to indicate that a letter of authorization is required as represented by block 360. The appropriate CSR is then held in temporary storage as represented by block 362 for a predetermined time, preferably about 48 hours, as represented by block 364. If a letter of authorization is received within the predetermined time period, the CSR is released to the reseller as represented by block 366. Otherwise, the CSR is deleted from temporary storage as represented by block 368.

In one preferred embodiment of the present invention, the CSR interface also accommodates requests received by E-mail. Resellers can send CSR data requests to the wholesaler and receive either the desired CSR or error messages in return. The CSR data and error messages have a text format and are meant to be read by people rather than computers. In this embodiment, the CSR interface uses the Flexible Communication Interface Format (FCIF) developed by Bellcore. This format uses a tag value methodology. Each request starts with an asterisk (*) followed by a code indicating the type of request. Braces (({ }) are used to enclose pairs of tag values and associated ASCII characters which provide the value for each data element. Data elements are separated by a semicolon. The percent sign (%) is used to denote the end of a request. Several CSR requests can be made within one e-mail by incorporating them into the text of a single e-mail message. However, each request is returned separately to avoid any negative impact on the e-mail network. Likewise, if the retrieved CSR data is particularly sizable, a response is sent indicating that the CSR has been retrieved but will be delayed for off-peak delivery.

Figure 8:
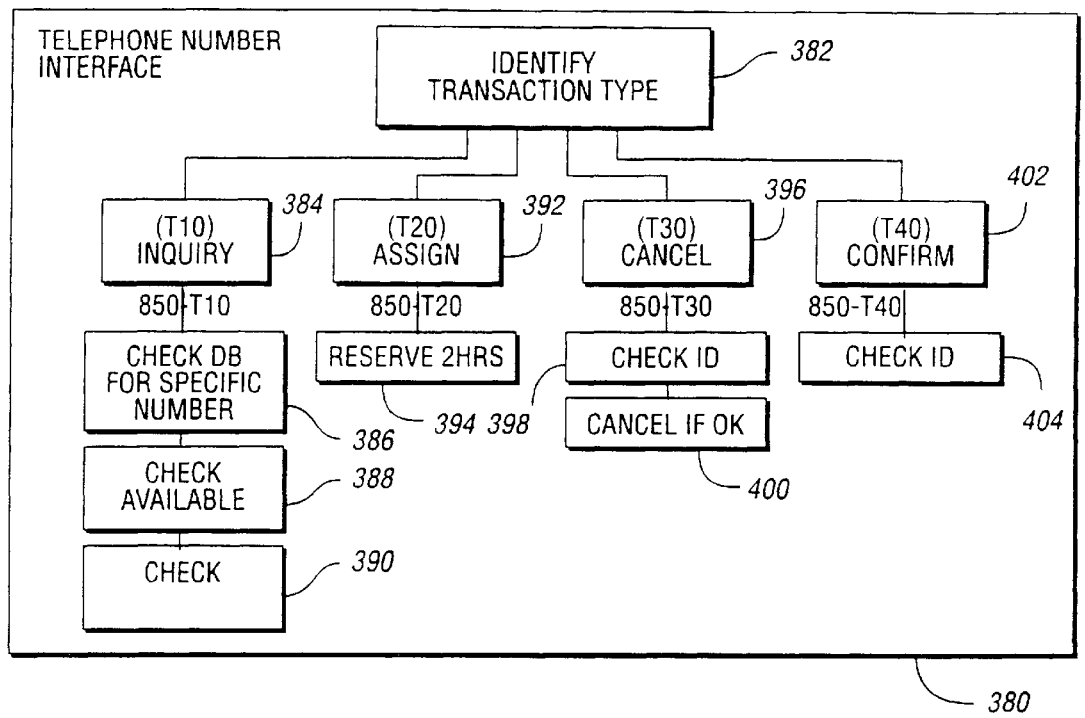
FIG. 8 is a block diagram illustrating one embodiment of a telephone number interface for automated electronic telecommunications ordering according to the present invention.

FIG. 8 is a block diagram illustrating one embodiment of a telephone number interface for automated electronic telecommunications ordering according to the present invention. Telephone number interface 380 provides interactive, on-line telephone number inquiry and reservation features to the reseller. In one embodiment of the present invention, four transactions are provided and handled on a real-time basis. Communications between the reseller and wholesaler are preferably based on EDI message formats with 850-ASCX12 version 003030 used for submissions by the reseller and 855-ASCX12 version 003030 used for responses from the wholesaler.

A telephone number inquiry as represented by block 384 may be submitted as a Purchase Order (850) with a transaction type of T10. The corresponding response is issued as a Purchase Order Acknowledgment (855). The telephone number inquiry 384 may be used to determine the availability of a specific telephone number. Given a specific telephone number, the system will respond with a message indicating whether or not the telephone number is available as represented by block 386. Given a particular NPA and prefix, the system will return a predetermined or requested number of available telephone numbers as represented by block 388. Given a preferred telephone number pattern, the system will attempt to match the available numbers to the requested pattern and return a list of available numbers that match the desired pattern as represented by block 390. The telephone number inquiry does not reserve telephone numbers for subsequent use in a service order. A separate transaction must be submitted to guarantee that the number will be held for a requester's service order as explained in greater detail below.

Telephone number interface 380 may also be used to assign a telephone number for use by a reseller in subsequent order processing as represented by block 392. This transaction is submitted as a purchase order with a transaction type of T20. The response is issued using the purchase order acknowledgment transaction set. Upon receipt of the telephone number assignment transaction, the telephone number is reserved for a certain period of time as represented by block 394. In one embodiment of the present invention, the period of time is two hours. If a service order is not received within the predetermined time interval, the reservation is canceled and the telephone number will be returned to the available telephone number pool for use by other resellers and representatives.

A telephone number assignment cancellation request, represented by block 396, is submitted using the purchase order transaction set with a transaction type of T30. The response from the wholesaler to the reseller is issued using the purchase order acknowledgment transaction set. Upon receipt, the system determines whether the request came from the same reseller that initially reserved the telephone number as represented by block 398. If the reseller ID matches, the reservation is cancelled as represented by block 400 and the previously assigned telephone number is returned to the pool of available telephone numbers. Each request cancels only one telephone number reservation. Multiple telephone number requests are preferably not allowed.

A telephone number assignment confirmation is transmitted using the purchase order transaction set with a transaction type of T40 as represented by block 402. The response is issued using the purchase order acknowledgment transaction set. This request is used to confirm that a telephone number is still assigned to a particular reseller. Confirmations for telephone number assignments can be made only by the reseller making the initial reservation. As such, the reseller identification code is checked against the previously submitted assignment as represented by block 404.

Figure 9:
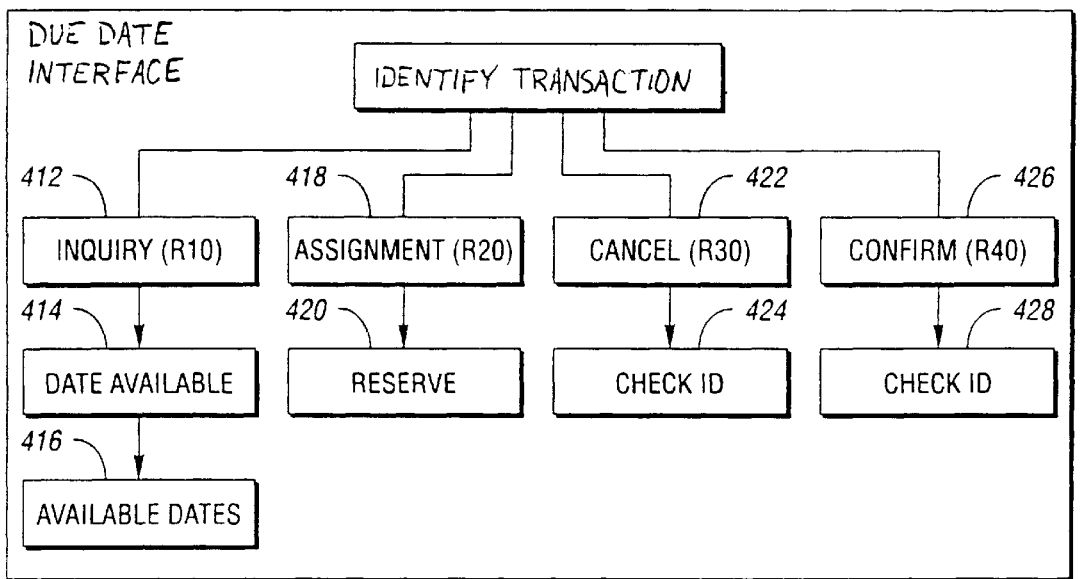
FIG. 9 is a block diagram illustrating one embodiment of a due date interface for automated electronic telecommunications ordering according to the present invention.

FIG. 9 is a block diagram illustrating one embodiment of a due date interface for automated electronic telecommunications ordering according to the present invention. Due date interface 410 provides on-line due date inquiry and reservation features. In one preferred embodiment of the present invention, due date interface 410 provides four transactions which are handled on a real-time basis. Preferably, all transactions are submitted using the purchase order transaction set (850-ASCX12 version 003030) with responses from the wholesaler using the purchase order acknowledgment transaction set (855-ASCX12 version 003030).

A due date inquiry is submitted with a transaction type of R10 as represented by block 412. This transaction may be used to determine the availability of a specific due date as represented by block 414. Given a requested due date, the system will respond by indicating whether or not the due date is available and can be met based on the required service order activity. A due date inquiry may also be used to obtain a list of available due dates when a premises visit is required as represented by block 416. Given a description of the requested service order activity, the system provides the earliest possible due date in addition to a list of other available due dates. The due date inquiry does not reserve due dates for subsequent use in a service order. A separate due date assignment transaction 418 must be submitted to guarantee that the due date will be held for a particular service order.

Due date assignment transaction 418 is submitted using the purchase order transaction set with a transaction type of R20. A response is issued using the purchase order acknowledgment transaction set. Due date transaction 418 allows the reseller to reserve a specific due date for use in subsequent order processing as represented by block 420. This transaction contains the same information as the inquire transaction 412 with the exception that the reseller submits a specific due date and a time-of-day preference, such as morning, afternoon, or all day. A due date assignment may be attempted without a previously submitted due date inquiry.

Upon receipt of a due date assignment transaction 418, the due date is reserved for a predetermined period of time, such as two hours, as represented by block 420. The reseller must submit a service order for the reserved due date within this time period or the reservation is automatically canceled. All requested products and services should be accurately represented on a due date assignment transaction. If the subsequently submitted service order contains information different from the due date assignment which impacts the due date, the service order may be rejected.

A due date assignment cancellation transaction 422 is submitted by the reseller as a purchase order using transaction set 850 with a transaction type of R30. A response is issued using the purchase order acknowledgment. This transaction is used to cancel a previously assigned due date. The reseller identification is checked against the previously submitted due date assignment transaction as represented by block 424 so that only the reseller who initially made the assignment may submit a cancellation request for that assignment. Each due date assignment cancellation transaction cancels exactly one due date reservation. Multiple due date cancellations in one transaction are preferably not permitted.

A due date assignment confirmation transaction 426 is submitted by the reseller using the purchase order transaction set with a transaction type of R40. A response is generated by the wholesaler using the purchase order acknowledgment transaction set. This transaction is used to confirm that a due date is still in assigned status. The identification of the reseller is compared against the previously submitted assignment transaction as represented by block 428. Confirmations of due date assignments are preferably only permitted for the reseller who made the initial reservation.

Figure 10:
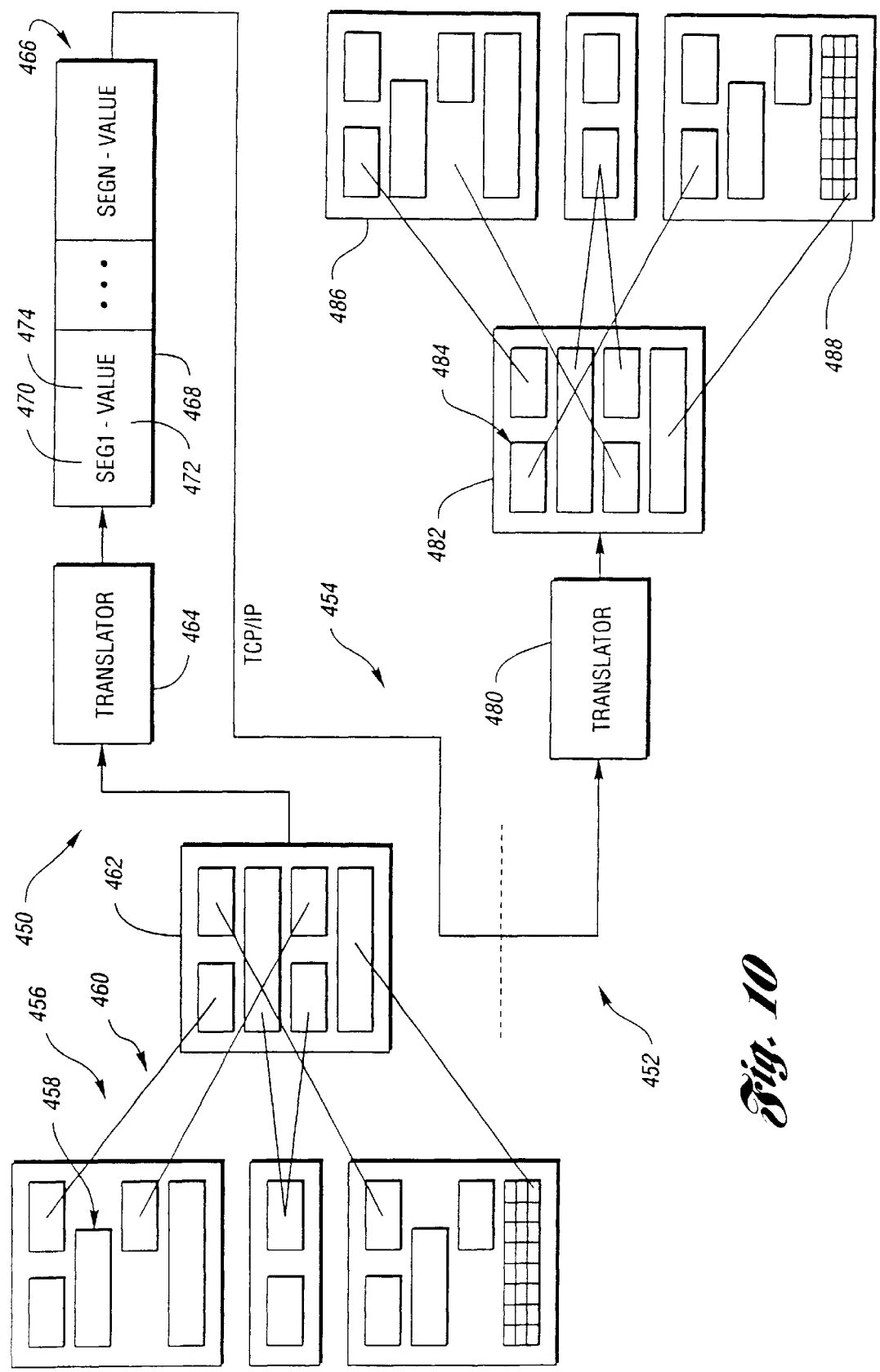
FIG. 10 is a block diagram illustrating mapping and translation functions of one embodiment for automated

FIG. 10 is a block diagram illustrating mapping and translation functions of one embodiment for automated electronic telecommunications ordering according to the present invention. The mapping and translation functions being performed by the reseller, indicated generally by reference numeral 450, cooperate with similar mapping and translation functions of the wholesaler, indicated generally by reference numeral 452, preferably using a TCP/IP connection, indicated by reference numeral 454. Preferably, the mapping and translation functions are performed by software executing on one or more computers, such as the customer service agent computers and message servers described and illustrated with reference to FIG. 1.

The data gathered by the reseller is entered into one or more databases or forms 456 which include various data fields 458. Forms 456 preferably represent various data entry screens on a computer operated by a customer service representative. A mapping function is performed as indicated generally by reference numeral 460 to collect the information related to a particular electronic "document" 462. A translator 464, also implemented in software, translates the data from electronic document 462 into an electronic message 466 using a standard transaction set. Message 466 includes several segments 468 each having a segment identifier 470, a data segment identifier 472, and a data segment value 474. In one preferred embodiment of the present invention, the segments of a transaction set must occur in a particular sequence for proper processing. A single electronic message 466 may contain multiple electronic documents 462 which are concatenated in a single data stream. Additional information is added to electronic message 466 for transmission via the TCP/IP link 454 to the wholesaler, such as routing information, error detection information, and the like, as well known in the art.

An analogous reciprocal process occurs when the message reaches the wholesaler 452. Translator 480 parses electronic message 466 to identify one or more transaction sets. Message syntax is examined and error messages are generated when appropriate. The received data is temporarily stored in electronic document 482 having data fields 484. The appropriate information is then automatically transferred to the wholesaler's internal order system as represented by blocks 486 and 488. The order is processed and a response is generated, translated using the standard transaction set, and transmitted to the reseller. By reducing manual intervention, this system reduces operating expenses and increases accuracy. Furthermore, a real-time response is generated and communicated to reduce turn-around time.

While the best mode for carrying out the invention has been described in detail, those familiar with the art to which this invention relates will recognize various alternative designs and embodiments for practicing the invention as defined by the following claims.

AIT 0127 PUS -33-

Section II

Transaction Set Specifications

34

General Ordering Overview

This ordering section addresses use of TCIF-defined EDI standards for the purpose of providing a method of requesting telecommunication services. This guide is intended to be a supplement to the information provided in the TCIF EDI Guidelines, Telecommunications Carrier Services, Issue 5. The TCIF guidelines should be consulted for specific detail when necessary.

Please note that in the following transactions all qualifiers, data, etc., are shown in UPPER CASE letters, with the exception of the qualifiers, data, etc., in the N1 loops, which are shown in Mixed Case.

This section of the ESO Guide details the use of the following transaction sets:

- 836 Electronic Notification

Losing Reseller Notification

PIC/LPIC

- 850 Purchase Order
- 855 Purchase Order Acknowledgment
- 860 Purchase Order Change Request—Buyer Initiated
- 865 Purchase Order Completion Notification—Seller Initiated
- 870 Order Status (Jeopardy)
- 997 Functional Acknowledgment

35

EDI Envelope—Ordering

Introduction

Envelopes provide the interchange control structure for transmitting business transactions. The interchange control header (ISA) and interchange control trailer (IEA) envelope one or more functional group header/trailer pairs (GS/GE). They identify the sender and receiver, provide function group control header (GS) information, and allow for authorization and security information. The ISA is transmitted first, followed by the data in functional groups with the interchange trailer at the end. The sequence for the transaction sets follows:

ISA Interchange Control Header

Starts and identifies an interchange of one or more functional groups.

GS Functional Group Header starts a group of related transactions

ST Transaction Set Header starts a transaction set

*Transaction Set (for example, 850, 860)*

SE Transaction Set trailer ends a transaction set

GE Functional Group Trailer ends a group of related transactions

IEA Interchange Control Trailer ends the interchange of one or more functional groups More than one ST/SE pair, each representing a transaction set, may be used within one functional group.

Included in the following pages are envelope layouts for Preordering and Ordering. Both are included to illustrate the different identifications required in the ISA08 element for documents sent to the wholesaler and the ISA06 element for documents sent from the wholesaler.

ICS Interchange Control Structures

Functional Group ID=

Introduction:

The purpose of this standard is to define the control structures for the electronic interchange of one or more encoded business transactions including the EDI (Electronic Data Interchange) encoded transactions of Accredited Standards Committee X12. This standard provides the interchange envelope of a header and trailer for the electronic interchange through a data transmission, and it provides a structure to acknowledge the receipt and processing of this envelope.

36

| | Pos. No. | Seg. ID | Name | Req. Des. | Max.Use | Loop Repeat | Notes and Comments |
|---|---|---|---|---|---|---|---|
| Must Use | 010 | ISA | Interchange Control Header | M | 1 | | |
| Must Use | 030 | GS | Functional Group Header | M | 1 | | |
| Must Use | 040 | GE | Functional Group Trailer | M | 1 | | |
| Must Use | 050 | IEA | Interchange Control Trailer | M | 1 | | |

Segment: ISA Interchange Control Header
Position: 010
Loop:
Level:
Usage: Mandatory
Max Use: 1
Purpose: To start and identify an interchange of zero or more functional groups and interchange-related control segments
Syntax Notes:
Semantic Notes:
Comments:

Data Element Summary

| | Ref. Des. Attributes | Data Element | Name | | |
|---|---|---|---|---|---|
| Must Use | ISA01 | I01 | Authorization Information Qualifier | M | ID 2/2 |

Code to identify the type of information in the Authorization Information
    00    No Authorization Information Present (No Meaningful Information in I02)

| Must Use | ISA02 | I02 | Authorization Information | M | AN 10/10 |

Information used for additional identification or authorization of the sender or the data in the interchange. The type of information is set by the Authorization Information Qualifier (I01).
Blanks

| Must Use | ISA03 | I03 | Security Information Qualifier | M | ID 2/2 |

Code to identify the type of information in the Security Information
    00    No Security Information Present (No Meaningful Information in I04)

| Must Use | ISA04 | I04 | Security Information | M | AN 10/10 |

This is used for identifying the security information about the sender or the data in the interchange. The type of information is set by the Security Information Qualifier (I03).
Blanks

| Must Use | ISA05 | I05 | Interchange ID Qualifier | M | ID 2/2 |

Qualifier to designate the system/method of code structure used to designate the sender or receiver ID element being qualified
    01    Duns (Dun & Bradstreet)

| Must Use | ISA06 | I06 | Interchange Sender ID | M | AN 15/15 |

Identification code published by the sender for other parties to use as the receiver ID to route data to them; the sender always codes this value in the sender ID element

| Must Use | ISA07 | I05 | Interchange ID Qualifier | M | ID 2/2 |

Qualifier to designate the system/method of code structure used to designate the sender or receiver ID element being qualified
    01    Duns (Dun & Bradstreet)

| Must Use | ISA08 | I07 | Interchange Receiver ID | M | AN 15/15 |

Identification code published by the receiver of the data; When sending, it is used by the sender as their sending ID, thus other parties sending to them will use this as a receiving ID to route data to them

37

|  |  |  | 023044759MOR |  |  |
|---|---|---|---|---|---|
|  |  |  | Ordering only |  |  |
| Must Use | ISA09 | 108 | Interchange Date | M | DT 6/6 |
|  |  |  | Date of the interchange |  |  |
| Must Use | ISA10 | 109 | Interchange Time | M | TM 4/4 |
|  |  |  | Time of the interchange |  |  |
| Must Use | ISA11 | 110 | Interchange Control Standards Identifier | M | ID 1/1 |
|  |  |  | Code to identify the agency responsible for the control standard used by the message that is enclosed by the interchange header and trailer |  |  |
|  |  |  | Refer to 003030 Data Element Dictionary for acceptable code values. |  |  |
| Must Use | ISA12 | 111 | Interchange Control Version Number | M | ID 5/5 |
|  |  |  | This version number covers the interchange control segments |  |  |
|  |  |  | 00303    Draft Standard for Trial Use Approved for Publication by ASC X12 Procedures Review Board Through October 1992 |  |  |
| Must Use | ISA13 | 112 | Interchange Control Number | M | N0 9/9 |
|  |  |  | A control number assigned by the interchange sender. |  |  |
|  |  |  | ICNs should only be reused once the full 100,000,000 possible combinations have been exhausted and should not be reused when resubmitting a revised order using the same purchase order number. |  |  |
| Must Use | ISA14 | 113 | Acknowledgment Requested | M | ID 1/1 |
|  |  |  | Code sent by the sender to request an interchange acknowledgment (TA1) |  |  |
|  |  |  | 0    No Acknowledgment Requested |  |  |
| Must Use | ISA15 | 114 | Test Indicator | M | ID 1/1 |
|  |  |  | Code to indicate whether data enclosed by this interchange envelope is test or production |  |  |
|  |  |  | T/Test Data |  |  |
|  |  |  | P/Production Data |  |  |
|  |  |  | Refer to 003030 Data Element Dictionary for acceptable code values. |  |  |
| Must Use | ISA16 | 115 | Component Element Separator | M | AN 1/1 |
|  |  |  | This is a field provides the delimeter used to separate component data elements within a composite data structure; this value must be different than the data element separator and the segment terminator |  |  |
|  |  |  | Subelement separator, hexidecimal A1 |  |  |
|  |  |  | Element separator, hexidecimal 4C |  |  |
|  |  |  | Segment separator, hexidecimal 15 |  |  |

Segment: GS Functional Group Header
Position: 030
Loop:
Level:
Usage: Mandatory
Max Use: 1
Purpose: To indicate the beginning of a functional group and to provide control information
Syntax Notes:
Semantic Notes:
Comments: 1   A functional group of related transaction sets, within the scope of X12 standards, consists of a collection of similar transaction sets enclosed by a functional group header and a functional group trailer.

Data Element Summary

|  | Ref. Des. Attributes | Data Element | Name |  |  |
|---|---|---|---|---|---|
| Must Use | GS01 | 479 | Functional Identifier Code | M | ID 2/2 |
|  |  |  | Code identifying a group of application related transaction sets |  |  |

|  |  |  | CA | Purchase Order Change Acknowledgement (865) |  |  |
|  |  |  | PC | Purchase Order Change (860) |  |  |
|  |  |  | PO | Purchase Order (850) |  |  |
|  |  |  | PR | Purchase Order Acknowledgement (855) |  |  |
|  |  |  | RQ | Reseller Notification (836) |  |  |
|  |  |  | RS | Order Status Information (870) |  |  |
|  |  |  | TX | Text Message (864) |  |  |
| Must Use | GS02 | 142 | Application Sender's Code | | M | AN 2/15 |

Code identifying party sending transmission; codes agreed to by trading partners

| Must Use | GS03 | 124 | Application Receiver's Code | M | AN 2/15 |

Code identifying party receiving transmission. Codes agreed to by trading partners
023044759MOR
Ordering only

| Must Use | GS04 | 373 | Date | M | DT 6/6 |

Date (YYMMDD)

| Must Use | GS05 | 337 | Time | M | TM 4/6 |

Time expressed in 24-hour clock time (HHMMSS) (Time range: 000000 through 235959)
uses HHMM format

| Must Use | GS06 | 28 | Group Control Number | M | N0 1/9 |

Assigned number originated and maintained by the sender

| Must Use | GS07 | 455 | Responsible Agency Code | M | ID 1/2 |

Code used in conjunction with Data Element 480 to identify the issuer of the standard
    X                  Accredited Standards Committee X12

| Must Use | GS08 | 480 | Version / Release / Industry Identifier Code | M | AN 1/12 |

Code indicating the version, release, subrelease and industry identifier of the EDI standard being used. Positions 1-3, version number; positions 4-6, release and subrelease level of version; positions 7-12, industry or trade association identifier (optionally assigned by user).
    003030        Draft Standards Approved for Publication by ASC X12 Procedures Review Board Through October 1992

|  |  |
|---|---|
| Segment: | GE Functional Group Trailer |
| Position: | 040 |
| Loop: |  |
| Level: |  |
| Usage: | Mandatory |
| Max Use: | 1 |
| Purpose: | To indicate the end of a functional group and to provide control information |
| Syntax Notes: |  |
| Semantic Notes: |  |
| Comments: | 1   The use of identical data interchange control numbers in the associated functional group header and trailer is designed to maximize functional group integrity. The control number is the same as that used in the corresponding header. |

Data Element Summary

| Ref. Des. Attributes | Data Element | Name |  |  |
|---|---|---|---|---|
| Must Use GE01 | 97 | Number of Transaction Sets Included | M | N0 1/6 |

Total number of transaction sets included in the functional group or interchange (transmission) group terminated by the trailer containing this data

39

|  |  |  | element |  |  |
|---|---|---|---|---|---|
| Must Use | GE02 | 28 | Group Control Number | M | N0 1/9 |
|  |  |  | Assigned number originated and maintained by the sender |  |  |

Segment: IEA Interchange Control Trailer
Position: 050
Loop:
Level:
Usage: Mandatory
Max Use: 1
Purpose: To define the end of an interchange of zero or more functional groups and interchange-related control segments
Syntax Notes:
Semantic Notes:
Comments:

Data Element Summary

|  | Ref. Des. Attributes | Data Element | Name |  |  |
|---|---|---|---|---|---|
| Must Use | IEA01 | I16 | Number of Included Functional Groups | M | N0 1/5 |
|  |  |  | A count of the number of functional groups included in an interchange |  |  |
| Must Use | IEA02 | I12 | Interchange Control Number | M | N0 9/9 |
|  |  |  | A control number assigned by the interchange sender. |  |  |

836 Contract Award—
Losing Reseller Notification

Functional Group ID=RQ

Introduction:

This contains the format and establishes the data contents of the Procurement Notices Transaction Set (836) for use within the context of an Electronic Data Interchange (EDI) environment. This transaction set will be for Reseller Notification.

|  | Pos. No. | Seg. ID | Name | Req. Des. | Max.Use | Loop Repeat | Notes and Comments |
|---|---|---|---|---|---|---|---|
| Must Use | 010 | ST | Transaction Set Header | M | 1 |  |  |
| Must Use | 020 | BCO | Beginning Segment For Contract Award | M | 1 |  |  |
|  |  |  | LOOP ID - N1 |  |  | >1 |  |
|  | 021 | N1 | Name | O | 1 |  |  |
|  |  |  | LOOP ID - PO1 |  |  | >1 |  |
| Must Use | 030 | PO1 | Baseline Item Data | M | 1 |  |  |
|  | 090 | REF | Reference Numbers | O | >1 |  |  |
| Must Use | 190 | SE | Transaction Set Trailer | M | 1 |  |  |

Segment: ST Transaction Set Header
Position: 010
Loop:
Level:
Usage: Mandatory
Max Use: 1
Purpose: To indicate the start of a transaction set and to assign a control number
Syntax Notes:

40

| | | | | | |
|---|---|---|---|---|---|
| Semantic Notes: | | 1 | The transaction set identifier (ST01) used by the translation routines of the interchange partners to select the appropriate transaction set definition (e.g., 810 selects the Invoice Transaction Set). | | |

Data Element Summary

| | Ref. Des. Attributes | Data Element | Name | | |
|---|---|---|---|---|---|
| Must Use | ST01 | 143 | Transaction Set Identifier Code<br>Code uniquely identifying a Transaction Set<br>836     X12.54 Contract Award | M | ID 3/3 |
| Must Use | ST02 | 329 | Transaction Set Control Number<br>Identifying control number that must be unique within the transaction set functional group assigned by the originator for a transaction set<br>Must match value in SE02 | M | AN 4/9 |

| | |
|---|---|
| Segment: | BCO Beginning Segment For Contract Award |
| Position: | 020 |
| Usage: | Mandatory |
| Max Use: | 1 |
| Purpose: | To indicate the beginning of the Contract Award Transaction Set and to transmit identifying numbers and dates. |
| Syntax Notes: | |
| Semantic Notes: | 1  BCO04 is the contract number.<br>2  BCO06 is the contract beginning date. |

Data Element Summary

| | Ref. Des. Attributes | Data Element | Name | | |
|---|---|---|---|---|---|
| Must Use | BCO01 | 353 | Transaction Set Purpose Code<br>Code identifying purpose of transaction set<br>47     Transfer | M | ID 2/2 |
| Must Use | BCO02 | 586 | Request for Quote Reference Number<br>Number assigned by the purchaser to identify his request for quote<br>Account number | M | AN 1/45 |
| Must Use | BCO03 | 652 | Request Quotation Control Date<br>Date to be used for reference purposes in an RFQ and a response to RFQ.<br>Date issued | M | DT 6/6 |
| | BCO04 | 127 | Reference Number<br>Reference number or identification number as defined for a particular Transaction Set, or as specified by the Reference Number Qualifier.<br>Purchase order number | O | AN 1/30 |
| Must Use | BCO05 | 846 | Contract Status Code<br>Code designating the current status of the contract<br>TR     Contract Transferred | M | ID 2/2 |
| Must Use | BCO06 | 373 | Date<br>Date (YYMMDD)<br>Order due date | M | DT 6/6 |

| | |
|---|---|
| Segment: | N1 Name |
| Position: | 021 |
| Loop: | N1 |
| Level: | |
| Usage: | Optional |
| Max Use: | 1 |

41

|  | Purpose: | To identify a party by type of organization, name, and code |
|---|---|---|
|  | Syntax Notes: | 1  At least one of N102 is required. |
|  | Semantic Notes: | |
|  | Comments: | 1  This segment, used alone, provides the most efficient method of providing organizational identification. |

Data Element Summary

| | Ref. Des. Attributes | Data Element | Name | | |
|---|---|---|---|---|---|
| Must Use | N101 | 98 | Entity Identifier Code <br> Code identifying an organizational entity, a physical location, or an individual <br>     MA    Party for whom item is ultimately intended | M | ID 2/2 |
|  | N102 | 93 | Name <br> Free-form name <br>     ZXX    Placeholder for ACNA | X | AN 1/35 |

|  | Segment: | PO1 Baseline Item Data |
|---|---|---|
|  | Position: | 030 |
|  | Loop: | PO1 |
|  | Level: | |
|  | Usage: | Mandatory |
|  | Max Use: | 1 |
|  | Purpose: | To specify basic and most frequently used line item data |
|  | Syntax Notes: | 1  If PO103 is present, then PO102 is required. |
|  | Semantic Notes: | |
|  | Comments: | 1  PO101 is the line item identification. |

Data Element Summary

| | Ref. Des. Attributes | Data Element | Name | | |
|---|---|---|---|---|---|
| Must Use | PO101 | 350 | Assigned Identification <br> Alphanumeric characters assigned for differentiation within a transaction set <br> Must be equal 1 or higher; do not use 0 | M | AN 1/11 |
| Must Use | PO102 | 330 | Quantity Ordered <br> Quantity ordered <br> Presently, always 1 | M | R 1/9 |
| Must Use | PO103 | 355 | Unit or Basis for Measurement Code <br> Code specifying the units in which a value is being expressed, or manner in which a measurement has been taken <br>     EA    Each | M | ID 2/2 |

|  | Segment: | REF Reference Numbers |
|---|---|---|
|  | Position: | 090 |
|  | Loop: | PO1 |
|  | Level: | |
|  | Usage: | Optional |
|  | Max Use: | >1 |
|  | Purpose: | To specify identifying numbers. |
|  | Syntax Notes: | 1  At least one of REF02 is required. |
|  | Semantic Notes: | |
|  | Comments: | |

42

Data Element Summary

| | Ref. Des. Attributes | Data Element | Name | | |
|---|---|---|---|---|---|
| Must Use | REF01 | 128 | Reference Number Qualifier<br>Code qualifying the reference number.<br>QQ    Unit number | M | ID 2/2 |
| Must Use | REF02 | 127 | Reference Number<br>Reference number or identification number as defined for a particular Transaction Set, or as specified by the Reference Number Qualifier.<br>Telephone number of circuit ID | M | AN 1/30 |

Segment: SE Transaction Set Trailer
Position: 190
Loop:
Level:
Usage: Mandatory
Max Use: 1
Purpose: To indicate the end of the transaction set and provide the count of the transmitted segments (including the beginning (ST) and ending (SE) segments).
Syntax Notes:
Semantic Notes:
Comments: 1  SE is the last segment of each transaction set.

Data Element Summary

| | Ref. Des. Attributes | Data Element | Name | | |
|---|---|---|---|---|---|
| Must Use | SE01 | 96 | Number of Included Segments<br>Total number of segments included in a transaction set including ST and SE segments | M | N0 1/10 |
| Must Use | SE02 | 329 | Transaction Set Control Number<br>Identifying control number that must be unique within the transaction set functional group assigned by the originator for a transaction set<br>Must match value in ST02 | M | AN 4/9 |

836 Contract Award—PIC/LPIC

Functional Group ID=RQ

Introduction:

This section contains the format and establishes the data contents of the Procurement Notices Transaction Set (836) for use within the context of an Electronic Data Interchange (EDI) environment. Only the segments used by AIIS for the reseller notification are listed.

PIC/LPIC changes is an optional offering.

| | Pos. No. | Seg. ID | Name | Req. Des. | Max.Use | Loop Repeat | Notes and Comments |
|---|---|---|---|---|---|---|---|
| Must Use | 010 | ST | Transaction Set Header | M | 1 | | |

43

| | | | | | | |
|---|---|---|---|---|---|---|
| Must Use | 020 | BCO | Beginning Segment For Contract Award | M | 1 | |
| | | | LOOP ID - N1 | | | >1 |
| | 021 | N1 | Name | O | 1 | |
| | 025 | REF | Reference Numbers | O | >1 | |
| | | | LOOP ID - PO1 | | | >1 |
| Must Use | 030 | PO1 | Baseline Item Data | M | 1 | |
| | 090 | REF | Reference Numbers | O | >1 | |
| | | | LOOP ID - N1 | | | >1 |
| | 130 | N1 | Name | O | 1 | |
| Must Use | 190 | SE | Transaction Set Trailer | M | 1 | |

Segment: ST Transaction Set Header
       Position: 010
       Loop:
       Level:
       Usage: Mandatory
       Max Use: 1
       Purpose: To indicate the start of a transaction set and to assign a control number
   Syntax Notes:
 Semantic Notes: 1   The transaction set identifier (ST01) used by the translation routines of the interchange partners to select the appropriate transaction set definition (e.g., 810 selects the Invoice Transaction Set).

Data Element Summary

| | Ref. Des. Attributes | Data Element | Name | | |
|---|---|---|---|---|---|
| Must Use | ST01 | 143 | Transaction Set Identifier Code | M | ID 3/3 |
| | | | Code uniquely identifying a Transaction Set | | |
| | | |    836            X12.54 contract award | | |
| Must Use | ST02 | 329 | Transaction Set Control Number | M | AN 4/9 |
| | | | Identifying control number that must be unique within the transaction set functional group assigned by the originator for a transaction set | | |
| | | | Must match value in SE02 | | |

Segment: BCO Beginning Segment For Contract Award
       Position: 020
       Loop:
       Level:
       Usage: Mandatory
       Max Use: 1
       Purpose: To indicate the beginning of the Contract Award Transaction Set and to transmit identifying numbers and dates.
   Syntax Notes:
 Semantic Notes: 1   BCO04 is the contract number.
    Comments:

Data Element Summary

| | Ref. Des. Attributes | Data Element | Name | | |
|---|---|---|---|---|---|
| Must Use | BCO01 | 353 | Transaction Set Purpose Code | M | ID 2/2 |
| | | | Code identifying purpose of transaction set | | |
| | | |    13            Request | | |
| Must Use | BCO02 | 586 | Request for Quote Reference Number | M | AN 1/45 |

44

|  |  |  | Number assigned by the purchaser to identify his request for quote |  |  |
|---|---|---|---|---|---|
|  |  |  | Account number |  |  |
| Must Use | BCO03 | 652 | Request Quotation Control Date | M | DT 6/6 |
|  |  |  | Date to be used for reference purposes in an RFQ and a response to RFQ. |  |  |
|  |  |  | Date issued |  |  |
| Must Use | BCO04 | 127 | Reference Number | M | AN 1/30 |
|  |  |  | Reference number or identification number as defined for a particular |  |  |
|  |  |  | Transaction Set, or as specified by the Reference Number Qualifier. |  |  |
|  |  |  | Purchase order number |  |  |
| Must Use | BCO06 | 373 | Date | M | DT 6/6 |
|  |  |  | Date (YYMMDD) |  |  |
|  |  |  | Order due date |  |  |

```
       Segment:  N1 Name
      Position:  021
          Loop:  N1
         Level:
         Usage:  Optional
      Max Use:  1
       Purpose:  To identify a party by type of organization, name, and code
  Syntax Notes:  1   At least one of N102 is required.
Semantic Notes:
      Comments:  1   This segment, used alone, provides the most efficient method of providing
                     organizational identification.
```

Data Element Summary

| | Ref.<br>Des.<br>Attributes | Data<br>Element | Name | | |
|---|---|---|---|---|---|
| Must Use | N101 | 98 | Entity Identifier Code | M | ID 2/2 |
| | | | Code identifying an organizational entity, a physical location, or an individual | | |
| | | | MA    Party for whom Item is Ultimately Intended | | |
| | N102 | 93 | Name | X | AN 1/35 |
| | | | Free-form name | | |
| | | | ZXX | | |

```
       Segment:  REF Reference Numbers
      Position:  025
          Loop:  N1
         Level:
         Usage:  Optional
      Max Use:  >1
       Purpose:  To specify identifying numbers.
  Syntax Notes:  1   At least one of REF02 is required.
Semantic Notes:
      Comments:
```

Data Element Summary

| | Ref.<br>Des.<br>Attributes | Data<br>Element | Name | | |
|---|---|---|---|---|---|
| Must Use | REF01 | 128 | Reference Number Qualifier | M | ID 2/2 |
| | | | Code qualifying the Reference Number. | | |
| Must Use | REF02 | 127 | Reference Number | M | AN 1/30 |
| | | | Reference number or identification number as defined for a particular | | |

45

Transaction Set, or as specified by the Reference Number Qualifier.
* If REF01=11
End user account telephone number

* If REF01=12
Billing account telephone number

* mutually exclusive use

Segment: PO1 Baseline Item Data
Position: 030
Loop: PO1
Level:
Usage: Mandatory
Max Use: 1
Purpose: To specify basic and most frequently used line item data
Syntax Notes:   1   If PO103 is present, then PO102 is required.
               2   If PO106 is present, then PO107 is required.
Semantic Notes:
Comments:   1   PO101 is the line item identification.

Data Element Summary

| | Ref. Des. Attributes | Data Element | Name | | |
|---|---|---|---|---|---|
| Must Use | PO101 | 350 | Assigned Identification | M | AN 1/11 |
| | | | Alphanumeric characters assigned for differentiation within a transaction set Must be equal 1 or higher; do not use 0 | | |
| Must Use | PO102 | 330 | Quantity Ordered | M | R 1/9 |
| | | | Quantity ordered Presently, always 1 | | |
| Must Use | PO103 | 355 | Unit or Basis for Measurement Code | M | ID 2/2 |
| | | | Code specifying the units in which a value is being expressed, or manner in which a measurement has been taken | | |
| | | |     EA            Each | | |
| | PO106 | 235 | Product/Service ID Qualifier | O | ID 2/2 |
| | | | Code identifying the type/source of the descriptive number used in Product/Service ID (234) | | |
| | | |     TY            Telecommunications industry service code | | |
| | PO107 | 234 | Product/Service ID | X | AN 1/30 |
| | | | Identifying number for a product or service | | |
| | | |     PC01         PIC change | | |
| | | |     PC02         LPIC change | | |
| | | |     PC03         Change of both PIC and LPIC | | |

Segment: REF Reference Numbers
Position: 090
Loop: PO1
Level:
Usage: Optional
Max Use: >1
Purpose: To specify identifying numbers.
Syntax Notes:   1   At least one of REF02 is required.
Semantic Notes:
Comments:

46

Data Element Summary

| | Ref. Des. Attributes | Data Element | Name | | |
|---|---|---|---|---|---|
| Must Use | REF01 | 128 | Reference Number Qualifier | M | ID 2/2 |
| | | | Code qualifying the Reference Number. | | |
| | | | 7J      Code for toll billing reference number | | |
| Must Use | REF02 | 127 | Reference Number | M | AN 1/30 |
| | | | Reference number or identification number as defined for a particular Transaction Set, or as specified by the Reference Number Qualifier. | | |
| | | | Telephone number or circuit ID | | |

Segment: N1 Name
Position: 130
Loop: N1
Level:
Usage: Optional
Max Use: 1
Purpose: To identify a party by type of organization, name, and code
Syntax Notes: 1   At least one of N103 is required.
              2   If either N103 or N104 is present, then the other is required.
Semantic Notes:
Comments: 1   This segment, used alone, provides the most efficient method of providing organizational identification.

Data Element Summary

| | Ref. Des. Attributes | Data Element | Name | | |
|---|---|---|---|---|---|
| Must Use | N101 | 98 | Entity Identifier Code | M | ID 2/2 |
| | | | Code identifying an organizational entity, a physical location, or an individual | | |
| | | | IK      Intermediate carrier | | |
| | | | P9     Primary Interexchange Carrier (PIC) | | |
| | | |          Identifies the carrier who will handle the interexchange calls | | |
| | N103 | 66 | Identification Code Qualifier | X | ID 1/2 |
| | | | Code designating the system/method of code structure used for Identification Code (67) | | |
| | | | 41     Telecommunications carrier identification code | | |
| | | |         Identifies the interexchange carrier for the charges being billed | | |
| | N104 | 67 | Identification Code | X | AN 2/17 |
| | | | Code identifying a party or other code | | |
| | | | Value of CIC for interexchange carriers | | |

Segment: SE Transaction Set Trailer
Position: 190
Loop:
Level:
Usage: Mandatory
Max Use: 1
Purpose: To indicate the end of the transaction set and provide the count of the transmitted segments (including the beginning (ST) and ending (SE) segments).
Syntax Notes:
Semantic Notes:

47

Comments: 1 SE is the last segment of each transaction set.

Data Element Summary

| | Ref. Des. Attributes | Data Element | Name | | | |
|---|---|---|---|---|---|---|
| Must Use | SE01 | 96 | Number of Included Segments | | M | N0 1/10 |
| | | | Total number of segments included in a transaction set including ST and SE segments | | | |
| Must Use | SE02 | 329 | Transaction Set Control Number | | M | AN 4/9 |
| | | | Identifying control number that must be unique within the transaction set functional group assigned by the originator for a transaction set | | | |
| | | | Must match value in ST02 | | | |

850 Purchase Order

Functional Group ID=PO

Introduction:

This contains the format and establishes the data contents of the Purchase Order Transaction Set (850) for use within the context of an Electronic Data Interchange (EDI) environment. The transaction set can be used to provide for customary and established business and industry practice relative to the placement of purchase orders for goods and services. This transaction set should not be used to convey purchase order changes or purchase order acknowledgment information.

Heading:

| | Pos. No. | Seg. ID | Name | Req. Des. | Max.Use | Loop Repeat | Notes and Comments |
|---|---|---|---|---|---|---|---|
| Must Use | 010 | ST | Transaction Set Header | M | 1 | | |
| Must Use | 020 | BEG | Beginning Segment for Purchase Order | M | 1 | | |
| Must Use | 050 | REF | Reference Numbers | M | 12 | | |
| | 060 | PER | Administrative Communications Contact | O | 3 | | |
| | 120 | ITA | Allowance, Charge or Service | O | 10 | | |
| | 150 | DTM | Date/Time/Period | O | 10 | | |
| Must Use | 185 | SI | Service Characteristic Identification | M | 2 | | |
| | 190 | PID | Product/Item Description | O | 200 | | |
| | 210 | PWK | Paperwork | O | 25 | | |
| | | | LOOP ID - N1 | | | 200 | |
| Must Use | 310 | N1 | Name | M | 1 | | |
| | 320 | N2 | Additional Name Information | O | 2 | | |
| | 330 | N3 | Address Information | O | 2 | | |
| | 340 | N4 | Geographic Location | O | 1 | | |
| | 345 | NX2 | Real Estate Property ID Component | O | 3 | | |
| | 360 | PER | Administrative Communications Contact | O | 3 | | |

Detail:

| | Pos. No. | Seg. ID | Name | Req. Des. | Max.Use | Loop Repeat | Notes and Comments |
|---|---|---|---|---|---|---|---|
| | | | LOOP ID - PO1 | | | 100000 | |
| Must Use | 010 | PO1 | Baseline Item Data | M | 1 | | n1 |
| Must Use | 018 | SI | Service Characteristic Identification | M | 5 | | |
| | | | LOOP ID - PID | | | 1000 | |

48

| | | | | | |
|---|---|---|---|---|---|
| 050 | PID | Product/Item Description | O | 1 | |
| 100 | REF | Reference Numbers | O | 12 | |
| 110 | PER | Administrative Communications Contact | O | 3 | |
| 210 | DTM | Date/Time/Period | O | 10 | |
| | | LOOP ID - SLN | | | 1000 |
| 470 | SLN | Subline Item Detail | O | 1 | |
| 480 | SI | Service Characteristic Identification | O | 5 | |
| 490 | PID | Product/Item Description | O | 1000 | |
| 520 | DTM | Date/Time/Period | O | 10 | |
| | | LOOP ID - N1 | | | 10 |
| 530 | N1 | Name | O | 1 | |
| 540 | N2 | Additional Name Information | O | 2 | |
| 550 | N3 | Address Information | O | 2 | |
| 560 | N4 | Geographic Location | O | 1 | |
| 570 | NX2 | Real Estate Property ID Component | O | 3 | |
| 590 | PER | Administrative Communications Contact | O | 3 | |

Summary:

| | Pos. No. | Seg. ID | Name | Req. Des. | Max.Use | Loop Repeat | Notes and Comments |
|---|---|---|---|---|---|---|---|
| Must Use | 010 | CTT | Transaction Totals | M | 1 | | n2 |
| Must Use | 030 | SE | Transaction Set Trailer | M | 1 | | |

Transaction Set Notes

1. PO102 is required.
2. The number of line items (CTT01) is the accumulation of the number of PO1 segments.

Segment: ST Transaction Set Header
        Position: 010
        Loop:
        Level: Heading
        Usage: Mandatory
        Max Use: 1
        Purpose: To indicate the start of a transaction set and to assign a control number
        Syntax Notes:
        Semantic Notes:   1  The transaction set identifier (ST01) used by the translation routines of the interchange partners to select the appropriate transaction set definition (e.g., 810 selects the Invoice Transaction Set).

Data Element Summary

| | Ref. Des. Attributes | Data Element | Name | | |
|---|---|---|---|---|---|
| Must Use | ST01 | 143 | Transaction Set Identifier Code | M | ID 3/3 |
| | | | Code uniquely identifying a Transaction Set | | |
| | | |   850        X12.1 purchase order | | |
| Must Use | ST02 | 329 | Transaction Set Control Number | M | AN 4/9 |
| | | | Identifying control number that must be unique within the transaction set functional group assigned by the originator for a transaction set | | |
| | | | Must match value in SE02 | | |

Segment: BEG Beginning Segment for Purchase Order
        Position: 020
        Loop:
        Level: Heading

|  | Usage: | Mandatory |
|---|---|---|
|  | Max Use: | 1 |
|  | Purpose: | To indicate the beginning of the Purchase Order Transaction Set and transmit identifying numbers and dates |

Data Element Summary

| Attributes | Ref. Des. | Data Element | Name | | |
|---|---|---|---|---|---|
| Must Use | BEG01 | 353 | Transaction Set Purpose Code<br>Code identifying purpose of transaction set<br>    00          Original | M | ID 2/2 |
| Must Use | BEG02 | 92 | Purchase Order Type Code<br>Code specifying the type of Purchase Order<br>    SS          Supply or service order<br>    US          Urgent service request | M | ID 2/2 |
| Must Use | BEG03 | 324 | Purchase Order Number<br>Identifying number for Purchase Order assigned by the orderer/purchaser | M | AN 1/22 |
|  | BEG04 | 328 | Release Number<br>Number identifying a release against a Purchase Order previously placed by the parties involved in the transaction<br>Version number must remain below 9000 | O | AN 1/4 |
| Must Use | BEG05 | 323 | Purchase Order Date<br>Date assigned by the purchaser to Purchase Order | M | DT 6/6 |
|  | BEG07 | 587 | Acknowledgment Type<br>Code specifying the type of acknowledgment<br>    AE          Acknowledge with exception detail only | O | ID 2/2 |

|  | Segment: | REF Reference Numbers |
|---|---|---|
|  | Position: | 050 |
|  | Loop: |  |
|  | Level: | Heading |
|  | Usage: | Mandatory |
|  | Max Use: | 12 |
|  | Purpose: | To specify identifying numbers. |
|  | Syntax Notes: | 1    At least one of REF02 is required. |

Data Element Summary

| Attributes | Ref. Des. | Data Element | Name | | |
|---|---|---|---|---|---|
| Must Use | REF01 | 128 | Reference Number Qualifier<br>Code qualifying the Reference Number.<br>    11          Account number<br>                 Number identifies a telecommunications industry account<br>    12          Billing account number<br>                 Account number under which billing is rendered<br>    AN          Associated purchase orders<br>    BB          Authorization Number<br>                 Proves that permission was obtained to provide a service<br>    CO          Related orders<br>    JB          Project code<br>    P3          Reservation number | M | ID 2/2 |
| Must Use | REF02 | 127 | Reference Number<br>Reference number or identification number as defined for a particular Transaction Set, or as specified by the Reference Number Qualifier. | M | AN 1/30 |

```
* If REF01 = 11
End user account telephone number (format=7082482314)

* If REF01 = 12
Billing account telephone number (telecommunication carriers for billing of
unbundled product orders)

If REF01 = AN
Associated Purchase Orders - orders that need to be worked together but not
with the same due date requirement If REF01 = BB
Authorization number If REF01 = CO
Related PON orders - orders that have the same desired due date If REF01 = JB
Project code If REF01 = P3
Reservation number

*mutually exclusive use
```

| | | | |
|---|---|---|---|
| Segment: | PER Administrative Communications Contact | | |
| Position: | 060 | | |
| Loop: | | | |
| Level: | Heading | | |
| Usage: | Optional | | |
| Max Use: | 3 | | |
| Purpose: | To identify a person or office to whom administrative communications should be directed | | |
| Syntax Notes: | 1  If either PER03 or PER04 is present, then the other is required. | | |
| | 2  If either PER05 or PER06 is present, then the other is required. | | |

Data Element Summary

| Attributes | Ref. Des. | Data Element | Name | | | |
|---|---|---|---|---|---|---|
| Must Use | PER01 | 366 | Contact Function Code | | M | ID 2/2 |
| | | | Code identifying the major duty or responsibility of the person or group named | | | |
| | | | DE | Design contact | | |
| | | | SU | Supplier contact | | |
| Must Use | PER02 | 93 | Name | | M | AN 1/35 |
| | | | Free-form name | | | |
| | | | Contact name | | | |
| Must Use | PER03 | 365 | Communication Number Qualifier | | M | ID 2/2 |
| | | | Code identifying the type of communication number | | | |
| | | | FX | Facsimile | | |
| | | | TE | Telephone | | |
| Must Use | PER04 | 364 | Communication Number | | M | AN 1/25 |
| | | | Complete communications number including country or area code when applicable | | | |
| | | | If PER03 = FX | | | |

51

Fax number (format = 2167666740)

If PER03 = TE
Telephone number (format = 2167666740)

| | | | | |
|---|---|---|---|---|
| PER05 | 365 | Communication Number Qualifier | X | ID 2/2 |
| | | Code identifying the type of communication number | | |
| | | FX　　　　　Facsimile | | |
| | | TE　　　　　Telephone | | |
| PER06 | 364 | Communication Number | X | AN 1/25 |
| | | Complete communications number including country or area code when applicable | | |
| | | If PER03 = FX | | |
| | | Fax number (format = 2167666740) | | |

If PER03 = TE
Telephone number (format = 2167666740)

| | |
|---|---|
| Segment: | ITA Allowance, Charge or Service |
| Position: | 120 |
| Loop: | |
| Level: | Heading |
| Usage: | Optional |
| Max Use: | 10 |
| Purpose: | To specify allowances, charges, or services |
| Syntax Notes: | 1　If ITA02 is present, then at least one of ITA03 or ITA14 is required. |
| | 2　If ITA10 is present, then ITA11 is required. |
| Semantic Notes: | 1　ITA12 is the quantity of free goods. |
| Comments: | 1　ITA02 identifies the source of the code value in ITA03. |

Data Element Summary

| | Ref. Des. | Data Element | Name | | |
|---|---|---|---|---|---|
| | Attributes | | | | |
| Must Use | ITA01 | 248 | Allowance or Charge Indicator | M | ID 1/1 |
| | | | Code which indicates an allowance or charge for the service specified | | |
| | | | N　　　　　No Allowance or Charge | | |
| | ITA02 | 559 | Agency Qualifier Code | X | ID 2/2 |
| | | | Code identifying the agency assigning the code values | | |
| | | | TI　　　　　Telecommunications Industry | | |
| | ITA03 | 560 | Special Services Code | X | ID 2/10 |
| | | | Code identifying the special service | | |
| | | | CT　　　　　Count and Recount | | |
| Must Use | ITA04 | 331 | Allowance or Charge Method of Handling Code | M | ID 2/2 |
| | | | Code indicating method of handling for an allowance or charge | | |
| | | | 06　　　　　Charge to be Paid by Customer | | |
| | ITA10 | 339 | Allowance or Charge Quantity | O | R 1/10 |
| | | | Quantity basis when allowance or charge quantity is different from the purchase order or invoice quantity | | |
| | ITA11 | 355 | Unit or Basis for Measurement Code | X | ID 2/2 |
| | | | Code specifying the units in which a value is being expressed, or manner in which a measurement has been taken | | |
| | | | MO　　　　　Months | | |
| | ITA12 | 380 | Quantity | O | R 1/15 |
| | | | Numeric value of quantity | | |
| | ITA14 | 150 | Special Charge or Allowance Code | X | ID 3/3 |
| | | | Code identifying type of special charge or allowance | | |

Segment:　DTM Date/Time/Period

52

```
     Position:  150
         Loop:
        Level:  Heading
        Usage:  Optional
      Max Use:  10
      Purpose:  To specify pertinent dates and times
 Syntax Notes:  1   At least one of DTM02 or DTM03 is required.
```

Data Element Summary

| | Ref. Des. Attributes | Data Element | Name | | |
|---|---|---|---|---|---|
| Must Use | DTM01 | 374 | Date/Time Qualifier<br>Code specifying type of date or time, or both date and time<br>092    Contract Effective<br>150    Service period start (install/change)<br>        Date service requested to start<br>151    Service period end (disconnect)<br>        Date service requested to end | M | ID 3/3 |
| Must Use | DTM02 | 373 | Date<br>Date (YYMMDD)<br>Requested due date | M | DT 6/6 |
| | DTM03 | 337 | Time<br>Time expressed in 24-hour clock time (HHMM)<br>(Time range: 0000 through 2359)<br>0900/AM<br>1300/PM<br>Absence indicates all day<br>Requested due date time (local time to service address) | O | TM 4/6 |
| | DTM05 | 624 | Century<br>The first two characters in the designation of the year<br>19    Century code | O | N0 2/2 |

```
       Segment:  SI Service Characteristic Identification
      Position:  185
          Loop:
         Level:  Heading
         Usage:  Mandatory
       Max Use:  2
       Purpose:  To specify service characteristic data
  Syntax Notes:
Semantic Notes:
      Comments:  1   SI01 defines the source for each of the service characteristics qualifiers.
```

Data Element Summary

| | Ref. Des. Attributes | Data Element | Name | | |
|---|---|---|---|---|---|
| Must Use | SI01 | 559 | Agency Qualifier Code<br>Code identifying the agency assigning the code values<br>TI    Telecommunications industry | M | ID 2/2 |
| Must Use | SI02 | 1000 | Service Characteristics Qualifier<br>Code from an industry code list qualifying the type of service characteristics<br>AA    Account activity code<br>DR    Disconnect reason | M | ID 2/2 |

53

RO      Requested local office
                              SC      Service category code
                              SF      Service features; options
                              TC      Transfer of calls
                              Z4      Mutually defined (prohibit PIC change)
                              Z6      Mutually defined (exchange)
Must Use  SI03      234    Product/Service ID                                M   AN 1/30
                           Identifying number for a product or service If SI02 = AA
                           A/Establish new account
                           C/Change existing account
                           D/Disconnect account
                           T/Outside move
                           V/Assume as specified
                           W/Assume as is If SI02 = DR
                           Disconnect reason
                           UB/Unbundled
                           CO/Competitive
                           NF/No further use
                           SU/Supersede If SI02 = RO
                           Name of requested local office
                           This is required on remote call forwarding and foreign exchange (FX)
                           requests If SI02 = SC
                           Account Class of Service
                           Code values are available through your account manager If SI02=SF
                           RCU/Retain current listing If SI02=TC
                           Telephone number to which calls should be transferred If SI02 = Z4
                           Prohibit PIC Change
                           Y/Yes
                           N/No If SI02 = Z6
                           Exchange value Service Characteristic Qualifier and Product/Service ID may be repeated ten
                           times in segment.

Segment:     PID Product/Item Description
        Position:    190
        Loop:
        Level:       Heading
        Usage:       Optional
        Max Use:     200
        Purpose:     To describe a product or process in coded or free-form format
        Syntax Notes: 1   If PID04 is present, then PID03 is required.

54

|  |  |
|---|---|
| Semantic Notes: | 2 At least one of PID04 or PID05 is required. |
|  | 3 If PID07 is present, then PID03 is required. |
|  | 4 If PID08 is present, then PID03 is required. |
|  | 1 Use PID03 to indicate the organization that publishes the code list being referred to. |
|  | 2 PID04 should be used for industry-specific product description codes. |
|  | 3 PID08 describes the physical characteristics of the product identified in PID04. A "Y" indicates that the specified attribute applies to this item. A "N" indicates it does not apply. Any other value is indeterminate. |
| Comments: | 1 If PID01 = "F", then PID05 is used. If PID01 = "S", then PID04 is used. If PID01 = "X", then both PID04 and PID05 are used. |
|  | 2 Use PID06 when necessary to refer to the product surface or layer being described in the segment. |
|  | 3 PID07 specifies the individual code list of the agency specified in PID03. |

Data Element Summary

| Ref. Des. Attributes | Data Element | Name | | | |
|---|---|---|---|---|---|
| PID01 | 349 | Item Description Type | | M | ID 1/1 |
| | | Code indicating the format of a description | | | |
| | | S | Structured (From Industry Code List) | | |
| | | X | Semi-structured (Code and Text) | | |
| PID03 | 559 | Agency Qualifier Code | | O | ID 2/2 |
| | | Code identifying the agency assigning the code values | | | |
| | | AS | Assigned by Seller | | |
| | | TI | Telecommunications Industry | | |
| PID04 | 751 | Product Description Code | | O | AN 1/12 |
| | | A code from an industry code list which provides specific data about a product characteristic | | | |
| | | ACC | Access instructions | | |
| | | CFA | Connecting facility assignment | | |
| | | DIR | Directory instructions | | |
| | | EXP | Expedite reason | | |
| | | FAC | Facilities available | | |
| | | LOA | Letter of authorization | | |
| | | LP | Associated loop order | | |
| | | ORI | Order instructions | | |
| | | UB | Unbundled order | | |
| PID05 | 352 | Description | | C | AN 1/80 |
| | | A free-form description to clarify the related data elements and their content | | | |
| | | If PID04 = ACC | | | |
| | | Use PID05 for instructions which should be supplied to technician who will do the premises work | | | |
| | | If PID04 = CFA | | | |
| | | Connecting facility assignment | | | |
| | | Use PID05 for supplying CFA information | | | |
| | | If PID04 = DIR | | | |
| | | Use PID04 for directory instructions | | | |
| | | If PID04 = EXP | | | |
| | | Use PID05 for expedite reason | | | |
| | | If PID04 = LOA | | | |

55

Use on end user disconnect for unbundling orders

If PID04 = LP
                              Use with number portability orders

If PID04=OR1
                              Use PID05 for instructions to service center If PID04=UB
                              Unbundling order
         PID07           822  Source Subqualifier                                          O    AN 1/15
                              A reference that indicates the table or text maintained by the Source Qualifier
                                 AMT01           list for PID
         PID08          1073  Yes/No Condition or Response Code                             O    ID 1/1
                              Code indicating a Yes or No condition or response
                              This data element is yes/no response to the PID04 question in a structured
                              PID segment
                                 N              No
                                 Y              Yes Segment:    PWK Paperwork
      Position:   210
          Loop:
         Level:   Heading
         Usage:   Optional
       Max Use:   25
       Purpose:   To identify the type and transmission of paperwork or supporting information
      Comments:
         Notes:   Required on new orders, otherwise prohibited.

Data Element Summary
           Ref.       Data
           Des.     Element   Name
         Attributes
Must Use  PWK01      755      Report Type Code                                              M    ID 2/2
                              Code indicating the title or contents of a document, report or supporting item
                                 DI             Directory
                                                Reports that provide information about a subject,
                                                name, product, etc.
          PWK02      756      Report Transmission Code                                      O    ID 2/2
                              Code defining timing, transmission method or format by which reports are to
                              be sent
                                 BM             By mail
          PWK03      757      Report Copies Needed                                          O    N0 1/2
                              The number of copies of a report that should be sent to the addressee
                              Quantity of directories requested Segment:    N1 Name
      Position:   310
          Loop:   N1
         Level:   Heading
         Usage:   Mandatory
       Max Use:   1
       Purpose:   To identify a party by type of organization, name, and code.
   Syntax Notes:  1   At least one of N102 or N103 is required.
                  2   If either N103 or N104 is present, then the other is required.
   Semantic Notes:

56

| | Comments: | 1 | This segment, used alone, provides the most efficient method of providing organizational identification. To obtain this efficiency the "ID Code" (N104) must provide a key to the table maintained by the transaction processing party. |
| --- | --- | --- | --- |
| | Notes: | | If business account and there is no yellow page listing requested, send 'ZZ' in N101 and 'NONE' in N102 |

Data Element Summary

| | Ref. Des. Attributes | Data Element | Name | | |
| --- | --- | --- | --- | --- | --- |
| Must Use | N101 | 98 | Entity Identifier Code | M | ID 2/2 |
| | | | Code identifying an organizational entity, a physical location, or an individual | | |
| | | | 33 Inquiry address | | |
| | | |     Used to provide a nearby address to actual installation site | | |
| | | | AN Authorization name | | |
| | | |     Name of individual authorizing service | | |
| | | | BT Party to be billed | | |
| | | |     Required on new order | | |
| | | | DA Delivery address | | |
| | | |     On a new order used to show unique delivery address for telephone book delivery | | |
| | | | IT Installation on site (service) | | |
| | | | PS Previous address | | |
| | | |     Used on move order | | |
| | | | X1 Final bill address | | |
| | | |     An address to which a specified item is to be mailed | | |
| | N102 | 93 | Name | O | AN 1/35 |
| | | | Free-form name | | |
| | | | Customer name | | |
| | N103 | 66 | Identification Code Qualifier | O | ID 1/2 |
| | | | Code designating the system/method of code structure used for Identification Code (67) | | |
| | | | Code to indicate correct address but not on street address guide | | |
| | | | 92 Assigned by buyer or buyer's agent | | |
| | | | BE Common Language Location Identification (CLLI) | | |
| | | |     The standard address location code for a specific equipment location as used in the telephone industry | | |
| | | | ZZ Mutually Defined | | |
| | | |     Code to indicate correct address but not on street address guide | | |
| | N104 | 67 | Identification Code | O | AN 2/17 |
| | | | Code identifying a party or other code | | |
| | | | If N103 = 92 | | |
| | | | ACNA | | |
| | | | If N103 = BE | | |
| | | | N104= CLLI code | | |
| | | | If N103 = ZZ | | |
| | | | N104 = ADDR | | |

| Segment: | N2 Additional Name Information |
| --- | --- |
| Position: | 320 |
| Loop: | N1 |
| Level: | Heading |

57

|  | Usage: | Optional | | | |
|---|---|---|---|---|---|
|  | Max Use: | 2 | | | |
|  | Purpose: | To specify additional names or those longer than 35 characters in length | | | |

Data Element Summary

|  | Ref. Des. Attributes | Data Element | Name | | |
|---|---|---|---|---|---|
| Must Use | N201 | 93 | Name<br>Free-form name | M | AN 1/35 |
|  | N202 | 93 | Name<br>Free-form name | O | AN 1/35 |

|  | Segment: | N3 Address Information |
|---|---|---|
|  | Position: | 330 |
|  | Loop: | N1 |
|  | Level: | Heading |
|  | Usage: | Optional |
|  | Max Use: | 2 |
|  | Purpose: | To specify the location of the named party |
|  | Syntax Notes: |  |
|  | Semantic Notes: |  |
|  | Comments: |  |
|  | Notes: | Street address |

Data Element Summary

|  | Ref. Des. Attributes | Data Element | Name | | |
|---|---|---|---|---|---|
| Must Use | N301 | 166 | Address Information<br>Address information<br>Street address | M | AN 1/35 |
|  | N302 | 166 | Address Information<br>Address information<br>Additional address information | O | AN 1/35 |

|  | Segment: | N4 Geographic Location |
|---|---|---|
|  | Position: | 340 |
|  | Loop: | N1 |
|  | Level: | Heading |
|  | Usage: | Optional |
|  | Max Use: | 1 |
|  | Purpose: | To specify the geographic place of the named party |
|  | Syntax Notes: | 1  At least one of N401 is required. |
|  | Semantic Notes: |  |
|  | Comments: | 1  N402 is required only if city name (N401) is in the USA or Canada. |

Data Element Summary

|  | Ref. Des. Attributes | Data Element | Name | | |
|---|---|---|---|---|---|
| Must Use | N401 | 19 | City Name<br>Free-form text for city name | M | AN 2/30 |
| Must Use | N402 | 156 | State or Province Code<br>Code (Standard State) as defined by appropriate government agency | M | ID 2/2 |
| Must Use | N403 | 116 | Postal Code<br>Code defining international postal zone code excluding punctuation and blanks (zip code for United States) | M | ID 3/9 |

58

| Segment: | NX2 Real Estate Property ID Component |
|---|---|
| Position: | 345 |
| Loop: | N1 |
| Level: | Heading |
| Usage: | Optional |
| Max Use: | 3 |
| Purpose: | To define types and values for geographic location of real estate property |
| Syntax Notes: | |
| Semantic Notes: | 1  NX201 defines the type of address component. |
| | 2  NX202 defines the address component identified in NX201. |
| Comments: | |

Data Element Summary

| Ref. Des. Attributes | Data Element | Name | | | |
|---|---|---|---|---|---|
| NX201 | 1106 | Address Component Qualifier | | O | ID 2/2 |
| | | Code qualifying the type of address component | | | |
| | | TCIF values | | | |
| | | 12 | Building name | | |
| | | 13 | Apartment number | | |
| | | 14 | Suite number | | |
| | | 30 | Pier | | |
| | | | The pier at which a ship or boat is docked | | |
| | | 31 | Wing | | |
| | | | The particular wing of a building | | |
| | | 32 | Floor | | |
| | | | A particular floor or level of a building | | |
| | | 33 | Driveway | | |
| | | | The driveway or private road connecting a house, garage, or another building with the street | | |
| | | 34 | Lot | | |
| | | | A particular lot or piece of land | | |
| | | 35 | Room | | |
| | | | A walled room or partitioned area of a building | | |
| | | 36 | Slip | | |
| | | | The slip or location on a pier at which a ship or boat is docked | | |
| | | 37 | Unit | | |
| | | | A unit or separate structure | | |
| NX202 | 166 | Address Information | | O | AN 1/35 |
| | | Address information | | | |
| | | Floor, room, building, etc. | | | |

| Segment: | PER Administrative Communications Contact |
|---|---|
| Position: | 360 |
| Loop: | N1 |
| Level: | Heading |
| Usage: | Optional |
| Max Use: | 3 |
| Purpose: | To identify a person or office to whom administrative communications should be directed |
| Syntax Notes: | 1  If either PER03 or PER04 is present, then the other is required. |
| | 2  If either PER05 or PER06 is present, then the other is required. |

Data Element Summary

Ref.       Data

59

|  | Des. Attributes | Element | Name | | |
|---|---|---|---|---|---|
| Must Use | PER01 | 366 | Contact Function Code<br>Code identifying the major duty or responsibility of the person or group named<br>　　OC　　　　Order contact | M | ID 2/2 |
|  | PER02 | 93 | Name<br>Free-form name<br>Contact name | O | AN 1/35 |
| Must Use | PER03 | 365 | Communication Number Qualifier<br>Code identifying the type of communication number<br>　　FX　　　　Facsimile<br>　　TE　　　　Telephone | M | ID 2/2 |
| Must Use | PER04 | 364 | Communication Number<br>Complete communications number including country or area code when applicable<br>If PER03 = FX<br>Fax number (format = 7082482333)<br><br>If PER03 = TE<br>Telephone number (format = 7082482314) | M | AN 1/25 |
|  | PER05 | 365 | Communication Number Qualifier<br>Code identifying the type of communication number<br>　　FX　　　　Facsimile<br>　　TE　　　　Telephone | X | ID 2/2 |
|  | PER06 | 364 | Communication Number<br>Complete communications number including country or area code when applicable<br>If PER03 = FX<br>Fax number (format = 2167666740)<br><br>If PER03 = TE<br>Telephone number (format = 2167666740) | X | AN 1/25 |

```
     Segment:  PO1 Baseline Item Data
    Position:  010
        Loop:  PO1
       Level:  Detail
       Usage:  Mandatory
     Max Use:  1
     Purpose:  To specify basic and most frequently used line item data
Syntax Notes:  1   If PO103 is present, then PO102 is required.
               2   If PO106 is present, then PO107 is required.
Semantic Notes:
    Comments:  2   PO101 is the line item identification.
```

Data Element Summary

|  | Ref. Des. Attributes | Data Element | Name | | |
|---|---|---|---|---|---|
| Must Use | PO101 | 350 | Assigned Identification<br>Numeric characters assigned for differentiation within a transaction set<br>Line item number; must equal value of 1 or higher; do not use 0 | M | AN 1/3 |
| Must Use | PO102 | 330 | Quantity Ordered<br>Quantity ordered<br>Presently, always 1 | M | R 1/9 |

60

| | | | | | | |
|---|---|---|---|---|---|---|
| Must Use | PO103 | 355 | Unit or Basis for Measurement Code | | M | ID 2/2 |

Code specifying the units in which a value is being expressed, or manner in which a measurement has been taken EA    Each

| | | | | | | |
|---|---|---|---|---|---|---|
| Must Use | PO106 | 235 | Product/Service ID Qualifier | | O | ID 2/2 |

Code identifying the type/source of the descriptive number used in Product/Service ID (234)

TY    Telecommunications industry service code

| | | | | | | |
|---|---|---|---|---|---|---|
| Must Use | PO107 | 234 | Product/Service ID | | O | AN 1/30 |

Identifying number for a product or service

Item Identifier (e.g., Line USOC, HTY, ML, CLT, etc.); see Valid Item Identifier Table later in this section Segment: SI Service Characteristic Identification
       Position: 018
          Loop: PO1
         Level: Detail
        Usage: Optional
      Max Use: 5
      Purpose: To specify service characteristic data
  Syntax Notes:
Semantic Notes:
    Comments:   1    SI01 defines the source for each of the service characteristics qualifiers.

Data Element Summary

| | Ref. Des. Attributes | Data Element | Name | | | |
|---|---|---|---|---|---|---|
| Must Use | SI01 | 559 | Agency Qualifier Code | | M | ID 2/2 |

Code identifying the agency assigning the code values

TI    Telecommunications industry

| | | | | | | |
|---|---|---|---|---|---|---|
| Must Use | SI02 | 1000 | Service Characteristics Qualifier | | M | ID 2/2 |

Code from an industry code list qualifying the type of service characteristics
Need exit routine. Can be up to 10 occurrences of Service Qualifier/Service ID combination.

| Code | Description |
|---|---|
| BN | Billing telephone number |
| CI | Circuit location drop code |
| CK | Code for circuit location code |
| CL | Residence / business listing |
| CN | Code for network provider circuit ID |
| DD | Digits outpulsed |
| DN | Code for directory name |
| FI | Code for facility interface code |
| FS | Foreign serving office |
| LF | Code for line class |
| LN | Code for listed telephone number |
| LO | Serving central office |
| LS | Code for local serving office (required on circuits) |
| NC | Code for network channel code |
| PE | Code for type of pulsing |
| PT | Preassigned telephone number |
| PX | Code for Centrex or DID station |
| RI | Code for route index |
| RO | Foreign serving central office |
| SA | Service activity code |
| SF | Service feature code |
| SG | Service group |

61

|  |  |
|---|---|
| SI | Terminal type |
| T5 | Terminal number |
| TB | Code for call blocking |
| TC | Transfer of calls |
| TH | Code for trunk group number |
| TL | Connecting to CO |
| TN | Code for telephone number |
| TS | Type of signaling |
| WC | Code for wire count |
| Z5 | Dial access code |

Must Use   SI03   234   Product/Service ID   M   AN 1/30
Identifying number for a product or service
If SI02 = BN
Billing telephone number If SI02 = CI
Circuit location drop code If SI02 = CK
Circuit location code (numeric, beginning with 1)

If SI02 = CL
B/business
C/residence

If SI02 = CN
Network provider circuit ID

If SI02 = LO
CLLI code of the serving central office

If SI02 = DD
Digits outpulsed

If SI02 = DN
Name of directory foreign listing is to be in

If SI02 = FI
For OS circuits:
OL13A
OL13B
OL13C
For TL circuits:
TL11M   TL11E
TL12M   TL12E
TL31M   TL31E
TL32M   TL32E
TC31M   TC31E
TC32M   TC32E If SI02 = FS
Foreign serving office NPA-NXX (required on circuits)

If SI02 = LF
Line class code

If SI02 = LN
Listed telephone number

62

If SI02 = LO
Serving central office

If SI02 = LS
Local service office NPA-NXX (required on circuits)

If SI02 = NC
Network channel code

If SI02 = PE
DP/Dial pulse
MF/Multifrequency
DTMF/Dual tone multifrequency

If SI02 = PT
Preassigned telephone number

If SI02 = PX
Centrex station number

If SI02 = RI
Route index

If SI02 = RO
Serving central office

If SI02 = SA
A/Add
C/Change
CF/Change from
CT/Change to
D/Delete
V/Assume as specified
W/Assume as is If SI02 = SF
USOC of feature requested If SI02 = SG
Hunt group number If SI02 = SI
Terminal type (A, B, C, D, E)

If SI02 = TB
A/No collect or third number calls
B/No third number calls accepted
C/No collect calls accepted If SI02 = TC
Telephone number to which calls should be transferred If SI02 = TH
DID trunk group number If SI02 = TL

63

Connecting to CO

If SI02 = TN
Telephone number

If SI02 = TS
DST/Delay dial
GST/Ground start
IST/Immediate dial
LPS/Loop start
WST/Wink start If SI02 = WC
2/2 wire
4/4 wire If SI02 = Z5
Dial access code USOC

| | |
|---|---|
| Segment: | PID Product/Item Description |
| Position: | 050 |
| Loop: | PID |
| Level: | Detail |
| Usage: | Optional |
| Max Use: | 1 |
| Purpose: | To describe a product or process in coded or free-form format |
| Syntax Notes: | 1  If PID04 is present, then PID03 is required. |
| | 2  At least one of PID04 or PID05 is required. |
| | 3  If PID07 is present, then PID03 is required. |
| | 4  If PID08 is present, then PID03 is required. |
| Semantic Notes: | 1  Use PID03 to indicate the organization that publishes the code list being referred to. |
| | 2  PID04 should be used for industry-specific product description codes. |
| | 3  PID08 describes the physical characteristics of the product identified in PID04. A "Y" indicates that the specified attribute applies to this item. A "N" indicates it does not apply. Any other value is indeterminate. |
| Comments: | 1  If PID01 = "F", then PID05 is used. If PID01 = "S", then PID04 is used. If PID01 = "X", then both PID04 and PID05 are used. |
| | 2  PID07 specifies the individual code list of the agency specified in PID03. |

Data Element Summary

| | Ref. Des. Attributes | Data Element | Name | | |
|---|---|---|---|---|---|
| Must Use | PID01 | 349 | Item Description Type | M | ID 1/1 |
| | | | Code indicating the format of a description | | |
| | | | S    Structured (from industry code list) | | |
| | | | X    Semi-structured (code and text) | | |
| Must Use | PID03 | 559 | Agency Qualifier Code | M | ID 2/2 |
| | | | Code identifying the agency assigning the code values | | |
| | | | AS    Assigned by seller | | |
| | | | TI    Telecommunications industry | | |
| Must Use | PID04 | 751 | Product Description Code | M | AN 1/12 |
| | | | A code from an industry code list which provides specific data about a product characteristic | | |
| | | | ACC    Access instructions | | |
| | | | AK    Extended distance | | |

64

|  |  |  | CFA | Connect facility assignment |
|---|---|---|---|---|
|  |  |  | CPE | Text manufacturer and model |
|  |  |  |  | To be used for both text manufacturer and model |
|  |  |  | DIR | Directory instructions |
|  |  |  | EUFT | End user kilofeet maximum |
|  |  |  | ISDN | Point-to-point or multipoint |
|  |  |  | MCPE | EKTS or CACH |
|  |  |  | MIL | Extended mileage |
|  |  |  | ORI | Order instructions |
|  |  |  | OVRFLW | Trunk group number assigned to Prime |
|  |  |  | TRAK | Use of service |

Must Use PID05  352  Description  M  AN 1/80
A free-form description to clarify the related data elements and their content
If PID04 = ACC
Use PID05 for access remarks for multipoint circuits If PID04 = AK
Extended distance If PID04 = CFA
Use PID05 for connect facility assignment If PID04 = CPE
Use PID05 for CPE Manufacturer and model If PID04 = DIR
Use PID05 for directory instructions If PID04 = EUFT
End user kilofeet maximum If PID04 = ISDN
Set PID08 to N to indicate point-to-point
Set PID08 to Y to indicate multipoint If PID04 = MCPE
Use PID05 for:
1/EKTS
2/CACH If PID04 = MIL
Extended mileage If PID04 = ORI
Use PID05 for order remarks If PID04 = OVRFLW
Use PID05 for trunk group overflow If PID04 = TRAK
Use PID05 for FID Must Use PID07  822  Source Subqualifier  M  AN 1/15
A reference that indicates the table or text maintained by the Source Qualifier
 AMT01   list for PID
 SORSQ   Service order resale question PID08  1073  Yes/No Condition or Response Code  O  ID 1/1
Code indicating a Yes or No condition or response
This data element is yes/no response to the PID04 question in a structured

65

|  |  |
|---|---|
| N | No |
| Y | Yes |

Segment: REF Reference Numbers
Position: 100
Loop: PO1
Level: Detail
Usage: Optional
Max Use: 12
Purpose: To specify identifying numbers.
Syntax Notes: 1 At least one of REF02 is required.
Semantic Notes:
Comments:

Data Element Summary

| Ref. Des. Attributes | Data Element | Name | | |
|---|---|---|---|---|
| REF01 | 128 | Reference Number Qualifier | O | ID 2/2 |
| | | Code qualifying the Reference Number. | | |
| | | GP   Government priority number | | |
| | |        Code for telecommunications service priority | | |
| REF02 | 127 | Reference Number | O | AN 1/30 |
| | | Reference number or identification number as defined for a particular Transaction Set, or as specified by the Reference Number Qualifier. | | |
| | | Telecommunications service priority number (TSP123456-E1) | | |

Segment: PER Administrative Communications Contact
Position: 110
Loop: PO1
Level: Detail
Usage: Optional
Max Use: 3
Purpose: To identify a person or office to whom administrative communications should be directed
Syntax Notes: 1 If either PER03 or PER04 is present, then the other is required.
                2 If either PER05 or PER06 is present, then the other is required.

Data Element Summary

| | Ref. Des. Attributes | Data Element | Name | | |
|---|---|---|---|---|---|
| Must Use | PER01 | 366 | Contact Function Code | M | ID 2/2 |
| | | | Code identifying the major duty or responsibility of the person or group named | | |
| | | | CA      Customer contact granting appointment | | |
| | PER02 | 93 | Name | O | AN 1/35 |
| | | | Free-form name | | |
| | | | Contact name | | |
| | PER03 | 365 | Communication Number Qualifier | X | ID 2/2 |
| | | | Code identifying the type of communication number | | |
| | | | FX      Facsimile | | |
| | | | TE      Telephone | | |
| | PER04 | 364 | Communication Number | X | AN 1/25 |
| | | | Complete communications number including country or area code when applicable | | |

|   |   |   |   |   |   |
|---|---|---|---|---|---|
|   |   |   | If PER03 = FX |   |   |
|   |   |   | Fax number (format = 7082482333) |   |   |
|   |   |   |   |   |   |
|   |   |   | If PER03 = TE |   |   |
|   |   |   | Telephone number (format = 7082482314) |   |   |
|   | PER05 | 365 | Communication Number Qualifier | X | ID 2/2 |
|   |   |   | Code identifying the type of communication number |   |   |
|   |   |   |    FX          Facsimile |   |   |
|   |   |   |    TE          Telephone |   |   |
|   | PER06 | 364 | Communication Number | X | AN 1/25 |
|   |   |   | Complete communications number including country or area code when applicable |   |   |
|   |   |   | If PER03 = FX |   |   |
|   |   |   | Fax number (format = 2167666740) |   |   |
|   |   |   |   |   |   |
|   |   |   | If PER03 = TE |   |   |
|   |   |   | Telephone number (format = 2167666740) |   |   |

Segment: DTM Date/Time/Period
Position: 210
Loop: PO1
Level: Detail
Usage: Optional
Max Use: 10
Purpose: To specify pertinent dates and times
Syntax Notes:   1   At least one of DTM02 or DTM03 is required.

Data Element Summary

|   | Ref. Des. Attributes | Data Element | Name |   |   |
|---|---|---|---|---|---|
| Must Use | DTM01 | 374 | Date/Time Qualifier | M | ID 3/3 |
|   |   |   | Code specifying type of date or time, or both date and time |   |   |
|   |   |   | End date for transfer of calls |   |   |
|   |   |   |    376          Delivery end |   |   |
|   |   |   |                  The date that deliveries will end |   |   |
| Must Use | DTM02 | 373 | Date | M | DT 6/6 |
|   |   |   | Date (YYMMDD) |   |   |
|   |   |   | Requested due date |   |   |
|   | DTM03 | 337 | Time | O | TM 4/6 |
|   |   |   | Time expressed in 24-hour clock time (HHMM) |   |   |
|   |   |   | (Time range: 0000 through 2359) |   |   |
|   |   |   | 0900/AM |   |   |
|   |   |   | 1300/PM |   |   |
|   |   |   | Absence indicates all day |   |   |
|   |   |   | Requested due date time (local time to service address) |   |   |
|   | DTM05 | 624 | Century | O | N0 2/2 |
|   |   |   | The first two characters in the designation of the year |   |   |
|   |   |   |    19          Century code |   |   |

Segment: SLN Subline Item Detail
Position: 470
Loop: SLN
Level: Detail
Usage: Optional
Max Use: 1
Purpose: To specify product subline detail item data
Syntax Notes:   1   If SLN09 is present, then SLN10 is required.

67

| | Semantic Notes: | 1 | SLN01 is the identifying number for the subline item. |
| | | 2 | SLN02 is the identifying number for the subline level. The subline level is analogous to the level code used in a bill of materials. |
| | Comments: | 1 | SLN01 is related to (but not necessarily equivalent to) the baseline item number. Example: 1.1 or 1A might be used as a subline number to relate to baseline number 1. |

Data Element Summary

| | Ref. Des. Attributes | Data Element | Name | | |
|---|---|---|---|---|---|
| Must Use | SLN01 | 350 | Assigned Identification<br>Numeric characters assigned for differentiation within a transaction set<br>Same value as line item PO101 | M | AN 1/11 |
| | SLN02 | 350 | Assigned Identification<br>Numeric characters assigned for differentiation within a transaction set<br>Alpha character identifying action number, i.e.<br>A/first action<br>B/second action<br>C/third action | O | AN 1/11 |
| Must Use | SLN03 | 661 | Configuration Code<br>Code indicating the relationship of the subline item to the baseline item.<br>  A    Added<br>  I    Included | M | ID 1/1 |
| Must Use | SLN04 | 380 | Quantity<br>Numeric value of quantity<br>Always 1 | M | R 1/15 |
| Must Use | SLN05 | 355 | Unit or Basis for Measurement Code<br>Code specifying the units in which a value is being expressed, or manner in which a measurement has been taken<br>  EA    Each | M | ID 2/2 |
| | SLN09 | 235 | Product/Service ID Qualifier<br>Code identifying the type/source of the descriptive number used in Product/Service ID (234)<br>  TY    Telecommunications industry service code | O | ID 2/2 |
| | SLN10 | 234 | Product/Service ID<br>Identifying number for a product or service<br>Item identifier, e.g., NLT, NPU, SF8; see Valid Item Identifier Table later in this section | X | AN 1/30 |

| | |
|---|---|
| Segment: | SI Service Characteristic Identification |
| Position: | 480 |
| Loop: | SLN |
| Level: | Detail |
| Usage: | Optional |
| Max Use: | 5 |
| Purpose: | To specify service characteristic data |
| Syntax Notes: | |
| Semantic Notes: | |
| Comments: | 1   SI01 defines the source for each of the service characteristics qualifiers. |

Data Element Summary

| Ref. Des. Attributes | Data Element | Name |
|---|---|---|

68

| | | | | | |
|---|---|---|---|---|---|
| Must Use | SI01 | 559 | Agency Qualifier Code | M | ID 2/2 |

Code identifying the agency assigning the code values
    TI                Telecommunications industry

| | | | | | |
|---|---|---|---|---|---|
| Must Use | SI02 | 1000 | Service Characteristics Qualifier | M | ID 2/2 |

Code from an industry code list qualifying the type of service characteristics
- AT — Code for customer access treatment
- C1 — Channel number
- CK — Code for circuit location
- CN — Code for circuit number
- CQ — Centrex group number
- DD — Digits dialed
- DN — Directory name
- FI — Code for facility interface
- LF — Code for line class
- LN — Listed number
- LS — Local serving office
- NC — Code for network channel
- NI — Code for network channel interface
- PT — Preassigned telephone number
- PX — DID station number
- RI — Code for route index
- SA — Service activity code
- SF — Service feature code
- SM — Speed call number
- T5 — Terminal number
- TB — Code for toll blocking
- TC — Transfer of calls
- TH — Trunk group number
- TN — Telephone number
- TS — Type of signaling

| | | | | | |
|---|---|---|---|---|---|
| Must Use | SI03 | 234 | Product/Service ID | M | AN 1/30 |

Identifying number for a product or service

If SI02 = AT
Customer access treatment

If SI02 = C1
Channel number

If SI02 = CK
Circuit location code

If SI02 = CN
Circuit ID

If SI02 = CQ
Centrex group number

If SI02 = DD
Digits dialed

If SI02 = DN
Code for directory name

If SI02 = FI
For OS circuits:
OL13A
OL13B

69

OL13C
For TL circuits:
TL11M   TL11E
TL12M   TL12E
TL31M   TL31E
TL32M   TL32E
TC31M   TC31E
TC32M   TC32E If SI02 = LF
Line class code If SI02=LN
Listed number If SI02 = LS
Local serving office If SI02 = NC
Network channel code If SI02 = NI
Network channel interface code If SI02 = PT
Preassigned telephone number If SI02 = PX
DID station number If SI02 = R1
Route index If SI02 = SA
A/Add
C/Change
CF/Change from
CT/Change to
D/Delete If SI02 = SF
USOC of Feature requested If SI02 = SM
Speed call number If SI02 = T5
Terminal number of hunt group If SI02 = TB
A/No collect or third number calls
B/No third number calls accepted
C/No collect calls accepted If SI02 = TC
Telephone number calls are to be transferred to or NONE

70

If SI02 = TH
Trunk group number

If SI02 = TN
Telephone number

If SI02 = TS
DST/Delay dial
EM1/E&M I
EM2/E&M II
EM3/E&M III
GST/Ground start
IST/Immediate dial
LPS/Loop start
WST/Wink start In addition to always transmitting an SA Service Activity Code, send additional Service Characteristic Qualifiers and Product/Service IDs as appropriate to customer's order. The combination of Service Characteristic Qualifier and Product/Service ID may be repeated 10 times.

Rules: When transmitting more than one extension number and there is a series of numbers, use a comma with no spaces to separate the entries. If there is a range of number, separate the first and last number with a hyphen.

Example: SI<TI<SA<C<PX<2230,2234,2235-2239 n/l

When using EDI gateway, features are ordered using Universal Service Order Codes, or USOCs. These USOCs are listed in the subline detail in the SI segment following a Service Characteristic Qualifier of SF. The USOCs, which may be found in the Local Exchange Resale Product Catalog, are listed separated by commas. For example, to order 3-Way Calling and Caller ID to be added to an Illinois business line, the SI segment would be:

Example: SI<TI<SA<A<SF<ESC,NSD n/l

In some cases, information in addition to the feature USOC is required. For instance, if Busy Line Transfer is added, a forward-to number is required. This additional information should follow the feature USOC separated by a slash (/) character. To order Busy Line Transfer and Alternate Answer added to a line with different forward-to numbers, the SI segment would be as follows:

Example: SI<TI<SA<A<SF<EVB/3125551212,EVD/3125558888/3 n/l

If the element length is not large enough to accommodate the information required, use a qualifier of 99 followed by the remainder of the information.

Example: SI<TI<SA<A<SF<EVB/3125551212,EVB/3125558888/<99<3 n/l

The USOC section shows those USOCs that require additional information and what information is required when adding a feature or changing the value of a data item associated with the feature, all additional data items must be present in the order shown. When deleting a feature, only the USOC need be listed.

71

| | | |
|---|---|---|
| Segment: | PID Product/Item Description | |
| Position: | 490 | |
| Loop: | SLN | |
| Level: | Detail | |
| Usage: | Optional | |
| Max Use: | 1000 | |
| Purpose: | To describe a product or process in coded or free-form format | |
| Syntax Notes: | 1 | If PID04 is present, then PID03 is required. |
| | 2 | At least one of PID04 or PID05 is required. |
| | 3 | If PID07 is present, then PID03 is required. |
| | 4 | If PID08 is present, then PID03 is required. |
| Semantic Notes: | 1 | Use PID03 to indicate the organization that publishes the code list being referred to. |
| | 2 | PID04 should be used for industry-specific product description codes. |
| | 3 | PID08 describes the physical characteristics of the product identified in PID04. A "Y" indicates that the specified attribute applies to this item. A "N" indicates it does not apply. Any other value is indeterminate. |
| Comments: | 1 | If PID01 = "F", then PID05 is used. If PID01 = "S", then PID04 is used. If PID01 = "X", then both PID04 and PID05 are used. |
| | 2 | Use PID06 when necessary to refer to the product surface or layer being described in the segment. |
| | 3 | PID07 specifies the individual code list of the agency specified in PID03. |

Data Element Summary

| Ref. Des. Attributes | Data Element | Name | | | |
|---|---|---|---|---|---|
| PID01 | 349 | Item Description Type | | O | ID 1/1 |
| | | Code indicating the format of a description | | | |
| | | S | Structured (from industry code list) | | |
| | | X | Semi-structured (code and text) | | |
| PID03 | 559 | Agency Qualifier Code | | O | ID 2/2 |
| | | Code identifying the agency assigning the code values | | | |
| | | AS | Assigned by seller | | |
| | | TI | Telecommunications industry | | |
| PID04 | 751 | Product Description Code | | O | AN 1/12 |
| | | A code from an industry code list which provides specific data about a product characteristic | | | |
| | | ACC | Access instructions | | |
| | | AJ | Assume dial 9 | | |
| | | CALLID | Caller ID | | |
| | | CFA | Connecting facility assignment | | |
| | | COY | GLARE - central office yields | | |
| | | DIDR | DID numbers new or reuse | | |
| | | DIR | Directory instructions | | |
| | | DP | Digits prefixed | | |
| | | DR | Digits received | | |
| | | ORI | Order instructions | | |
| | | SGNL | D channel signaling | | |
| | | STAID | PBX station ID feature | | |
| | | TRHJ | DID trunk hunt sequence | | |
| PID05 | 352 | Description | | O | AN 1/80 |
| | | A free-form description to clarify the related data elements and their content | | | |
| | | If PID04 = ACC | | | |
| | | Use PID05 for access instructions | | | |
| | | | | | |
| | | If PID04 = AJ | | | |

72

Dial 9

If PID04 = CALLID
Use PID08 to indicate Y or N caller ID

If PID04 = CFA
Use PID05 for connecting facility assignment

If PID04 = COY
GLARE - Use PID08 to indicate Y or N if Central Office yields

If PID04 = DIDR
Use PID08 to indicate:
N/new
Y/reuse

If PID04 = DIR
Directory instructions

If PID04 = DP
Use PID05 for digits prefixed

If PID04 = DR
Use PID05 for digits received

If PID04 = ORI
Use PID05 for instructions to service center
If PID04 = SGNL
D channel signaling
If PID04 = STAID
Use PID08 to indicate Y or N PBX station ID feature If PID04 = TRHJ
Use PID05 for:
2WF/ascending
2WB/descending,
MIDL/most idle (DMS only)
LIDL/least idle (DMS only)

| | | | | |
|---|---|---|---|---|
| PID07 | 822 | Source Subqualifier | O | AN 1/15 |

A reference that indicates the table or text maintained by the Source Qualifier
SO-RSQ/Resale questions
    AMT01      list for PID

| | | | | |
|---|---|---|---|---|
| PID08 | 1073 | Yes/No Condition or Response Code | O | ID 1/1 |

Code indicating a Yes or No condition or response
This data element is yes/no response to the PID04 question in a structured PID segment
    N        No
    Y        Yes

Segment: DTM Date/Time/Period
Position: 520
Loop: SLN
Level: Detail
Usage: Optional
Max Use: 10
Purpose: To specify pertinent dates and times
Syntax Notes: 1    At least one of DTM02 or DTM03 is required.

73

Semantic Notes:
Comments:

Data Element Summary

| Ref. Des. Attributes | Data Element | Name | | | |
|---|---|---|---|---|---|
| DTM01 | 374 | Date/Time Qualifier | | O | ID 3/3 |
| | | Code specifying type of date or time, or both date and time | | | |
| | | 376 | Delivery end | | |
| | | | The date that deliveries will end | | |
| | | | End date for transfer of calls | | |
| DTM02 | 373 | Date | | O | DT 6/6 |
| | | Date (YYMMDD) | | | |
| | | Requested due date | | | |
| DTM03 | 337 | Time | | O | TM 4/6 |
| | | Time expressed in 24-hour clock time (HHMM) | | | |
| | | (Time range: 0000 through 2359) | | | |
| | | 0900/AM | | | |
| | | 1300/PM | | | |
| | | Absence indicates all day | | | |
| | | Requested due date time (local time to service address) | | | |
| DTM05 | 624 | Century | | O | N0 2/2 |
| | | The first two characters in the designation of the year | | | |
| | | 19 | Century code | | |

Segment: N1 Name
Position: 530
Loop: N1
Level: Detail
Usage: Optional
Max Use: 1
Purpose: To identify a party by type of organization, name, and code
Syntax Notes: 1 At least one of N102 or N103 is required.
2 If either N103 or N104 is present, then the other is required.
Semantic Notes:
Comments: 1 This segment, used alone, provides the most efficient method of providing organizational identification. To obtain this efficiency the "ID Code" (N104) must provide a key to the table maintained by the transaction processing party.

Data Element Summary

| | Ref. Des. Attributes | Data Element | Name | | | |
|---|---|---|---|---|---|---|
| Must Use | N101 | 98 | Entity Identifier Code | | M | ID 2/2 |
| | | | Code identifying an organizational entity, a physical location, or an individual | | | |
| | | | B4 | Parent company (caption heading) | | |
| | | | | The organizational entity which, by virtue of organization, ownership, and/or management, exercises control over a subordinate but separate business entity | | |
| | | | B5 | Affiliated company (subcaption listing) | | |
| | | | | An organizational entity that shares a business affiliation with another business entity | | |
| | | | C3 | Circuit location identifier | | |
| | | | | Identifies the address information as that which is | | |

74

| | | | | | | |
|---|---|---|---|---|---|---|
| | | | | assigned to a circuit location address | | |
| | | DH | | Doing business as (listing) | | |
| | | DI | | Different premise address (DPA) | | |
| | | | | Provides the different premise address when the associated equipment, or services, or both, are located at an address different from the main address | | |
| | | IK | | Intermediate carrier (LPIC) | | |
| | | IT | | Installation on site (service) | | |
| | | P9 | | Primary Interexchange Carrier (PIC) | | |
| | | | | Identifies the carrier who will handle the interexchange calls | | |
| | | SK | | Secondary Location Address (SLA) | | |
| | | | | Identifies a physical address location in which a telecommunications circuit terminates; this address is in addition to a main service address | | |
| | | TR | | Interexchange carrier address | | |
| | | YE | | Independent telco / third party | | |
| | | ZZ | | Mutually defined (Yellow Pages) | | |
| N102 | 93 | Name | | | O | AN 1/35 |
| | | Free-form name | | | | |
| | | Last name, first name, M.I. (White Page listing) | | | | |
| N103 | 66 | Identification Code Qualifier | | | O | ID 1/2 |
| | | Code designating the system/method of code structure used for Identification Code (67) | | | | |
| | | BE | | Common Language Location Identification (CLLI) | | |
| | | | | The standard address location code for a specific equipment location as used in the telephone industry | | |
| | | ZZ | | Mutually defined | | |
| | | | | Code to indicate correct address but not on street address guide | | |
| N104 | 67 | Identification Code | | | O | AN 2/17 |
| | | Code identifying a party or other code | | | | |
| | | If N103 = BE | | | | |
| | | N104 = CLLI Code | | | | |
| | | | | | | |
| | | If N103 = ZZ | | | | |
| | | N104 = ADDR | | | | |

Segment: N2 Additional Name Information
Position: 540
Loop: N1
Level: Detail
Usage: Optional
Max Use: 2
Purpose: To specify additional names or those longer than 35 characters in length
Syntax Notes:
Semantic Notes:
Comments:
Notes: Title or Titles in order of display. If listing has a designation and no title, populate N201 with 'NONE'.

Data Element Summary

| | Ref. Des. Attributes | Data Element | Name | | | |
|---|---|---|---|---|---|---|
| Must Use | N201 | 93 | Name | | M | AN 1/35 |
| | | | Free-form name | | | |
| | | | Title or titles in order of display | | | |

75

|  | N202 | 93 | Name<br>Free-form name<br>Designation | | O AN 1/35 |

Segment: N3 Address Information
Position: 550
Loop: N1
Level: Detail
Usage: Optional
Max Use: 2
Purpose: To specify the location of the named party

Data Element Summary

| | Ref.<br>Des.<br>Attributes | Data<br>Element | Name | | |
|---|---|---|---|---|---|
| Must Use | N301 | 166 | Address Information<br>Address information<br>Street address | M | AN 1/35 |
| | N302 | 166 | Address Information<br>Address information<br>Additional address information | O | AN 1/35 |

Segment: N4 Geographic Location
Position: 560
Loop: N1
Level: Detail
Usage: Optional
Max Use: 1
Purpose: To specify the geographic place of the named party
Syntax Notes: 1   At least one of N401 is required.
Semantic Notes:
Comments: 1   N402 is required only if city name (N401) is in the USA or Canada.

Data Element Summary

| | Ref.<br>Des.<br>Attributes | Data<br>Element | Name | | |
|---|---|---|---|---|---|
| Must Use | N401 | 19 | City Name<br>Free-form text for city name | M | AN 2/30 |
| Must Use | N402 | 156 | State or Province Code<br>Code (Standard State) as defined by appropriate government agency | M | ID 2/2 |
| Must Use | N403 | 116 | Postal Code<br>Code defining international postal zone code excluding punctuation and blanks (zip code for United States) | M | ID 3/9 |

Segment: NX2 Real Estate Property ID Component
Position: 570
Loop: N1
Level: Detail
Usage: Optional
Max Use: 3
Purpose: To define types and values for geographic location of real estate property
Semantic Notes: 1   NX201 defines the type of address component.
2   NX202 defines the address component identified in NX201.

Data Element Summary

Ref.        Data

|  | Des. Attributes | Element | Name | | |
|---|---|---|---|---|---|
| Must Use | NX201 | 1106 | Address Component Qualifier | M | ID 2/2 |
| | | | Code qualifying the type of address component | | |
| | | | TCIF values | | |
| | | | 12 Building name | | |
| | | | 13 Apartment number | | |
| | | | 14 Suite number | | |
| | | | 30 Pier | | |
| | | |     The pier at which a ship or boat is docked | | |
| | | | 31 Wing | | |
| | | |     The particular wing of a building | | |
| | | | 32 Floor | | |
| | | |     A particular floor or level of a building | | |
| | | | 33 Driveway | | |
| | | |     The driveway or private road connecting a house, garage, or another building with the street | | |
| | | | 34 Lot | | |
| | | |     A particular lot or piece of land | | |
| | | | 35 Room | | |
| | | |     A walled room or partitioned area of a building | | |
| | | | 36 Slip | | |
| | | |     The slip or location on a pier at which a ship or boat is docked | | |
| | | | 37 Unit | | |
| | | |     A unit or separate structure | | |
| Must Use | NX202 | 166 | Address Information | M | AN 1/35 |
| | | | Address information | | |
| | | | Floor, room, building, etc. | | |

Segment: PER Administrative Communications Contact
Position: 590
Loop: N1
Level: Detail
Usage: Optional
Max Use: 3
Purpose: To identify a person or office to whom administrative communications should be directed
Syntax Notes:
1   If either PER03 or PER04 is present, then the other is required.
2   If either PER05 or PER06 is present, then the other is required.

Data Element Summary

|  | Ref. Des. Attributes | Data Element | Name | | |
|---|---|---|---|---|---|
| Must Use | PER01 | 366 | Contact Function Code | M | ID 2/2 |
| | | | Code identifying the major duty or responsibility of the person or group named | | |
| | | | CA     Customer contact granting appointment | | |
| | PER02 | 93 | Name | O | AN 1/35 |
| | | | Free-form name | | |
| | | | Contact name | | |
| | PER03 | 365 | Communication Number Qualifier | X | ID 2/2 |
| | | | Code identifying the type of communication number | | |
| | | | FX     Facsimile | | |
| | | | TE     Telephone | | |
| | PER04 | 364 | Communication Number | X | AN 1/25 |
| | | | Complete communications number including country or area code when | | |

77 applicable
If PER03 = FX
Fax number (format = 2167666740)

If PER03 = TE
Telephone number (format = 2167666740)

| | | | | |
|---|---|---|---|---|
| PER05 | 365 | Communication Number Qualifier | X | ID 2/2 |

Code identifying the type of communication number
FX        Facsimile
TE        Telephone

| | | | | |
|---|---|---|---|---|
| PER06 | 364 | Communication Number | X | AN 1/25 |

Complete communications number including country or area code when applicable
If PER03 = FX
Fax number (format = 2167666740)

If PER03 = TE
Telephone number (format = 2167666740)

Segment: CTT Transaction Totals
Position: 010
Loop:
Level: Summary
Usage: Mandatory
Max Use: 1
Purpose: To transmit a hash total for a specific element in the transaction set
Syntax Notes:
Semantic Notes:
Comments: 1  This segment is intended to provide hash totals to validate transaction completeness and correctness.

Data Element Summary

| Ref. Des. Attributes | Data Element | Name | | |
|---|---|---|---|---|
| Must Use CTT01 | 354 | Number of Line Items | M | N0 1/6 |

Total number of line items in the transaction set

Segment: SE Transaction Set Trailer
Position: 030
Loop:
Level: Summary
Usage: Mandatory
Max Use: 1
Purpose: To indicate the end of the transaction set and provide the count of the transmitted segments (including the beginning (ST) and ending (SE) segments).
Comments: 1  SE is the last segment of each transaction set.

Data Element Summary

| Ref. Des. Attributes | Data Element | Name | | |
|---|---|---|---|---|
| Must Use SE01 | 96 | Number of Included Segments | M | N0 1/10 |

Total number of segments included in a transaction set including ST and SE segments

| | | | | |
|---|---|---|---|---|
| Must Use SE02 | 329 | Transaction Set Control Number | M | AN 4/9 |

Identifying control number that must be unique within the transaction set functional group assigned by the originator for a transaction set
Must match value in ST02

78

855 Purchase Order Acknowledgment

Functional Group ID=PR

Introduction:

This contains the format and establishes the data contents of the Purchase Order Acknowledgment Transaction Set (855) for use within the context of an Electronic Data Interchange (EDI) environment. The transaction set can be used to provide for customary and established business and industry practice relative to a seller's acknowledgment of a buyer's purchase order. This transaction set can also be used as notification of a vendor generated order. This usage advises a buyer that a vendor has or will ship merchandise as prearranged in their partnership.

This transaction set is used to acknowledge and confirm an order received from a customer via the 850 or 860 transaction sets. Only selected segments are listed.

Heading:

|  | Pos. No. | Seg. ID | Name | Req. Des. | Max.Use | Loop Repeat | Notes and Comments |
|---|---|---|---|---|---|---|---|
| Must Use | 010 | ST | Transaction Set Header | M | 1 | | |
| Must Use | 020 | BAK | Beginning Segment for Purchase Order Acknowledgment | M | 1 | | |
| | 050 | REF | Reference Numbers | O | 12 | | |
| | 060 | PER | Administrative Communications Contact | O | 3 | | |
| | 150 | DTM | Date/Time/Period | O | 10 | | |
| | 190 | PID | Product/Item Description | O | 200 | | |
| | | | LOOP ID - N9 | | | 1000 | |
| | 280 | N9 | Reference Number | O | 1 | | |

Detail:

| Pos. No. | Seg. ID | Name | Req. Des. | Max.Use | Loop Repeat | Notes and Comments |
|---|---|---|---|---|---|---|
| | | LOOP ID - PO1 | | | 100000 | |
| 010 | PO1 | Baseline Item Data | O | 1 | | n1 |
| 018 | SI | Service Characteristic Identification | O | 5 | | |
| 100 | REF | Reference Numbers | O | 12 | | |
| 200 | DTM | Date/Time/Period | O | 10 | | |
| | | LOOP ID - N9 | | | 1000 | |
| 350 | N9 | Reference Number | O | 1 | | |
| | | LOOP ID - SLN | | | 1000 | |
| 490 | SLN | Subline Item Detail | O | 1 | | |
| 500 | SI | Service Characteristic Identification | O | 5 | | |

Summary:

|  | Pos. No. | Seg. ID | Name | Req. Des. | Max.Use | Loop Repeat | Notes and Comments |
|---|---|---|---|---|---|---|---|
| Must Use | 010 | CTT | Transaction Totals | M | 1 | | n2 |
| Must Use | 030 | SE | Transaction Set Trailer | M | 1 | | |

Transaction Set Notes

1. PO102 is required.

79

2. The number of line items (CTT01) is the accumulation of the number of PO1 segments.

| | |
|---|---|
| Segment: | ST Transaction Set Header |
| Position: | 010 |
| Loop: | |
| Level: | Heading |
| Usage: | Mandatory |
| Max Use: | 1 |
| Purpose: | To indicate the start of a transaction set and to assign a control number |
| Syntax Notes: | |
| Semantic Notes: | 1  The transaction set identifier (ST01) used by the translation routines of the interchange partners to select the appropriate transaction set definition (e.g., 810 selects the Invoice Transaction Set). |

Data Element Summary

| | Ref. Des. Attributes | Data Element | Name | | |
|---|---|---|---|---|---|
| Must Use | ST01 | 143 | Transaction Set Identifier Code <br> Code uniquely identifying a Transaction Set <br> 855     X12.9 purchase order acknowledgment | M | ID 3/3 |
| Must Use | ST02 | 329 | Transaction Set Control Number <br> Identifying control number that must be unique within the transaction set functional group assigned by the originator for a transaction set <br> Must match value in SE02 | M | AN 4/9 |

| | |
|---|---|
| Segment: | BAK Beginning Segment for Purchase Order Acknowledgment |
| Position: | 020 |
| Loop: | |
| Level: | Heading |
| Usage: | Mandatory |
| Max Use: | 1 |
| Purpose: | To indicate the beginning of the Purchase Order Acknowledgment Transaction Set and transmit identifying numbers and dates |

Data Element Summary

| | Ref. Des. Attributes | Data Element | Name | | |
|---|---|---|---|---|---|
| Must Use | BAK01 | 353 | Transaction Set Purpose Code <br> Code identifying purpose of transaction set <br> 00     Original <br> 05     Replace | M | ID 2/2 |
| Must Use | BAK02 | 587 | Acknowledgment Type <br> Code specifying the type of acknowledgment <br> AE     Acknowledge with exception detail only <br> RD     Reject with detail | M | ID 2/2 |
| Must Use | BAK03 | 324 | Purchase Order Number <br> Identifying number for Purchase Order assigned by the orderer/purchaser | M | AN 1/22 |
| Must Use | BAK04 | 323 | Purchase Order Date <br> Date assigned by the purchaser to purchase order | M | DT 6/6 |
| | BAK05 | 328 | Release Number <br> Number identifying a release against a purchase order previously placed by the parties involved in the transaction <br> Used in response to 850 version (if value is 9000 or greater it is an unsolicited seller initiated 855). Version number must remain below 9000. | O | AN 1/30 |
| | BAK06 | 326 | Request Reference Number <br> Reference number or RFQ number to use to identify a particular transaction | O | AN 1/45 |

80

| | | | | |
|---|---|---|---|---|
| | | set and query (additional reference number or description which can be used with contract number) | | |
| | | Returned as a result of receipt of 860 element BCH05 | | |
| BAK09 | 588 | Acknowledgment Date | O | DT 6/6 |
| | | Date assigned by the sender to the acknowledgment. | | |

Segment: REF Reference Numbers
Position: 050
Loop:
Level: Heading
Usage: Optional
Max Use: 12
Purpose: To specify identifying numbers.
Syntax Notes: 1  At least one of REF02 is required.

Data Element Summary

| Ref. Des. Attributes | Data Element | Name | | |
|---|---|---|---|---|
| Must Use  REF01 | 128 | Reference Number Qualifier | M | ID 2/2 |
| | | Code qualifying the reference number. | | |
| | | 11   Account number | | |
| | |        Number identifies a telecommunications industry account | | |
| | | 12   Billing account | | |
| | |        Account number under which billing is rendered | | |
| | | BB   Authorization number | | |
| | |        Proves that permission was obtained to provide a service | | |
| | | CO   Customer order number | | |
| | | JB   Job (project) number | | |
| | | OW   Service order number | | |
| | |        Number assigned when a customer orders service and equipment and which appears on bill | | |
| | | P3   Reservation number | | |
| Must Use  REF02 | 127 | Reference Number | M | AN 1/30 |
| | | Reference number or identification number as defined for a particular Transaction Set, or as specified by the Reference Number Qualifier. | | |
| | | If REF01=11 | | |
| | | End user account telephone number (format=7082482314) | | |
| | | Mutually exclusive use | | |
| | | | | |
| | | If REF01=12 | | |
| | | Billing account telephone number (telecommunication carriers for billing of unbundled product orders) | | |
| | | Mutually exclusive use | | |
| | | | | |
| | | If REF01 = BB | | |
| | | Authorization number | | |
| | | | | |
| | | If REF01 = CO | | |
| | | Customer order number | | |
| | | | | |
| | | If REF01 = JB | | |
| | | Job (project) number | | |
| | | | | |
| | | If REF01 = OW | | |
| | | service order number | | |

If REF01 = P3
Reservation number

| | | | | | |
|---|---|---|---|---|---|
| Segment: | | PER Administrative Communications Contact | | | |
| Position: | | 060 | | | |
| Loop: | | | | | |
| Level: | | Heading | | | |
| Usage: | | Optional | | | |
| Max Use: | | 3 | | | |
| Purpose: | | To identify a person or office to whom administrative communications should be directed | | | |
| Syntax Notes: | | 1  If either PER03 or PER04 is present, then the other is required. | | | |
| | | 2  If either PER05 or PER06 is present, then the other is required. | | | |

Data Element Summary

| | Ref. Des. Attributes | Data Element | Name | | |
|---|---|---|---|---|---|
| Must Use | PER01 | 366 | Contact Function Code | M | ID 2/2 |
| | | | Code identifying the major duty or responsibility of the person or group named | | |
| | | | SR        sales representative or department | | |
| Must Use | PER02 | 93 | Name | M | AN 1/35 |
| | | | Free-form name | | |
| | | | Contact name | | |
| Must Use | PER03 | 365 | Communication Number Qualifier | M | ID 2/2 |
| | | | Code identifying the type of communication number | | |
| | | | FX        Facsimile | | |
| | | | TE        Telephone | | |
| Must Use | PER04 | 364 | Communication Number | M | AN 1/25 |
| | | | Complete communications number including country or area code when applicable | | |
| | | | If PER03 = FX | | |
| | | | Fax number (format = 7082482314) | | |
| | | | If PER03 = TE | | |
| | | | Telephone number (format = 7082482314) | | |
| | PER05 | 365 | Communication Number Qualifier | X | ID 2/2 |
| | | | Code identifying the type of communication number | | |
| | | | FX        Facsimile | | |
| | | | TE        Telephone | | |
| | PER06 | 364 | Communication Number | X | AN 1/25 |
| | | | Complete communications number including country or area code when applicable | | |
| | | | If PER03 = FX | | |
| | | | Fax number (format = 7082482314) | | |
| | | | If PER03 = TE | | |
| | | | Telephone number (format = 7082482314) | | |

| | |
|---|---|
| Segment: | DTM Date/Time/Period |
| Position: | 150 |
| Loop: | |
| Level: | Heading |
| Usage: | Optional |
| Max Use: | 10 |
| Purpose: | To specify pertinent dates and times |
| Syntax Notes: | 1  At least one of DTM02 or DTM03 is required. |

82

Data Element Summary

| | Ref. Des. Attributes | Data Element | Name | | |
|---|---|---|---|---|---|
| Must Use | DTM01 | 374 | Date/Time Qualifier<br>Code specifying type of date or time, or both date and time<br>   150      Service period start (install/change)<br>              Date service was requested to start<br>   151      Service period end (disconnect)<br>              Date service was requested to end | M | ID 3/3 |
| Must Use | DTM02 | 373 | Date<br>Date (YYMMDD)<br>Assigned due date | M | DT 6/6 |
| | DTM03 | 337 | Time<br>Time expressed in 24-hour clock time (HHMM)<br>(Time range: 0000 through 2359)<br>0900/AM<br>1300/PM<br>Absence indicates all day | O | TM 4/6 |
| | DTM05 | 624 | Century<br>The first two characters in the designation of the year<br>   19      Century code | O | N0 2/2 |

Segment: PID Product/Item Description
Position: 190
Loop:
Level: Heading
Usage: Optional
Max Use: 200
Purpose: To describe a product or process in coded or free-form format
Syntax Notes:
  1  If PID04 is present, then PID03 is required.
  2  At least one of PID04 or PID05 is required.
  3  If PID07 is present, then PID03 is required.
  4  If PID08 is present, then PID03 is required.
Semantic Notes:
  1  Use PID03 to indicate the organization that publishes the code list being referred to.
  2  PID04 should be used for industry-specific product description codes.
  3  PID08 describes the physical characteristics of the product identified in PID04. A "Y" indicates that the specified attribute applies to this item. A "N" indicates it does not apply. Any other value is indeterminate.
Comments:
  1  If PID01 = "F", then PID05 is used. If PID01 = "S", then PID04 is used. If PID01 = "X", then both PID04 and PID05 are used.
  2  Use PID06 when necessary to refer to the product surface or layer being described in the segment.
  3  PID07 specifies the individual code list of the agency specified in PID03.

Data Element Summary

| | Ref. Des. Attributes | Data Element | Name | | |
|---|---|---|---|---|---|
| Must Use | PID01 | 349 | Item Description Type<br>Code indicating the format of a description<br>   S      Structured (from industry code IList)<br>   X      Semi-structured (code and text) | M | ID 1/1 |
| Must Use | PID03 | 559 | Agency Qualifier Code<br>Code identifying the agency assigning the code values<br>   AS     Assigned by seller | M | ID 2/2 |

83

|  |  |  | TI | Telecommunications industry | | |
|---|---|---|---|---|---|---|
| Must Use | PID04 | 751 | Product Description Code | | M | AN 1/12 |

A code from an industry code list which provides specific data about a product characteristic DDR        Due date requested
    PV         Premise visit

|  | PID07 | 822 | Source Subqualifier | O | AN 1/15 |
|---|---|---|---|---|---|

A reference that indicates the table or text maintained by the Source Qualifier

AMT06      See List for PID

|  | PID08 | 1073 | Yes/No Condition or Response Code | O | ID 1/1 |
|---|---|---|---|---|---|

Code indicating a Yes or No condition or response
If PID = DDR
Y/Due Date is the requested due date If PID = PV
Y/Premise visit is required

Segment: N9 Reference Number
     Position: 280
     Loop: N9
     Level: Heading
     Usage: Optional
    Max Use: 1
     Purpose: To transmit identifying numbers and descriptive information as specified by the reference number qualifier
  Syntax Notes: 1  At least one of N902 or N903 is required.
Semantic Notes:
   Comments:

Data Element Summary

| | Ref. Des. Attributes | Data Element | Name | | |
|---|---|---|---|---|---|
| Must Use | N901 | 128 | Reference Number Qualifier | M | ID 2/2 |

Code qualifying the Reference Number.
    R9        Rejection number

| Must Use | N902 | 127 | Reference Number | M | AN 1/30 |
|---|---|---|---|---|---|

Reference number or identification number as defined for a particular Transaction Set, or as specified by the Reference Number Qualifier.

| | N903 | 369 | Free-form Description | O | AN 1/45 |
|---|---|---|---|---|---|

Free-form descriptive text
See Reject Messages in section 6

Segment: PO1 Baseline Item Data
     Position: 010
     Loop: PO1
     Level: Detail
     Usage: Optional
    Max Use: 1
     Purpose: To specify basic and most frequently used line item data
  Syntax Notes: 1  If PO103 is present, then PO102 is required.
Semantic Notes:
   Comments: 1  See the Data Dictionary for a complete list of ID's.
                    2  PO101 is the line item identification.

Data Element Summary

Ref.    Data

84

|  | Des. Attributes | Element | Name | | |
|---|---|---|---|---|---|
| Must Use | PO101 | 350 | Assigned Identification | M | AN 1/3 |
|  |  |  | Alphanumeric characters assigned for differentiation within a transaction set |  |  |
|  |  |  | Line item number of supplier issued purchase order |  |  |
| Must Use | PO102 | 330 | Quantity Ordered | M | R 1/9 |
|  |  |  | Quantity ordered |  |  |
|  |  |  | Quantity associated with line item |  |  |
| Must Use | PO103 | 355 | Unit or Basis for Measurement Code | M | ID 2/2 |
|  |  |  | Code specifying the units in which a value is being expressed, or manner in which a measurement has been taken |  |  |
|  |  |  |     EA          Each |  |  |

| Segment: | SI Service Characteristic Identification |
|---|---|
| Position: | 018 |
| Loop: | PO1 |
| Level: | Detail |
| Usage: | Optional |
| Max Use: | 5 |
| Purpose: | To specify service characteristic data |
| Syntax Notes: |  |
| Semantic Notes: |  |
| Comments: | 1   SI01 defines the source for each of the service characteristics qualifiers. |

Data Element Summary

|  | Ref. Des. Attributes | Data Element | Name | | |
|---|---|---|---|---|---|
| Must Use | SI01 | 559 | Agency Qualifier Code | M | ID 2/2 |
|  |  |  | Code identifying the agency assigning the code values |  |  |
|  |  |  | TI           Telecommunications industry |  |  |
| Must Use | SI02 | 1000 | Service Characteristics Qualifier | M | ID 2/2 |
|  |  |  | Code from an industry code list qualifying the type of service characteristics |  |  |
|  |  |  | CN       Circuit number identification code |  |  |
|  |  |  | CQ       Centrex group number |  |  |
|  |  |  | PX       Code for Centrex station |  |  |
|  |  |  | RI        Code for route index |  |  |
|  |  |  | SG       Hunt group number |  |  |
|  |  |  | SM      Speed call group number |  |  |
|  |  |  | T5        Terminal number |  |  |
|  |  |  | TH       Code for trunk group number |  |  |
|  |  |  | TN       Telephone number |  |  |
|  |  |  | Z2        Customer's temporary placeholder assigned |  |  |
|  |  |  | Z5        Dial access code |  |  |
| Must Use | SI03 | 234 | Product/Service ID | M | AN 1/30 |
|  |  |  | Identifying number for a product or service |  |  |
|  |  |  | Telephone/circuit number/group number, etc. |  |  |
|  |  |  | Service Characteristic Qualifier and Product/Service ID may be repeated ten times in segment. |  |  |

| Segment: | REF Reference Numbers |
|---|---|
| Position: | 100 |
| Loop: | PO1 |
| Level: | Detail |
| Usage: | Optional |
| Max Use: | 12 |
| Purpose: | To specify identifying numbers. |

85

| | Syntax Notes: | | 1 | At least one of REF02 is required. | | |
|---|---|---|---|---|---|---|

Data Element Summary

| | Ref. Des. Attributes | Data Element | Name | | | |
|---|---|---|---|---|---|---|
| Must Use | REF01 | 128 | Reference Number Qualifier | | M | ID 2/2 |
| | | | Code qualifying the Reference Number. | | | |
| | | | OW | Service order number | | |
| | | | | Number assigned when a customer orders service and equipment and which appears on bill | | |
| Must Use | REF02 | 127 | Reference Number | | M | AN 1/30 |
| | | | Reference number or identification number as defined for a particular Transaction Set, or as specified by the Reference Number Qualifier. service order number | | | |

| | Segment: | DTM Date/Time/Period |
|---|---|---|
| | Position: | 200 |
| | Loop: | PO1 |
| | Level: | Detail |
| | Usage: | Optional |
| | Max Use: | 10 |
| | Purpose: | To specify pertinent dates and times |
| | Syntax Notes: | 1  At least one of DTM02 or DTM03 is required. |

Data Element Summary

| | Ref. Des. Attributes | Data Element | Name | | | |
|---|---|---|---|---|---|---|
| Must Use | DTM01 | 374 | Date/Time Qualifier | | M | ID 3/3 |
| | | | Code specifying type of date or time, or both date and time | | | |
| | | | 150 | Service Period Start (install/change) | | |
| | | | | Date service was requested to start | | |
| | | | 151 | Service Period End (disconnect) | | |
| | | | | Date service was requested to end | | |
| Must Use | DTM02 | 373 | Date | | M | DT 6/6 |
| | | | Date (YYMMDD) | | | |
| | DTM03 | 337 | Time | | O | TM 4/6 |
| | | | Time expressed in 24-hour clock time (HHMM) | | | |
| | | | (Time range: 0000 through 2359) | | | |
| | | | 0900/AM | | | |
| | | | 1300/PM | | | |
| | | | Absence indicates all day | | | |
| | DTM05 | 624 | Century | | O | N0 2/2 |
| | | | The first two characters in the designation of the year | | | |
| | | | 19 | Century code | | |

| | Segment: | N9 Reference Number |
|---|---|---|
| | Position: | 350 |
| | Loop: | N9 |
| | Level: | Detail |
| | Usage: | Optional |
| | Max Use: | 1 |
| | Purpose: | To transmit identifying numbers and descriptive information as specified by the reference number qualifier |
| | Syntax Notes: | 1  At least one of N902 or N903 is required. |
| | Semantic Notes: | |
| | Comments: | |

86

Data Element Summary

| | Ref. Des. Attributes | Data Element | Name | | |
|---|---|---|---|---|---|
| Must Use | N901 | 128 | Reference Number Qualifier | M | ID 2/2 |
| | | | Code qualifying the Reference Number. | | |
| | | | R9     Rejection number | | |
| Must Use | N902 | 127 | Reference Number | M | AN 1/30 |
| | | | Reference number or identification number as defined for a particular Transaction Set, or as specified by the Reference Number Qualifier. | | |
| | N903 | 369 | Free-form Description | O | AN 1/45 |
| | | | Free-form descriptive text | | |
| | | | See Rejection Messages section | | |

Segment: SLN Subline Item Detail
Position: 490
Loop: SLN
Level: Detail
Usage: Optional
Max Use: 1
Purpose: To specify product subline detail item data
Syntax Notes: 1   If SLN09 is present, then SLN10 is required.
Semantic Notes: 1   SLN01 is the identifying number for the subline item.
               2   SLN02 is the identifying number for the subline level. The subline level is analogous to the level code used in a bill of materials.
Comments: 1   See the Data Dictionary for a complete list of ID's.
               2   SLN01 is related to (but not necessarily equivalent to) the baseline item number. Example: 1.1 or 1A might be used as a subline number to relate to baseline number 1.

Data Element Summary

| | Ref. Des. Attributes | Data Element | Name | | |
|---|---|---|---|---|---|
| Must Use | SLN01 | 350 | Assigned Identification | M | AN 1/11 |
| | | | Alphanumeric characters assigned for differentiation within a transaction set | | |
| | | | Same value as line item PO101 | | |
| Must Use | SLN02 | 350 | Assigned Identification | M | AN 1/11 |
| | | | Alphanumeric characters assigned for differentiation within a transaction set | | |
| | | | Alpha character identifying action number, i.e. | | |
| | | | A/First action | | |
| | | | B/Second action | | |
| | | | C/Third action | | |
| Must Use | SLN03 | 661 | Configuration Code | M | ID 1/1 |
| | | | Code indicating the relationship of the subline item to the baseline item. | | |
| | | | A     Added | | |
| | | | I     Included | | |
| Must Use | SLN04 | 380 | Quantity | M | R 1/15 |
| | | | Numeric value of quantity | | |
| | | | Quantity of stations (extensions) | | |
| Must Use | SLN05 | 355 | Unit or Basis for Measurement Code | M | ID 2/2 |
| | | | Code specifying the units in which a value is being expressed, or manner in which a measurement has been taken | | |
| | | | EA     Each | | |
| Must Use | SLN09 | 235 | Product/Service ID Qualifier | M | ID 2/2 |
| | | | Code identifying the type/source of the descriptive number used in Product/Service ID (234) | | |

87

| | | | | TY | Telecommunications industry service code | | |
|---|---|---|---|---|---|---|---|
| Must Use | SLN10 | | 234 | Product/Service ID | | M | AN 1/30 |
| | | | | Identifying number for a product or service | | | |
| | | | | Telephone/circuit number/group number, etc. | | | |
| | | | | Item identifier (NLT,NPU) | | | |

Segment: SI Service Characteristic Identification
Position: 500
Loop: SLN
Level: Detail
Usage: Optional
Max Use: 5
Purpose: To specify service characteristic data
Syntax Notes:
Semantic Notes:
Comments: 1  SI01 defines the source for each of the service characteristics qualifiers.

Data Element Summary

| | Ref.<br>Des.<br>Attributes | Data<br>Element | Name | | | | |
|---|---|---|---|---|---|---|---|
| Must Use | SI01 | 559 | Agency Qualifier Code | | | M | ID 2/2 |
| | | | Code identifying the agency assigning the code values | | | | |
| | | | TI | Telecommunications industry | | | |
| Must Use | SI02 | 1000 | Service Characteristics Qualifier | | | M | ID 2/2 |
| | | | Code from an industry code list qualifying the type of service characteristics | | | | |
| | | | CN | Circuit number | | | |
| | | | CQ | Centrex group number | | | |
| | | | PX | DID station number | | | |
| | | | SG | Hunt group number | | | |
| | | | SM | Speed call group number | | | |
| Must Use | SI03 | 234 | Product/Service ID | | | M | AN 1/30 |
| | | | Identifying number for a product or service | | | | |
| | | | Telephone/circuit number/group number, etc. | | | | |
| | | | If SI02=CN | | | | |
| | | | Circuit number | | | | |
| | | | | | | | |
| | | | If SI02=CQ | | | | |
| | | | Centrex group number | | | | |
| | | | | | | | |
| | | | If SI02=PX | | | | |
| | | | DID station | | | | |
| | | | | | | | |
| | | | If SI02=SG | | | | |
| | | | Hunt group number | | | | |
| | | | | | | | |
| | | | If SI02=SM | | | | |
| | | | Speed call group number | | | | |

Segment: CTT Transaction Totals
Position: 010
Loop:
Level: Summary
Usage: Mandatory
Max Use: 1
Purpose: To transmit a hash total for a specific element in the transaction set
Syntax Notes:
Semantic Notes:

Comments: 1 This segment is intended to provide hash totals to validate transaction completeness and correctness.

Data Element Summary

| | Ref. Des. Attributes | Data Element | Name | | |
|---|---|---|---|---|---|
| Must Use | CTT01 | 354 | Number of Line Items<br>Total number of line items in the transaction set | M | N0 1/6 |

Segment: SE Transaction Set Trailer
Position: 030
Loop:
Level: Summary
Usage: Mandatory
Max Use: 1
Purpose: To indicate the end of the transaction set and provide the count of the transmitted segments (including the beginning (ST) and ending (SE) segments).

Data Element Summary

| | Ref. Des. Attributes | Data Element | Name | | |
|---|---|---|---|---|---|
| Must Use | SE01 | 96 | Number of Included Segments<br>Total number of segments included in a transaction set including ST and SE segments | M | N0 1/10 |
| Must Use | SE02 | 329 | Transaction Set Control Number<br>Identifying control number that must be unique within the transaction set functional group assigned by the originator for a transaction set<br>Must match value in ST02 | M | AN 4/9 |

860 Purchase Order Change Request—Buyer Initiated

Functional Group ID=PC

Introduction:

This contains the format and establishes the data contents of the Purchase Order Change Request - Buyer Initiated Transaction Set (860) for use within the context of an Electronic Data Interchange (EDI) environment. The transaction set can be used to provide the information required for the customary and established business and industry practice relative to a purchase order change. This transaction can be used: (1) by a buyer to request a change to a previously submitted purchase order or (2) by a buyer to confirm acceptance of a purchase order change initiated by the seller or by mutual agreement of the two parties.

Notes:

Preferably, the 860 will be used to submit changes. Segments in the header should be sent as they should appear after a change. Changes to the item detail will be sent by replacing the original PO1 segments with the POC segment identified by the same number used on the original request. For example, if you want to add Call Waiting to the line contained in PO103, send the 860 with a POC03 showing the line as it appeared in PO103 with the addition of Call Waiting. The 860 mirrors the 850 in much of the segment and code usage. This section only documents those segments and codes where the two transaction sets differ. If adding a new POC item, use value of CA in BCH02; see 850 documentation for valid values.

89

Heading:

| | Pos. No. | Seg. ID | Name | Req. Des. | Max.Use | Loop Repeat | Notes and Comments |
|---|---|---|---|---|---|---|---|
| Must Use | 010 | ST | Transaction Set Header | M | 1 | | |
| Must Use | 020 | BCH | Beginning Segment for Purchase Order Change | M | 1 | | |
| | 050 | REF | Reference Numbers | O | 12 | | |
| | 060 | PER | Administrative Communications Contact | O | 3 | | |
| | 150 | DTM | Date/Time/Period | O | 10 | | |
| | 185 | SI | Service Characteristic Identification | O | 2 | | |
| | 190 | PID | Product/Item Description | O | 200 | | |
| | 210 | PWK | Paperwork | O | 25 | | |
| | | | LOOP ID - N1 | | | 200 | |
| | 300 | N1 | Name | O | 1 | | |
| | 310 | N2 | Additional Name Information | O | 2 | | |
| | 320 | N3 | Address Information | O | 2 | | |
| | 330 | N4 | Geographic Location | O | 1 | | |
| | 335 | NX2 | Real Estate Property ID Component | O | 3 | | |
| | 350 | PER | Administrative Communications Contact | O | 3 | | |

Detail:

| Pos. No. | Seg. ID | Name | Req. Des. | Max.Use | Loop Repeat | Notes and Comments |
|---|---|---|---|---|---|---|
| | | LOOP ID - POC | | | 10000 | |
| 010 | POC | Line Item Change | O | 1 | | |
| 018 | SI | Service Characteristic Identification | O | 5 | | |
| | | LOOP ID - PID | | | 1000 | |
| 050 | PID | Product/Item Description | O | 1 | | |
| 100 | REF | Reference Numbers | O | 12 | | |
| 110 | PER | Administrative Communications Contact | O | 3 | | |
| 200 | DTM | Date/Time/Period | O | 10 | | |
| | | LOOP ID - SLN | | | 1000 | |
| 460 | SLN | Subline Item Detail | O | 1 | | |
| 470 | SI | Service Characteristic Identification | O | 5 | | |
| 480 | PID | Product/Item Description | O | 1000 | | |
| 510 | DTM | Date/Time/Period | O | 10 | | |
| | | LOOP ID - N1 | | | 10 | |
| 520 | N1 | Name | O | 1 | | |
| 530 | N2 | Additional Name Information | O | 2 | | |
| 540 | N3 | Address Information | O | 2 | | |
| 550 | N4 | Geographic Location | O | 1 | | |
| 560 | NX2 | Real Estate Property ID Component | O | 3 | | |
| 580 | PER | Administrative Communications Contact | O | 3 | | |

Summary:

| | Pos. No. | Seg. ID | Name | Req. Des. | Max.Use | Loop Repeat | Notes and Comments |
|---|---|---|---|---|---|---|---|
| Must Use | 010 | CTT | Transaction Totals | M | 1 | | n1 |
| Must Use | 030 | SE | Transaction Set Trailer | M | 1 | | |

Transaction Set Notes

1. Number of line items (CTT01) is the accumulation of the number of POC segments.

Segment: ST Transaction Set Header
  Position: 010
  Loop:
  Level: Heading
  Usage: Mandatory
  Max Use: 1
  Purpose: To indicate the start of a transaction set and to assign a control number
  Syntax Notes:

90

| | Ref. Des. Attributes | Data Element | Name | | |
|---|---|---|---|---|---|
| | | | Data Element Summary | | |
| Must Use | ST01 | 143 | Transaction Set Identifier Code Code uniquely identifying a Transaction Set  860      X12.15 Purchase Order Change Request - Buyer Initiated | M | ID 3/3 |
| Must Use | ST02 | 329 | Transaction Set Control Number Identifying control number that must be unique within the transaction set functional group assigned by the originator for a transaction set Must match value in SE02 | M | AN 4/9 |

Semantic Notes: 1   The transaction set identifier (ST01) used by the translation routines of the interchange partners to select the appropriate transaction set definition (e.g., 810 selects the Invoice Transaction Set).

Segment: BCH Beginning Segment for Purchase Order Change
Position: 020
Loop:
Level: Heading
Usage: Mandatory
Max Use: 1
Purpose: To indicate the beginning of the Purchase Order Change Transaction Set and transmit identifying numbers and dates
Syntax Notes:
Semantic Notes:
Comments:

Data Element Summary

| | Ref. Des. Attributes | Data Element | Name | | |
|---|---|---|---|---|---|
| Must Use | BCH01 | 353 | Transaction Set Purpose Code Code identifying purpose of transaction set  01      Cancellation  04      Change | M | ID 2/2 |
| Must Use | BCH02 | 92 | Purchase Order Type Code Code specifying the type of Purchase Order  SS      Supply or Service Order | M | ID 2/2 |
| Must Use | BCH03 | 324 | Purchase Order Number Identifying number for Purchase Order assigned by the orderer/purchaser Customer issued original order number | M | AN 1/22 |
| | BCH05 | 327 | Change Order Sequence Number Number assigned by the orderer identifying a specific change or revision to a previously transmitted transaction set 860 version number must remain below 9000 | O | AN 1/4 |
| Must Use | BCH06 | 323 | Purchase Order Date Date assigned by the purchaser to Purchase Order Customer issued original order date | M | DT 6/6 |
| | BCH11 | 279 | Purchase Order Change Request Date Date of the purchase order change request. Date of change order | O | DT 6/6 |

Segment: REF Reference Numbers
Position: 050
Loop:
Level: Heading
Usage: Optional

91

|  |  |  |  |  |  |
|---|---|---|---|---|---|
| Max Use: | 12 | | | | |
| Purpose: | To specify identifying numbers. | | | | |
| Syntax Notes: | 1 At least one of REF02 is required. | | | | |
| Semantic Notes: | | | | | |
| Comments: | | | | | |

Data Element Summary

|  | Ref. Des. Attributes | Data Element | Name | | |
|---|---|---|---|---|---|
| Must Use | REF01 | 128 | Reference Number Qualifier<br>Code qualifying the Reference Number.<br>Refer to 850 transaction set for valid values. | M | ID 2/2 |
|  | REF02 | 127 | Reference Number<br>Reference number or identification number as defined for a particular Transaction Set, or as specified by the Reference Number Qualifier. | X | AN 1/30 |

|  |  |
|---|---|
| Segment: | PER Administrative Communications Contact |
| Position: | 060 |
| Loop: | |
| Level: | Heading |
| Usage: | Optional |
| Max Use: | 3 |
| Purpose: | To identify a person or office to whom administrative communications should be directed |
| Syntax Notes: | 1 If either PER03 or PER04 is present, then the other is required.<br>2 If either PER05 or PER06 is present, then the other is required. |

Data Element Summary

|  | Ref. Des. Attributes | Data Element | Name | | |
|---|---|---|---|---|---|
| Must Use | PER01 | 366 | Contact Function Code<br>Code identifying the major duty or responsibility of the person or group named<br>Refer to 850 transaction set for valid values. | M | ID 2/2 |
|  | PER02 | 93 | Name<br>Free-form name | O | AN 1/35 |
|  | PER03 | 365 | Communication Number Qualifier<br>Code identifying the type of communication number<br>    FX      Facsimile<br>    TE      Telephone | X | ID 2/2 |
|  | PER04 | 364 | Communication Number<br>Complete communications number including country or area code when applicable<br>If PER03=FX<br>Fax number (format=2167666740)<br><br>If PER03=TE<br>Telephone number (format=2166766740) | X | AN 1/25 |
|  | PER05 | 365 | Communication Number Qualifier<br>Code identifying the type of communication number<br>    FX      Facsimile<br>    TE      Telephone | X | ID 2/2 |
|  | PER06 | 364 | Communication Number<br>Complete communications number including country or area code when applicable<br>If PER03=FX | X | AN 1/25 |

92

Fax number (format=2167666740)

If PER03=TE
Telephone number (format=2166766740)

| | |
|---:|:---|
| Segment: | DTM Date/Time/Period |
| Position: | 150 |
| Loop: | |
| Level: | Heading |
| Usage: | Optional |
| Max Use: | 10 |
| Purpose: | To specify pertinent dates and times |
| Syntax Notes: | 1  At least one of DTM02 or DTM03 is required. |
| Semantic Notes: | |
| Comments: | |

Data Element Summary

| | Ref. Des. Attributes | Data Element | Name | | |
|---|---|---|---|---|---|
| Must Use | DTM01 | 374 | Date/Time Qualifier | M | ID 3/3 |
| | | | Code specifying type of date or time, or both date and time | | |
| | | | Refer to value codes in 850 transaction set. | | |
| | | | 193  Period start (install/change) | | |
| | | | 194  Period end (disconnect) | | |
| Must Use | DTM02 | 373 | Date | M | DT 6/6 |
| | | | Date (YYMMDD) | | |
| | | | Requested due date | | |
| | DTM03 | 337 | Time | O | TM 4/6 |
| | | | Time expressed in 24-hour clock time (HHMM) | | |
| | | | (Time range: 0000 through 2359) | | |
| | | | 0900/AM | | |
| | | | 1300/PM | | |
| | | | Absence indicates all day | | |
| | | | Requested due date time | | |
| | DTM05 | 624 | Century | O | N0 2/2 |
| | | | The first two characters in the designation of the year | | |
| | | | 19  Century code | | |

| | |
|---:|:---|
| Segment: | SI Service Characteristic Identification |
| Position: | 185 |
| Loop: | |
| Level: | Heading |
| Usage: | Optional |
| Max Use: | 2 |
| Purpose: | To specify service characteristic data |
| Syntax Notes: | 1  If either SI04 or SI05 is present, then the other is required. |
| | 2  If either SI06 or SI07 is present, then the other is required. |
| | 3  If either SI08 or SI09 is present, then the other is required. |
| | 4  If either SI10 or SI11 is present, then the other is required. |
| | 5  If either SI12 or SI13 is present, then the other is required. |
| | 6  If either SI14 or SI15 is present, then the other is required. |
| | 7  If either SI16 or SI17 is present, then the other is required. |
| | 8  If either SI18 or SI19 is present, then the other is required. |
| | 9  If either SI20 or SI21 is present, then the other is required. |

Data Element Summary

Ref.  Data

|  | Des. Attributes | Element | Name | | |
|---|---|---|---|---|---|
| Must Use | SI01 | 559 | Agency Qualifier Code<br>Code identifying the agency assigning the code values<br>Refer to 850 transaction set for valid values. | M | ID 2/2 |
| Must Use | SI02 | 1000 | Service Characteristics Qualifier<br>Code from an industry code list qualifying the type of service characteristics | M | ID 2/2 |
| Must Use | SI03 | 234 | Product/Service ID<br>Identifying number for a product or service | M | AN 1/30 |
|  | SI04 | 1000 | Service Characteristics Qualifier<br>Code from an industry code list qualifying the type of service characteristics | O | ID 2/2 |
|  | SI05 | 234 | Product/Service ID<br>Identifying number for a product or service | O | AN 1/30 |
|  | SI06 | 1000 | Service Characteristics Qualifier<br>Code from an industry code list qualifying the type of service characteristics | O | ID 2/2 |
|  | SI07 | 234 | Product/Service ID<br>Identifying number for a product or service | O | AN 1/30 |
|  | SI08 | 1000 | Service Characteristics Qualifier<br>Code from an industry code list qualifying the type of service characteristics | O | ID 2/2 |
|  | SI09 | 234 | Product/Service ID<br>Identifying number for a product or service | O | AN 1/30 |
|  | SI10 | 1000 | Service Characteristics Qualifier<br>Code from an industry code list qualifying the type of service characteristics | O | ID 2/2 |
|  | SI11 | 234 | Product/Service ID<br>Identifying number for a product or service | O | AN 1/30 |
|  | SI12 | 1000 | Service Characteristics Qualifier<br>Code from an industry code list qualifying the type of service characteristics | O | ID 2/2 |
|  | SI13 | 234 | Product/Service ID<br>Identifying number for a product or service | O | AN 1/30 |
|  | SI14 | 1000 | Service Characteristics Qualifier<br>Code from an industry code list qualifying the type of service characteristics | O | ID 2/2 |
|  | SI15 | 234 | Product/Service ID<br>Identifying number for a product or service | O | AN 1/30 |
|  | SI16 | 1000 | Service Characteristics Qualifier<br>Code from an industry code list qualifying the type of service characteristics | O | ID 2/2 |
|  | SI17 | 234 | Product/Service ID<br>Identifying number for a product or service | O | AN 1/30 |
|  | SI18 | 1000 | Service Characteristics Qualifier<br>Code from an industry code list qualifying the type of service characteristics | O | ID 2/2 |
|  | SI19 | 234 | Product/Service ID<br>Identifying number for a product or service | O | AN 1/30 |
|  | SI20 | 1000 | Service Characteristics Qualifier<br>Code from an industry code list qualifying the type of service characteristics | O | ID 2/2 |
|  | SI21 | 234 | Product/Service ID<br>Identifying number for a product or service | O | AN 1/30 |

94

| | | | | |
|---|---|---|---|---|
| Segment: | PID Product/Item Description | | | |
| Position: | 190 | | | |
| Loop: | | | | |
| Level: | Heading | | | |
| Usage: | Optional | | | |
| Max Use: | 200 | | | |
| Purpose: | To describe a product or process in coded or free-form format | | | |
| Syntax Notes: | 1 If PID04 is present, then PID03 is required. | | | |
| | 2 At least one of PID04 or PID05 is required. | | | |
| | 3 If PID07 is present, then PID03 is required. | | | |
| | 4 If PID08 is present, then PID03 is required. | | | |
| Semantic Notes: | 1 Use PID03 to indicate the organization that publishes the code list being referred to. | | | |
| | 2 PID04 should be used for industry-specific product description codes. | | | |
| | 3 PID08 describes the physical characteristics of the product identified in PID04. A "Y" indicates that the specified attribute applies to this item. A "N" indicates it does not apply. Any other value is indeterminate. | | | |
| Comments: | 1 If PID01 = "F", then PID05 is used. If PID01 = "S", then PID04 is used. If PID01 = "X", then both PID04 and PID05 are used. | | | |
| | 2 Use PID06 when necessary to refer to the product surface or layer being described in the segment. | | | |
| | 3 PID07 specifies the individual code list of the agency specified in PID03. | | | |

Data Element Summary

| | Ref. Des. Attributes | Data Element | Name | | |
|---|---|---|---|---|---|
| Must Use | PID01 | 349 | Item Description Type<br>Code indicating the format of a description<br>Refer to 850 transaction set for valid values. | M | ID 1/1 |
| | PID02 | 750 | Product/Process Characteristic Code<br>Code identifying the general class of a product or process characteristic<br>Refer to 850 transaction set for valid values. | O | ID 2/3 |
| | PID03 | 559 | Agency Qualifier Code<br>Code identifying the agency assigning the code values<br>Refer to 850 transaction set for valid values. | O | ID 2/2 |
| | PID04 | 751 | Product Description Code<br>A code from an industry code list which provides specific data about a product characteristic | O | AN 1/12 |
| | PID05 | 352 | Description<br>A free-form description to clarify the related data elements and their content | O | AN 1/80 |
| | PID06 | 752 | Surface/Layer/Position Code<br>Code indicating the product surface, layer or position that is being described<br>Refer to 850 transaction set for valid values. | O | ID 2/2 |
| | PID07 | 822 | Source Subqualifier<br>A reference that indicates the table or text maintained by the Source Qualifier | O | AN 1/15 |
| | PID08 | 1073 | Yes/No Condition or Response Code<br>Code indicating a Yes or No condition or response<br>This data element is yes/no response to the PID04 question in a structured PID segment<br>  N    No<br>  Y    Yes | O | ID 1/1 |

| | |
|---|---|
| Segment: | PWK Paperwork |
| Position: | 210 |
| Loop: | |
| Level: | Heading |
| Usage: | Optional |

95

|  |  |
|---|---|
| Max Use: | 25 |
| Purpose: | To identify the type and transmission of paperwork or supporting information |
| Syntax Notes: | 1  If either PWK05 or PWK06 is present, then the other is required. |
| Semantic Notes: | |
| Comments: | 1  PWK05 and PWK06 may be used to identify the addressee by a code number. |
|  | 2  PWK07 may be used to indicate special information to be shown on the specified report. |
|  | 3  PWK08 may be used to indicate action pertaining to a report. |

Data Element Summary

| | Ref. Des. Attributes | Data Element | Name | | |
|---|---|---|---|---|---|
| Must Use | PWK01 | 755 | Report Type Code | M | ID 2/2 |
| | | | Code indicating the title or contents of a document, report or supporting item | | |
| | | | Refer to 850 transaction set for valid values. | | |
| | PWK02 | 756 | Report Transmission Code | O | ID 2/2 |
| | | | Code defining timing, transmission method or format by which reports are to be sent | | |
| | | | Refer to 850 transaction set for valid values. | | |
| | PWK03 | 757 | Report Copies Needed | O | N0 1/2 |
| | | | The number of copies of a report that should be sent to the addressee | | |
| | PWK04 | 98 | Entity Identifier Code | O | ID 2/2 |
| | | | Code identifying an organizational entity, a physical location, or an individual | | |
| | | | Refer to 850 transaction set for valid values. | | |
| | PWK05 | 66 | Identification Code Qualifier | O | ID 1/2 |
| | | | Code designating the system/method of code structure used for Identification Code (67) | | |
| | | | Refer to 850 transaction set for valid values. | | |
| | PWK06 | 67 | Identification Code | O | AN 2/17 |
| | | | Code identifying a party or other code | | |
| | PWK07 | 352 | Description | O | AN 1/80 |
| | | | A free-form description to clarify the related data elements and their content | | |
| | PWK08 | 704 | Paperwork/Report Action Code | O | ID 1/2 |
| | | | Code specifying how the paperwork or report that is identified in the PWK segment relates to the transaction set or to identify the action that is required | | |
| | | | Refer to 850 transaction set for valid values. | | |

|  |  |
|---|---|
| Segment: | N1 Name |
| Position: | 300 |
| Loop: | N1 |
| Level: | Heading |
| Usage: | Optional |
| Max Use: | 1 |
| Purpose: | To identify a party by type of organization, name, and code |
| Syntax Notes: | 1  At least one of N102 or N103 is required. |
|  | 2  If either N103 or N104 is present, then the other is required. |
| Semantic Notes: | |
| Comments: | 1  This segment, used alone, provides the most efficient method of providing organizational identification. To obtain this efficiency the "ID Code" (N104) must provide a key to the table maintained by the transaction processing party. |

Data Element Summary

96

|  | Ref.<br>Des.<br>Attributes | Data<br>Element | Name | | |
|---|---|---|---|---|---|
| Must Use | N101 | 98 | Entity Identifier Code<br>Code identifying an organizational entity, a physical location, or an individual<br>Refer to 850 transaction set for valid values. | M | ID 2/2 |
|  | N102 | 93 | Name<br>Free-form name | X | AN 1/35 |
|  | N103 | 66 | Identification Code Qualifier<br>Code designating the system/method of code structure used for Identification Code (67)<br>Refer to 850 transaction set for valid values. | X | ID 1/2 |
|  | N104 | 67 | Identification Code<br>Code identifying a party or other code | X | AN 2/17 |

Segment: N2 Additional Name Information
Position: 310
Loop: N1
Level: Heading
Usage: Optional
Max Use: 2
Purpose: To specify additional names or those longer than 35 characters in length
Syntax Notes:
Semantic Notes:
Comments:

Data Element Summary

|  | Ref.<br>Des.<br>Attributes | Data<br>Element | Name | | |
|---|---|---|---|---|---|
| Must Use | N201 | 93 | Name<br>Free-form name | M | AN 1/35 |
|  | N202 | 93 | Name<br>Free-form name | O | AN 1/35 |

Segment: N3 Address Information
Position: 320
Loop: N1
Level: Heading
Usage: Optional
Max Use: 2
Purpose: To specify the location of the named party Data Element Summary

|  | Ref.<br>Des.<br>Attributes | Data<br>Element | Name | | |
|---|---|---|---|---|---|
| Must Use | N301 | 166 | Address Information<br>Address information | M | AN 1/35 |
|  | N302 | 166 | Address Information<br>Address information | O | AN 1/35 |

Segment: N4 Geographic Location
Position: 330
Loop: N1
Level: Heading

97

| | | | | | |
|---|---|---|---|---|---|
| Usage: | Optional | | | | |
| Max Use: | 1 | | | | |
| Purpose: | To specify the geographic place of the named party | | | | |
| Syntax Notes: | 1 At least one of N401 is required. | | | | |
| Semantic Notes: | | | | | |
| Comments: | 1 N402 is required only if city name (N401) is in the USA or Canada. | | | | |

Data Element Summary

| Ref. Des. Attributes | Data Element | Name | | | |
|---|---|---|---|---|---|
| N401 | 19 | City Name | | X | AN 2/30 |
| | | Free-form text for city name | | | |
| N402 | 156 | State or Province Code | | O | ID 2/2 |
| | | Code (Standard State) as defined by appropriate government agency | | | |
| N403 | 116 | Postal Code | | O | ID 3/9 |
| | | Code defining international postal zone code excluding punctuation and blanks (zip code for United States) | | | |

| | |
|---|---|
| Segment: | NX2 Real Estate Property ID Component |
| Position: | 335 |
| Loop: | N1 |
| Level: | Heading |
| Usage: | Optional |
| Max Use: | 3 |
| Purpose: | To define types and values for geographic location of real estate property |
| Syntax Notes: | |
| Semantic Notes: | 1 NX201 defines the type of address component. |
| | 2 NX202 defines the address component identified in NX201. |
| Comments: | |

Data Element Summary

| | Ref. Des. Attributes | Data Element | Name | | | |
|---|---|---|---|---|---|---|
| Must Use | NX201 | 1106 | Address Component Qualifier | | M | ID 2/2 |
| | | | Code qualifying the type of address component | | | |
| | | | 12 | Building name | | |
| | | | 13 | Apartment number | | |
| | | | 14 | Suite number | | |
| | | | 30 | Pier | | |
| | | | | The pier at which a ship or boat is docked | | |
| | | | 31 | Wing | | |
| | | | | The particular wing of a building | | |
| | | | 32 | Floor | | |
| | | | | A particular floor or level of a building | | |
| | | | 33 | Driveway | | |
| | | | | The driveway or private road connecting a house, garage, or another building with the street | | |
| | | | 34 | Lot | | |
| | | | | A particular lot or piece of land | | |
| | | | 35 | Room | | |
| | | | | A walled room or partitioned area of a building | | |
| | | | 36 | Slip | | |
| | | | | The slip or location on a pier at which a ship or boat is docked | | |

98

|  |  | 37 | Unit | | |
|---|---|---|---|---|---|
|  |  |  | A unit or separate structure | | |
| Must Use | NX202 | 166 | Address Information | M | AN 1/35 |
|  |  |  | Address information | | |

| | | |
|---|---|---|
| Segment: | PER Administrative Communications Contact | |
| Position: | 350 | |
| Loop: | N1 | |
| Level: | Heading | |
| Usage: | Optional | |
| Max Use: | 3 | |
| Purpose: | To identify a person or office to whom administrative communications should be directed | |
| Syntax Notes: | 1 If either PER03 or PER04 is present, then the other is required. | |
|  | 2 If either PER05 or PER06 is present, then the other is required. | |
| Semantic Notes: | | |
| Comments: | | |

Data Element Summary

| | Ref. Des. Attributes | Data Element | Name | | |
|---|---|---|---|---|---|
| Must Use | PER01 | 366 | Contact Function Code | M | ID 2/2 |
|  |  |  | Code identifying the major duty or responsibility of the person or group named | | |
|  |  |  | Refer to 850 transaction set for valid values. | | |
|  | PER02 | 93 | Name | O | AN 1/35 |
|  |  |  | Free-form name | | |
|  | PER03 | 365 | Communication Number Qualifier | X | ID 2/2 |
|  |  |  | Code identifying the type of communication number | | |
|  |  |  |    FX       Facsimile | | |
|  |  |  |    TE       Telephone | | |
|  | PER04 | 364 | Communication Number | X | AN 1/25 |
|  |  |  | Complete communications number including country or area code when applicable | | |
|  |  |  | If PER03 = FX | | |
|  |  |  | Fax number (format = 2167666740) | | |
|  |  |  | If PER03 = TE | | |
|  |  |  | Telephone number (format = 2166766740) | | |
|  | PER05 | 365 | Communication Number Qualifier | X | ID 2/2 |
|  |  |  | Code identifying the type of communication number | | |
|  |  |  |    FX       Facsimile | | |
|  |  |  |    TE      Telephone | | |
|  | PER06 | 364 | Communication Number | X | AN 1/25 |
|  |  |  | Complete communications number including country or area code when applicable | | |
|  |  |  | If PER03 = FX | | |
|  |  |  | Fax number (format = 2167666740) | | |
|  |  |  | If PER03 = TE | | |
|  |  |  | Telephone number (format = 2166766740) | | |

| | |
|---|---|
| Segment: | POC Line Item Change |
| Position: | 010 |
| Loop: | POC |
| Level: | Detail |

Usage: Optional
Max Use: 1
Purpose: To specify changes to a line item
Syntax Notes: 
1. If POC03 is present, then both POC04 and POC05 are required.
3. If POC08 is present, then POC09 is required.

Semantic Notes: 1 POC01 is the purchase order line item identification.
Comments:

Data Element Summary

| Ref. Des. Attributes | Data Element | Name | | |
|---|---|---|---|---|
| POC01 | 350 | Assigned Identification<br>Alphanumeric characters assigned for differentiation within a transaction set<br>Line item number to be changed; i.e., if change is in PO1<2 of original order then POC is 2 | O | AN 1/3 |
| POC02 | 670 | Change or Response Type Code<br>Code specifying the type of change to the line item<br>  CA    Changes to line items<br>          To be used to add a new line item<br>  DI    Delete item(s)<br>  RE    Replacement item | O | ID 2/2 |
| POC03 | 330 | Quantity Ordered<br>Quantity ordered<br>Presently, always 1 | O | R 1/9 |
| POC04 | 671 | Quantity Left to Receive<br>Quantity left to receive as qualified by the unit of measure<br>Presently, always 1 | O | R 1/9 |
| POC05 | 355 | Unit or Basis for Measurement Code<br>Code specifying the units in which a value is being expressed, or manner in which a measurement has been taken<br>  EA    Each | O | ID 2/2 |
| Must Use POC08 | 235 | Product/Service ID Qualifier<br>Code identifying the type/source of the descriptive number used in Product/Service ID (234)<br>  TY    Telecommunications industry service code | M | ID 2/2 |
| Must Use POC09 | 234 | Product/Service ID<br>Identifying number for a product or service<br>Item identifier (e.g., Line USOC, HML). See Valid Item Identifier Table later in this section | M | AN 1/30 |

Segment: SI Service Characteristic Identification
Position: 018
Loop: POC
Level: Detail
Usage: Optional
Max Use: 5
Purpose: To specify service characteristic data
Syntax Notes:
1. If either SI04 or SI05 is present, then the other is required.
2. If either SI06 or SI07 is present, then the other is required.
3. If either SI08 or SI09 is present, then the other is required.
4. If either SI10 or SI11 is present, then the other is required.
5. If either SI12 or SI13 is present, then the other is required.
6. If either SI14 or SI15 is present, then the other is required.
7. If either SI16 or SI17 is present, then the other is required.
8. If either SI18 or SI19 is present, then the other is required.
9. If either SI20 or SI21 is present, then the other is required.

100

Semantic Notes:
Comments: 1  SI01 defines the source for each of the service characteristics qualifiers.

Data Element Summary

| | Ref. Des. Attributes | Data Element | Name | | |
|---|---|---|---|---|---|
| Must Use | SI01 | 559 | Agency Qualifier Code<br>Code identifying the agency assigning the code values<br>Refer to 850 transaction set for valid values. | M | ID 2/2 |
| Must Use | SI02 | 1000 | Service Characteristics Qualifier<br>Code from an industry code list qualifying the type of service characteristics | M | ID 2/2 |
| Must Use | SI03 | 234 | Product/Service ID<br>Identifying number for a product or service | M | AN 1/30 |
| | SI04 | 1000 | Service Characteristics Qualifier<br>Code from an industry code list qualifying the type of service characteristics | X | ID 2/2 |
| | SI05 | 234 | Product/Service ID<br>Identifying number for a product or service | X | AN 1/30 |
| | SI06 | 1000 | Service Characteristics Qualifier<br>Code from an industry code list qualifying the type of service characteristics | X | ID 2/2 |
| | SI07 | 234 | Product/Service ID<br>Identifying number for a product or service | X | AN 1/30 |
| | SI08 | 1000 | Service Characteristics Qualifier<br>Code from an industry code list qualifying the type of service characteristics | X | ID 2/2 |
| | SI09 | 234 | Product/Service ID<br>Identifying number for a product or service | X | AN 1/30 |
| | SI10 | 1000 | Service Characteristics Qualifier<br>Code from an industry code list qualifying the type of service characteristics | X | ID 2/2 |
| | SI11 | 234 | Product/Service ID<br>Identifying number for a product or service | X | AN 1/30 |
| | SI12 | 1000 | Service Characteristics Qualifier<br>Code from an industry code list qualifying the type of service characteristics | X | ID 2/2 |
| | SI13 | 234 | Product/Service ID<br>Identifying number for a product or service | X | AN 1/30 |
| | SI14 | 1000 | Service Characteristics Qualifier<br>Code from an industry code list qualifying the type of service characteristics | X | ID 2/2 |
| | SI15 | 234 | Product/Service ID<br>Identifying number for a product or service | X | AN 1/30 |
| | SI16 | 1000 | Service Characteristics Qualifier<br>Code from an industry code list qualifying the type of service characteristics | X | ID 2/2 |
| | SI17 | 234 | Product/Service ID<br>Identifying number for a product or service | X | AN 1/30 |
| | SI18 | 1000 | Service Characteristics Qualifier<br>Code from an industry code list qualifying the type of service characteristics | X | ID 2/2 |
| | SI19 | 234 | Product/Service ID<br>Identifying number for a product or service | X | AN 1/30 |
| | SI20 | 1000 | Service Characteristics Qualifier<br>Code from an industry code list qualifying the type of service characteristics | X | ID 2/2 |
| | SI21 | 234 | Product/Service ID<br>Identifying number for a product or service | X | AN 1/30 |

Segment: PID Product/Item Description
Position: 050
Loop: PID
Level: Detail
Usage: Optional
Max Use: 1

101

| | Purpose: | To describe a product or process in coded or free-form format |
|---|---|---|
| | Syntax Notes: | 1 If PID04 is present, then PID03 is required. |
| | | 2 At least one of PID04 or PID05 is required. |
| | Semantic Notes: | 1 Use PID03 to indicate the organization that publishes the code list being referred to. |
| | | 2 PID04 should be used for industry-specific product description codes. |
| | | 3 |
| | Comments: | 1 If PID01 = "F", then PID05 is used. If PID01 = "S", then PID04 is used. If PID01 = "X", then both PID04 and PID05 are used. |
| | | 2 Use PID06 when necessary to refer to the product surface or layer being described in the segment. |

Data Element Summary

| | Ref. Des. Attributes | Data Element | Name | | | |
|---|---|---|---|---|---|---|
| Must Use | PID01 | 349 | Item Description Type Code indicating the format of a description Refer to 850 transaction set for valid values. | M | ID 1/1 |
| | PID02 | 750 | Product/Process Characteristic Code Code identifying the general class of a product or process characteristic Refer to 850 transaction set for valid values. | O | ID 2/3 |
| | PID03 | 559 | Agency Qualifier Code Code identifying the agency assigning the code values Refer to 850 transaction set for valid values. | X | ID 2/2 |
| | PID04 | 751 | Product Description Code A code from an industry code list which provides specific data about a product characteristic | X | AN 1/12 |
| | PID05 | 352 | Description A free-form description to clarify the related data elements and their content | X | AN 1/80 |
| | PID06 | 752 | Surface/Layer/Position Code Code indicating the product surface, layer or position that is being described Refer to 850 transaction set for valid values. | O | ID 2/2 |
| | PID07 | 822 | Source Subqualifier A reference that indicates the table or text maintained by the Source Qualifier | O | AN 1/15 |
| | PID08 | 1073 | Yes/No Condition or Response Code Code indicating a Yes or No condition or response This data element is yes/no response to the PID04 question in a structured PID segment    N    No    Y    Yes | O | ID 1/1 |

| | |
|---|---|
| Segment: | REF Reference Numbers |
| Position: | 100 |
| Loop: | POC |
| Level: | Detail |
| Usage: | Optional |
| Max Use: | 12 |
| Purpose: | To specify identifying numbers. |
| Syntax Notes: | 1 At least one of REF02 or REF03 is required. |

Data Element Summary

| | Ref. Des. Attributes | Data Element | Name | | | |
|---|---|---|---|---|---|---|
| Must Use | REF01 | 128 | Reference Number Qualifier Code qualifying the Reference Number. Refer to 850 transaction set for valid values. | M | ID 2/2 |

102

| | | | | | |
|---|---|---|---|---|---|
| | REF02 | 127 | Reference Number | X | AN 1/30 |
| | | | Reference number or identification number as defined for a particular Transaction Set, or as specified by the Reference Number Qualifier. | | |
| | REF03 | 352 | Description | X | AN 1/80 |
| | | | A free-form description to clarify the related data elements and their content | | |

Segment: PER Administrative Communications Contact
Position: 110
Loop: POC
Level: Detail
Usage: Optional
Max Use: 3
Purpose: To identify a person or office to whom administrative communications should be directed

Data Element Summary

| | Ref. Des. Attributes | Data Element | Name | | |
|---|---|---|---|---|---|
| Must Use | PER01 | 366 | Contact Function Code | M | ID 2/2 |
| | | | Code identifying the major duty or responsibility of the person or group named | | |
| | | | CA    Customer Contact Granting Appointment | | |
| | PER02 | 93 | Name | O | AN 1/35 |
| | | | Free-form name | | |
| | | | Name of contact (customer location) | | |
| | PER03 | 365 | Communication Number Qualifier | X | ID 2/2 |
| | | | Code identifying the type of communication number | | |
| | | | FX    Facsimile | | |
| | | | TE    Telephone | | |
| | PER04 | 364 | Communication Number | X | AN 1/25 |
| | | | Complete communications number including country or area code when applicable | | |
| | | | If PER03 = FX | | |
| | | | Fax number (format = 2167666740) | | |
| | | | If PER03 = TE | | |
| | | | Fax number (format = 2167666740) | | |
| | PER05 | 365 | Communication Number Qualifier | X | ID 2/2 |
| | | | Code identifying the type of communication number | | |
| | | | FX    Facsimile | | |
| | | | TE    Telephone | | |
| | PER06 | 364 | Communication Number | X | AN 1/25 |
| | | | Complete communications number including country or area code when applicable | | |
| | | | If PER03 = FX | | |
| | | | Fax number (format = 2167666740) | | |
| | | | If PER03 = TE | | |
| | | | Telephone number (format = 2166766740) | | |

Segment: DTM Date/Time/Period
Position: 200
Loop: POC
Level: Detail
Usage: Optional
Max Use: 10
Purpose: To specify pertinent dates and times
Syntax Notes: 1   At least one of DTM02 or DTM03 is required.
Semantic Notes:

103

Comments:

Data Element Summary

| | Ref. Des. Attributes | Data Element | Name | | |
|---|---|---|---|---|---|
| Must Use | DTM01 | 374 | Date/Time Qualifier<br>Code specifying type of date or time, or both date and time<br>Refer to 850 transaction set for valid values. | M | ID 3/3 |
| | DTM02 | 373 | Date<br>Date (YYMMDD) | X | DT 6/6 |
| | DTM03 | 337 | Time<br>Time expressed in 24-hour clock time (HHMM)<br>(Time range: 0000 through 2359)<br>0900/AM<br>1300/PM<br>Absence indicates all day | X | TM 4/6 |
| | DTM05 | 624 | Century<br>The first two characters in the designation of the year<br>19      Century code | O | N0 2/2 |

Segment: SLN Subline Item Detail
Position: 460
Loop: SLN
Level: Detail
Usage: Optional
Max Use: 1
Purpose: To specify product subline detail item data
Syntax Notes:  1  If SLN07 is present, then SLN06 is required.
  2  If SLN08 is present, then SLN06 is required.
  3  If SLN09 is present, then SLN10 is required.
  4  If SLN11 is present, then SLN12 is required.
  5  If SLN13 is present, then SLN14 is required.
  6  If SLN15 is present, then SLN16 is required.
  7  If SLN17 is present, then SLN18 is required.
  8  If SLN19 is present, then SLN20 is required.
  9  If SLN21 is present, then SLN22 is required.
  10  If SLN23 is present, then SLN24 is required.
  11  If SLN25 is present, then SLN26 is required.
  12  If SLN27 is present, then SLN28 is required.
Semantic Notes:  1  SLN01 is the identifying number for the subline item.
  2  SLN02 is the identifying number for the subline level. The subline level is analogous to the level code used in a bill of materials.
Comments:  1  See the Data Dictionary for a complete list of ID's.
  2  SLN01 is related to (but not necessarily equivalent to) the baseline item number. Example: 1.1 or 1A might be used as a subline number to relate to baseline number 1.
  3  SLN09 through SLN28 provide for ten (10) different product/service ID's for each item. For example: Case, Color, Drawing No., UPC No., ISBN No., Model No., SKU.

Data Element Summary

| | Ref. Des. Attributes | Data Element | Name | | |
|---|---|---|---|---|---|
| Must Use | SLN01 | 350 | Assigned Identification | M | AN 1/11 |

104

|   |   |   |   |   |   |
|---|---|---|---|---|---|
|   | SLN02 | 350 | Assigned Identification | O | AN 1/11 |
|   |   |   | Alphanumeric characters assigned for differentiation within a transaction set |   |   |
| Must Use | SLN03 | 661 | Configuration Code | M | ID 1/1 |
|   |   |   | Code indicating the relationship of the subline item to the baseline item. Refer to value codes in 850 transaction set. |   |   |
| Must Use | SLN04 | 380 | Quantity | M | R 1/15 |
|   |   |   | Numeric value of quantity |   |   |
| Must Use | SLN05 | 355 | Unit or Basis for Measurement Code | M | ID 2/2 |
|   |   |   | Code specifying the units in which a value is being expressed, or manner in which a measurement has been taken. Refer to value codes in 850 transaction set. |   |   |
|   | SLN06 | 212 | Unit Price | X | R 1/14 |
|   |   |   | Price per unit of product, service, commodity, etc. |   |   |
|   | SLN07 | 639 | Basis of Unit Price Code | O | ID 2/2 |
|   |   |   | Code identifying the type of unit price for an item. Refer to value codes in 850 transaction set. |   |   |
|   | SLN08 | 662 | Relationship Code | O | ID 1/1 |
|   |   |   | Code indicating the relationship of the price or amount to the associated segment. Refer to value codes in 850 transaction set. |   |   |
|   | SLN09 | 235 | Product/Service ID Qualifier | O | ID 2/2 |
|   |   |   | Code identifying the type/source of the descriptive number used in Product/Service ID (234). Refer to value codes in 850 transaction set. |   |   |
|   | SLN10 | 234 | Product/Service ID | X | AN 1/30 |
|   |   |   | Identifying number for a product or service |   |   |
|   | SLN11 | 235 | Product/Service ID Qualifier | O | ID 2/2 |
|   |   |   | Code identifying the type/source of the descriptive number used in Product/Service ID (234). Refer to value codes in 850 transaction set. |   |   |
|   | SLN12 | 234 | Product/Service ID | X | AN 1/30 |
|   |   |   | Identifying number for a product or service |   |   |
|   | SLN13 | 235 | Product/Service ID Qualifier | O | ID 2/2 |
|   |   |   | Code identifying the type/source of the descriptive number used in Product/Service ID (234). Refer to value codes in 850 transaction set. |   |   |
|   | SLN14 | 234 | Product/Service ID | X | AN 1/30 |
|   |   |   | Identifying number for a product or service |   |   |
|   | SLN15 | 235 | Product/Service ID Qualifier | O | ID 2/2 |
|   |   |   | Code identifying the type/source of the descriptive number used in Product/Service ID (234). Refer to value codes in 850 transaction set. |   |   |
|   | SLN16 | 234 | Product/Service ID | X | AN 1/30 |
|   |   |   | Identifying number for a product or service |   |   |
|   | SLN17 | 235 | Product/Service ID Qualifier | O | ID 2/2 |
|   |   |   | Code identifying the type/source of the descriptive number used in Product/Service ID (234). Refer to value codes in 850 transaction set. |   |   |
|   | SLN18 | 234 | Product/Service ID | X | AN 1/30 |
|   |   |   | Identifying number for a product or service |   |   |
|   | SLN19 | 235 | Product/Service ID Qualifier | O | ID 2/2 |
|   |   |   | Code identifying the type/source of the descriptive number used in Product/Service ID (234). Refer to value codes in 850 transaction set. |   |   |
|   | SLN20 | 234 | Product/Service ID | X | AN 1/30 |
|   |   |   | Identifying number for a product or service |   |   |
|   | SLN21 | 235 | Product/Service ID Qualifier | O | ID 2/2 |

105

| | | | | | |
|---|---|---|---|---|---|
| SLN22 | 234 | Product/Service ID | | X | AN 1/30 |
| | | Identifying number for a product or service | | | |
| SLN23 | 235 | Product/Service ID Qualifier | | O | ID 2/2 |
| | | Code identifying the type/source of the descriptive number used in Product/Service ID (234) | | | |
| | | Refer to value codes in 850 transaction set. | | | |
| SLN24 | 234 | Product/Service ID | | X | AN 1/30 |
| | | Identifying number for a product or service | | | |
| SLN25 | 235 | Product/Service ID Qualifier | | O | ID 2/2 |
| | | Code identifying the type/source of the descriptive number used in Product/Service ID (234) | | | |
| | | Refer to value codes in 850 transaction set. | | | |
| SLN26 | 234 | Product/Service ID | | X | AN 1/30 |
| | | Identifying number for a product or service | | | |
| SLN27 | 235 | Product/Service ID Qualifier | | O | ID 2/2 |
| | | Code identifying the type/source of the descriptive number used in Product/Service ID (234) | | | |
| | | Refer to value codes in 850 transaction set. | | | |
| SLN28 | 234 | Product/Service ID | | X | AN 1/30 |
| | | Identifying number for a product or service | | | |

Segment: SI Service Characteristic Identification
Position: 470
Loop: SLN
Level: Detail
Usage: Optional
Max Use: 5
Purpose: To specify service characteristic data
Syntax Notes:
1  If either SI04 or SI05 is present, then the other is required.
2  If either SI06 or SI07 is present, then the other is required.
3  If either SI08 or SI09 is present, then the other is required.
4  If either SI10 or SI11 is present, then the other is required.
5  If either SI12 or SI13 is present, then the other is required.
6  If either SI14 or SI15 is present, then the other is required.
7  If either SI16 or SI17 is present, then the other is required.
8  If either SI18 or SI19 is present, then the other is required.
9  If either SI20 or SI21 is present, then the other is required.
Semantic Notes:
Comments: 1  SI01 defines the source for each of the service characteristics qualifiers.

Data Element Summary

| | Ref. Des. Attributes | Data Element | Name | | |
|---|---|---|---|---|---|
| Must Use | SI01 | 559 | Agency Qualifier Code | M | ID 2/2 |
| | | | Code identifying the agency assigning the code values | | |
| | | | Refer to value codes in 850 transaction set. | | |
| Must Use | SI02 | 1000 | Service Characteristics Qualifier | M | ID 2/2 |
| | | | Code from an industry code list qualifying the type of service characteristics | | |
| Must Use | SI03 | 234 | Product/Service ID | M | AN 1/30 |
| | | | Identifying number for a product or service | | |
| | SI04 | 1000 | Service Characteristics Qualifier | X | ID 2/2 |
| | | | Code from an industry code list qualifying the type of service characteristics | | |
| | SI05 | 234 | Product/Service ID | X | AN 1/30 |
| | | | Identifying number for a product or service | | |

106

| | | | | |
|---|---|---|---|---|
| SI06 | 1000 | Service Characteristics Qualifier | X | ID 2/2 |
| | | Code from an industry code list qualifying the type of service characteristics | | |
| SI07 | 234 | Product/Service ID | X | AN 1/30 |
| | | Identifying number for a product or service | | |
| SI08 | 1000 | Service Characteristics Qualifier | X | ID 2/2 |
| | | Code from an industry code list qualifying the type of service characteristics | | |
| SI09 | 234 | Product/Service ID | X | AN 1/30 |
| | | Identifying number for a product or service | | |
| SI10 | 1000 | Service Characteristics Qualifier | X | ID 2/2 |
| | | Code from an industry code list qualifying the type of service characteristics | | |
| SI11 | 234 | Product/Service ID | X | AN 1/30 |
| | | Identifying number for a product or service | | |
| SI12 | 1000 | Service Characteristics Qualifier | X | ID 2/2 |
| | | Code from an industry code list qualifying the type of service characteristics | | |
| SI13 | 234 | Product/Service ID | X | AN 1/30 |
| | | Identifying number for a product or service | | |
| SI14 | 1000 | Service Characteristics Qualifier | X | ID 2/2 |
| | | Code from an industry code list qualifying the type of service characteristics | | |
| SI15 | 234 | Product/Service ID | X | AN 1/30 |
| | | Identifying number for a product or service | | |
| SI16 | 1000 | Service Characteristics Qualifier | X | ID 2/2 |
| | | Code from an industry code list qualifying the type of service characteristics | | |
| SI17 | 234 | Product/Service ID | X | AN 1/30 |
| | | Identifying number for a product or service | | |
| SI18 | 1000 | Service Characteristics Qualifier | X | ID 2/2 |
| | | Code from an industry code list qualifying the type of service characteristics | | |
| SI19 | 234 | Product/Service ID | X | AN 1/30 |
| | | Identifying number for a product or service | | |
| SI20 | 1000 | Service Characteristics Qualifier | X | ID 2/2 |
| | | Code from an industry code list qualifying the type of service characteristics | | |
| SI21 | 234 | Product/Service ID | X | AN 1/30 |
| | | Identifying number for a product or service | | |

Segment: PID Product/Item Description
Position: 480
Loop: SLN
Level: Detail
Usage: Optional
Max Use: 1000
Purpose: To describe a product or process in coded or free-form format
Syntax Notes:
1. If PID04 is present, then PID03 is required.
2. At least one of PID04 or PID05 is required.
3. If PID07 is present, then PID03 is required.
4. If PID08 is present, then PID03 is required.

Semantic Notes:
1. Use PID03 to indicate the organization that publishes the code list being referred to.
2. PID04 should be used for industry-specific product description codes.
3. PID08 describes the physical characteristics of the product identified in PID04. A "Y" indicates that the specified attribute applies to this item. A "N" indicates it does not apply. Any other value is indeterminate.

Comments:
1. If PID01 = "F", then PID05 is used. If PID01 = "S", then PID04 is used. If PID01 = "X", then both PID04 and PID05 are used.
2. Use PID06 when necessary to refer to the product surface or layer being described in the segment.
3. PID07 specifies the individual code list of the agency specified in PID03.

Data Element Summary

| | Ref. Des. Attributes | Data Element | Name | | |
|---|---|---|---|---|---|
| Must Use | PID01 | 349 | Item Description Type<br>Code indicating the format of a description<br>Refer to value codes in 850 transaction set | M | ID 1/1 |
| | PID02 | 750 | Product/Process Characteristic Code<br>Code identifying the general class of a product or process characteristic<br>Refer to value codes in 850 transaction set | O | ID 2/3 |
| | PID03 | 559 | Agency Qualifier Code<br>Code identifying the agency assigning the code values<br>Refer to value codes in 850 transaction set | X | ID 2/2 |
| | PID04 | 751 | Product Description Code<br>A code from an industry code list which provides specific data about a product characteristic<br>Refer to value codes in 850 transaction set | X | AN 1/12 |
| | PID05 | 352 | Description<br>A free-form description to clarify the related data elements and their content | X | AN 1/80 |
| | PID06 | 752 | Surface/Layer/Position Code<br>Code indicating the product surface, layer or position that is being described<br>Refer to value codes in 850 transaction set | O | ID 2/2 |
| | PID07 | 822 | Source Subqualifier<br>A reference that indicates the table or text maintained by the Source Qualifier | O | AN 1/15 |
| | PID08 | 1073 | Yes/No Condition or Response Code<br>Code indicating a Yes or No condition or response<br>This data element is yes/no response to the PID04 question in a structured PID segment<br>    N    No<br>    Y    Yes | O | ID 1/1 |

Segment: DTM Date/Time/Period  
Position: 510  
Loop: SLN  
Level: Detail  
Usage: Optional  
Max Use: 10  
Purpose: To specify pertinent dates and times  
Syntax Notes: 1 At least one of DTM02 or DTM03 is required.

Data Element Summary

| | Ref. Des. Attributes | Data Element | Name | | |
|---|---|---|---|---|---|
| Must Use | DTM01 | 374 | Date/Time Qualifier<br>Code specifying type of date or time, or both date and time<br>Refer to value codes in 850 transaction set. | M | ID 3/3 |
| | DTM02 | 373 | Date<br>Date (YYMMDD) | X | DT 6/6 |
| | DTM03 | 337 | Time<br>Time expressed in 24-hour clock time (HHMM)<br>(Time range: 0000 through 2359)<br>0900/AM<br>1300/PM<br>Absence indicates all day | X | TM 4/6 |
| | DTM05 | 624 | Century<br>The first two characters in the designation of the year | O | N0 2/2 |

108

19  Century code

Segment: N1 Name
Position: 520
Loop: N1
Level: Detail
Usage: Optional
Max Use: 1
Purpose: To identify a party by type of organization, name, and code
Syntax Notes:
1 At least one of N102 or N103 is required.
2 If either N103 or N104 is present, then the other is required.
Semantic Notes:
Comments:
1 This segment, used alone, provides the most efficient method of providing organizational identification. To obtain this efficiency the "ID Code" (N104) must provide a key to the table maintained by the transaction processing party.

Data Element Summary

| | Ref. Des. Attributes | Data Element | Name | | |
|---|---|---|---|---|---|
| Must Use | N101 | 98 | Entity Identifier Code | M | ID 2/2 |
| | | | Code identifying an organizational entity, a physical location, or an individual | | |
| | | | Refer to value codes in 850 transaction set. | | |
| | N102 | 93 | Name | X | AN 1/35 |
| | | | Free-form name | | |
| | N103 | 66 | Identification Code Qualifier | X | ID 1/2 |
| | | | Code designating the system/method of code structure used for Identification Code (67) | | |
| | | | Refer to value codes in 850 transaction set. | | |
| | N104 | 67 | Identification Code | X | AN 2/17 |
| | | | Code identifying a party or other code | | |

Segment: N2 Additional Name Information
Position: 530
Loop: N1
Level: Detail
Usage: Optional
Max Use: 2
Purpose: To specify additional names or those longer than 35 characters in length

Data Element Summary

| | Ref. Des. Attributes | Data Element | Name | | |
|---|---|---|---|---|---|
| Must Use | N201 | 93 | Name | M | AN 1/35 |
| | | | Free-form name | | |
| | N202 | 93 | Name | O | AN 1/35 |
| | | | Free-form name | | |

Segment: N3 Address Information
Position: 540
Loop: N1
Level: Detail
Usage: Optional
Max Use: 2
Purpose: To specify the location of the named party

109

Data Element Summary

| Ref. Des. Attributes | Data Element | Name | | |
|---|---|---|---|---|
| Must Use N301 | 166 | Address Information<br>Address information | M | AN 1/35 |
| N302 | 166 | Address Information<br>Address information | O | AN 1/35 |

Segment: N4 Geographic Location
Position: 550
Loop: N1
Level: Detail
Usage: Optional
Max Use: 1
Purpose: To specify the geographic place of the named party
Syntax Notes: 1 At least one of N401 is required.
Semantic Notes:
Comments: 1 N402 is required only if city name (N401) is in the USA or Canada.

Data Element Summary

| Ref. Des. Attributes | Data Element | Name | | |
|---|---|---|---|---|
| N401 | 19 | City Name<br>Free-form text for city name | X | AN 2/30 |
| N402 | 156 | State or Province Code<br>Code (Standard State) as defined by appropriate government agency | O | ID 2/2 |
| N403 | 116 | Postal Code<br>Code defining international postal zone code excluding punctuation and blanks (zip code for United States) | O | ID 3/9 |

Segment: NX2 Real Estate Property ID Component
Position: 560
Loop: N1
Level: Detail
Usage: Optional
Max Use: 3
Purpose: To define types and values for geographic location of real estate property
Syntax Notes:
Semantic Notes: 1 NX201 defines the type of address component.
2 NX202 defines the address component identified in NX201.

Data Element Summary

| Ref. Des. Attributes | Data Element | Name | | |
|---|---|---|---|---|
| Must Use NX201 | 1106 | Address Component Qualifier<br>Code qualifying the type of address component | M | ID 2/2 |
| | | 12 Building name | | |
| | | 13 Apartment number | | |
| | | 14 Suite number | | |
| | | 30 Pier | | |
| | |     The pier at which a ship or boat is docked | | |
| | | 31 Wing | | |
| | |     The particular wing of a building | | |
| | | 32 Floor | | |
| | |     A particular floor or level of a building | | |
| | | 33 Driveway | | |

110

|  |  | 34 | The driveway or private road connecting a house, garage, or another building with the street<br>Lot |  |  |
|---|---|---|---|---|---|
|  |  | 35 | A particular lot or piece of land<br>Room |  |  |
|  |  | 36 | A walled room or partitioned area of a building<br>Slip |  |  |
|  |  | 37 | The slip or location on a pier at which a ship or boat is docked<br>Unit |  |  |
| Must Use | NX202 | 166 | A unit or separate structure<br>Address Information<br>Address information | M | AN 1/35 |

Segment: PER Administrative Communications Contact
Position: 580
Loop: N1
Level: Detail
Usage: Optional
Max Use: 3
Purpose: To identify a person or office to whom administrative communications should be directed
Syntax Notes:
  1  If either PER03 or PER04 is present, then the other is required.
  2  If either PER05 or PER06 is present, then the other is required.
Semantic Notes:
Comments:

Data Element Summary

| Ref.<br>Des.<br>Attributes | Data<br>Element | Name |  |  |
|---|---|---|---|---|
| Must Use PER01 | 366 | Contact Function Code<br>Code identifying the major duty or responsibility of the person or group named<br>Refer to value codes in 850 transaction set. | M | ID 2/2 |
| PER02 | 93 | Name<br>Free-form name | O | AN 1/35 |
| PER03 | 365 | Communication Number Qualifier<br>Code identifying the type of communication number<br>  FX         Facsimile<br>  TE         Telephone | X | ID 2/2 |
| PER04 | 364 | Communication Number<br>Complete communications number including country or area code when applicable<br>If PER03 = FX<br>Fax number (format = 2167666740)<br><br>If PER03 = TE<br>Telephone number (format = 2166766740) | X | AN 1/25 |
| PER05 | 365 | Communication Number Qualifier<br>Code identifying the type of communication number<br>  FX         Facsimile<br>  TE        Telephone | X | ID 2/2 |
| PER06 | 364 | Communication Number<br>Complete communications number including country or area code when applicable<br>If PER03 = FX | X | AN 1/25 |

111

Fax number (format = 2167666740)

If PER03 = TE
Telephone number (format = 2166766740)

| | Segment: | CTT Transaction Totals |
|---|---|---|
| | Position: | 010 |
| | Loop: | |
| | Level: | Summary |
| | Usage: | Mandatory |
| | Max Use: | 1 |
| | Purpose: | To transmit a hash total for a specific element in the transaction set |
| | Syntax Notes: | |
| | Semantic Notes: | |
| | Comments: | 1  This segment is intended to provide hash totals to validate transaction completeness and correctness. |

Data Element Summary

| | Ref. Des. Attributes | Data Element | Name | | |
|---|---|---|---|---|---|
| Must Use | CTT01 | 354 | Number of Line Items<br>Total number of line items in the transaction set | M | N0 1/6 |

| | Segment: | SE Transaction Set Trailer |
|---|---|---|
| | Position: | 030 |
| | Loop: | |
| | Level: | Summary |
| | Usage: | Mandatory |
| | Max Use: | 1 |
| | Purpose: | To indicate the end of the transaction set and provide the count of the transmitted segments (including the beginning (ST) and ending (SE) segments). |
| | Comments: | 1  SE is the last segment of each transaction set. |

Data Element Summary

| | Ref. Des. Attributes | Data Element | Name | | |
|---|---|---|---|---|---|
| Must Use | SE01 | 96 | Number of Included Segments<br>Total number of segments included in a transaction set including ST and SE segments | M | N0 1/10 |
| Must Use | SE02 | 329 | Transaction Set Control Number<br>Identifying control number that must be unique within the transaction set functional group assigned by the originator for a transaction set<br>Must match value in ST02 | M | AN 4/9 |

865 Purchase Order Change Acknowledgment/Request—Seller Initiated (Order Completion)

Functional Group ID=CA

Introduction:

This contains the format and establishes the data contents of the Purchase Order Change Acknowledgment/Request—Seller Initiated Transaction Set (865) for use within the context of an Electronic Data Interchange (EDI) environment. The transaction set can be used to convey acceptance or

112 rejection of changes to a previously submitted purchase order by the seller or to notify the buyer of changes initiated by the seller to a previously submitted purchase order by the seller.

Preferably, this transaction set is used as a Purchase Order Completion Notification. Only selected segments are listed.

Heading:

|  | Pos. No. | Seg. ID | Name | Req. Des. | Max.Use | Loop Repeat | Notes and Comments |
|---|---|---|---|---|---|---|---|
| Must Use | 010 | ST | Transaction Set Header | M | 1 | | |
| Must Use | 020 | BCA | Beginning Segment for Purchase Order Change Acknowledgment | M | 1 | | |
|  | 050 | REF | Reference Numbers | O | 12 | | |
|  | 060 | PER | Administrative Communications Contact | O | 3 | | |
|  | 120 | ITA | Allowance, Charge or Service | O | 10 | | |
|  | 150 | DTM | Date/Time/Period | O | 10 | | |
|  | 190 | PID | Product/Item Description | O | 200 | | |
|  | | | LOOP ID - N9 | | | 1000 | |
|  | 280 | N9 | Reference Number | O | 1 | | |
|  | 290 | MSG | Message Text | O | 1000 | | |

Summary:

|  | Pos. No. | Seg. ID | Name | Req. Des. | Max.Use | Loop Repeat | Notes and Comments |
|---|---|---|---|---|---|---|---|
| Must Use | 010 | CTT | Transaction Totals | M | 1 | | n1 |
| Must Use | 030 | SE | Transaction Set Trailer | M | 1 | | |

Transaction Set Notes

1. Number of line items (CTT01) is the accumulation of the number of POC segments.

|  |  |
|---|---|
| Segment: | ST Transaction Set Header |
| Position: | 010 |
| Loop: | |
| Level: | Heading |
| Usage: | Mandatory |
| Max Use: | 1 |
| Purpose: | To indicate the start of a transaction set and to assign a control number |
| Semantic Notes: | 1 The transaction set identifier (ST01) used by the translation routines of the interchange partners to select the appropriate transaction set definition (e.g., 810 selects the Invoice Transaction Set). |

Data Element Summary

|  | Ref. Des. Attributes | Data Element | Name | | |
|---|---|---|---|---|---|
| Must Use | ST01 | 143 | Transaction Set Identifier Code | M | ID 3/3 |
|  |  |  | Code uniquely identifying a Transaction Set | | |
|  |  |  | 865    X12.16 Purchase Order Change Acknowledgment/Request - Seller Initiated | | |
| Must Use | ST02 | 329 | Transaction Set Control Number | M | AN 4/9 |
|  |  |  | Identifying control number that must be unique within the transaction set functional group assigned by the originator for a transaction set | | |
|  |  |  | Must match value in ST02 | | |

|  |  |
|---|---|
| Segment: | BCA Beginning Segment for Purchase Order Change Acknowledgment |
| Position: | 020 |
| Loop: | |
| Level: | Heading |

113

| | Usage: | Mandatory |
|---|---|---|
| | Max Use: | 1 |
| | Purpose: | To indicate the beginning of the Purchase Order Change Acknowledgment Transaction Set and transmit identifying numbers and dates |
| | Syntax Notes: | |
| | Semantic Notes: | |
| | Comments: | |

Data Element Summary

| | Ref. Des. Attributes | Data Element | Name | | |
|---|---|---|---|---|---|
| Must Use | BCA01 | 353 | Transaction Set Purpose Code Code identifying purpose of transaction set Completion notice  20        Final Transmission | M | ID 2/2 |
| | BCA02 | 587 | Acknowledgment Type Code specifying the type of acknowledgment  AE       Acknowledge - With Exception Detail Only | O | ID 2/2 |
| Must Use | BCA03 | 324 | Purchase Order Number Identifying number for Purchase Order assigned by the orderer/purchaser Customer issued original order number | M | AN 1/22 |
| | BCA05 | 327 | Change Order Sequence Number Number assigned by the orderer identifying a specific change or revision to a previously transmitted transaction set Indicates the version of the order completed | O | AN 1/8 |
| Must Use | BCA06 | 323 | Purchase Order Date Date assigned by the purchaser to Purchase Order Customer issued original order date | M | DT 6/6 |
| | BCA10 | 588 | Acknowledgment Date Date assigned by the sender to the acknowledgment. Date of acknowledgement | O | DT 6/6 |
| | BCA11 | 279 | Purchase Order Change Request Date Date of the purchase order change request. Date of change order being acknowledged | O | DT 6/6 |

| | Segment: | REF Reference Numbers |
|---|---|---|
| | Position: | 050 |
| | Loop: | |
| | Level: | Heading |
| | Usage: | Optional |
| | Max Use: | 12 |
| | Purpose: | To specify identifying numbers. |
| | Syntax Notes: | 1    At least one of REF02 is required. |
| | Semantic Notes: | |
| | Comments: | |

Data Element Summary

| | Ref. Des. Attributes | Data Element | Name | | |
|---|---|---|---|---|---|
| Must Use | REF01 | 128 | Reference Number Qualifier Code qualifying the Reference Number.  OW       Service Order Number            Number assigned when a customer orders service and            equipment and which appears on bill | M | ID 2/2 |

114

| | | | | | |
|---|---|---|---|---|---|
| Must Use | REF02 | 127 | Reference Number | M | AN 1/30 |

Reference number or identification number as defined for a particular Transaction Set, or as specified by the Reference Number Qualifier.
assigned order number

| | |
|---|---|
| Segment: | PER Administrative Communications Contact |
| Position: | 060 |
| Loop: | |
| Level: | Heading |
| Usage: | Optional |
| Max Use: | 3 |
| Purpose: | To identify a person or office to whom administrative communications should be directed |
| Syntax Notes: | 1  If either PER03 or PER04 is present, then the other is required. |
| | 2  If either PER05 or PER06 is present, then the other is required. |

Data Element Summary

| | Ref. Des. Attributes | Data Element | Name | | |
|---|---|---|---|---|---|
| Must Use | PER01 | 366 | Contact Function Code | M | ID 2/2 |

Code identifying the major duty or responsibility of the person or group named

SR              Sales Representative or Department

| | | | | | |
|---|---|---|---|---|---|
| Must Use | PER02 | 93 | Name | M | AN 1/35 |

Free-form name
Contact name

| | | | | | |
|---|---|---|---|---|---|
| Must Use | PER03 | 365 | Communication Number Qualifier | M | ID 2/2 |

Code identifying the type of communication number

FX              Facsimile
    TE              Telephone

| | | | | | |
|---|---|---|---|---|---|
| Must Use | PER04 | 364 | Communication Number | M | AN 1/25 |

Complete communications number including country or area code when applicable
If PER03 = FX
Fax number (format = 7082222314)

If PER03 = TE
Telephone number (format = 7082222314)

| | | | | | |
|---|---|---|---|---|---|
| | PER05 | 365 | Communication Number Qualifier | X | ID 2/2 |

Code identifying the type of communication number

FX              Facsimile
    TE              Telephone

| | | | | | |
|---|---|---|---|---|---|
| | PER06 | 364 | Communication Number | X | AN 1/25 |

Complete communications number including country or area code when applicable
If PER03 = FX
Fax number (format = 7082222314)

If PER03 = TE
Telephone number (format = 7082222314)

| | |
|---|---|
| Segment: | ITA Allowance, Charge or Service |
| Position: | 120 |
| Loop: | |
| Level: | Heading |
| Usage: | Optional |
| Max Use: | 10 |
| Purpose: | To specify allowances, charges, or services |

115

| | Syntax Notes: | 4 | If ITA02 is present, then at least one of ITA03 or ITA14 is required. |
|---|---|---|---|
| | Semantic Notes: | 1 | ITA12 is the quantity of free goods. |
| | Comments: | 1 | If ITA01 = A-Allowance or C-Charge, then at least one of ITA06, ITA07, or ITA08 must be present. |
| | | 2 | ITA02 identifies the source of the code value in ITA03 or ITA15. |
| | | 3 | If ITA07 is present with either ITA06 or ITA08, then ITA07 takes precedence. |

Data Element Summary

| | Ref. Des. Attributes | Data Element | Name | | |
|---|---|---|---|---|---|
| Must Use | ITA01 | 248 | Allowance or Charge Indicator | M | ID 1/1 |
| | | | Code which indicates an allowance or charge for the service specified | | |
| | | | C  Charge | | |
| Must Use | ITA02 | 559 | Agency Qualifier Code | M | ID 2/2 |
| | | | Code identifying the agency assigning the code values | | |
| | | | TI  Telecommunications Industry | | |
| Must Use | ITA04 | 331 | Allowance or Charge Method of Handling Code | M | ID 2/2 |
| | | | Code indicating method of handling for an allowance or charge | | |
| | | | 06  Charge to be Paid by Customer | | |
| | ITA07 | 360 | Allowance or Charge Total Amount | O | N2 1/9 |
| | | | Total dollar amount for the allowance or charge | | |
| | ITA12 | 380 | Quantity | O | R 1/15 |
| | | | Numeric value of quantity | | |
| | | | Number of hours | | |
| Must Use | ITA14 | 150 | Special Charge or Allowance Code | M | ID 3/3 |
| | | | Code identifying type of special charge or allowance | | |
| | | | 580/Premium deregulated time charges | | |
| | | | ACL/Normal hours | | |
| | | | LAA/Normal deregulated time charges | | |
| | | | OAC/Premium regulated time charges | | |
| | | | PAD/Premium hours | | |
| | | | PAR/Regulated material charge | | |
| | | | PAT/Deregulated material charge | | |
| | | | STL/Normal regulated time charges | | |

| | | |
|---|---|---|
| Segment: | DTM Date/Time/Period | |
| Position: | 150 | |
| Loop: | | |
| Level: | Heading | |
| Usage: | Optional | |
| Max Use: | 10 | |
| Purpose: | To specify pertinent dates and times | |
| Syntax Notes: | 1  At least one of DTM02 or DTM03 is required. | |
| Semantic Notes: | | |
| Comments: | | |

Data Element Summary

| | Ref. Des. Attributes | Data Element | Name | | |
|---|---|---|---|---|---|
| Must Use | DTM01 | 374 | Date/Time Qualifier | M | ID 3/3 |
| | | | Code specifying type of date or time, or both date and time | | |
| | | | 150  Service Period Start (install/change) | | |
| | | | Date service was requested to start | | |
| | | | 151  Service Period End (disconnect) | | |
| | | | Date service was requested to end | | |

116

|  |  | 177 | Cancellation |  |  |
|--|--|--|--|--|--|
|  |  |  | Date on which the coverage or service is no longer in force |  |  |
| Must Use | DTM02 | 373 | Date | M | DT 6/6 |
|  |  |  | Date (YYMMDD) |  |  |
|  |  |  | Assigned date |  |  |
|  | DTM03 | 337 | Time | O | TM 4/6 |
|  |  |  | Time expressed in 24-hour clock time (HHMM) |  |  |
|  |  |  | (Time range: 0000 through 2359) |  |  |
|  |  |  | 0900/AM |  |  |
|  |  |  | 1300/PM |  |  |
|  |  |  | Absence indicates all day |  |  |
|  |  |  | Assigned time |  |  |
|  | DTM05 | 624 | Century | O | N0 2/2 |
|  |  |  | The first two characters in the designation of the year (CCYY) |  |  |
|  |  |  | 19 Century code |  |  |

Segment: PID Product/Item Description
Position: 190
Loop:
Level: Heading
Usage: Optional
Max Use: 200
Purpose: To describe a product or process in coded or free-form format
Syntax Notes:
1. If PID04 is present, then PID03 is required.
2. At least one of PID04 or PID05 is required.
3. If PID07 is present, then PID03 is required.
4. If PID08 is present, then PID03 is required.

Semantic Notes:
1. Use PID03 to indicate the organization that publishes the code list being referred to.
2. PID04 should be used for industry-specific product description codes.
3. PID08 describes the physical characteristics of the product identified in PID04. A "Y" indicates that the specified attribute applies to this item. A "N" indicates it does not apply. Any other value is indeterminate.

Comments:
1. If PID01 = "F", then PID05 is used. If PID01 = "S", then PID04 is used. If PID01 = "X", then both PID04 and PID05 are used.
2. Use PID06 when necessary to refer to the product surface or layer being described in the segment.
3. PID07 specifies the individual code list of the agency specified in PID03.

Data Element Summary

|  | Ref. Des. Attributes | Data Element | Name |  |  |
|--|--|--|--|--|--|
| Must Use | PID01 | 349 | Item Description Type | M | ID 1/1 |
|  |  |  | Code indicating the format of a description |  |  |
|  |  |  | S Structured (From Industry Code List) |  |  |
|  |  |  | X Semi-structured (Code and Text) |  |  |
| Must Use | PID03 | 559 | Agency Qualifier Code | M | ID 2/2 |
|  |  |  | Code identifying the agency assigning the code values |  |  |
|  |  |  | AS Assigned by Seller |  |  |
|  |  |  | TI Telecommunications Industry |  |  |
| Must Use | PID04 | 751 | Product Description Code | M | AN 1/12 |
|  |  |  | A code from an industry code list which provides specific data about a product characteristic |  |  |
|  |  |  | VIN Service call charge |  |  |
|  | PID07 | 822 | Source Subqualifier | O | AN 1/15 |
|  |  |  | A reference that indicates the table or text maintained by the Source Qualifier |  |  |

117

|  |  |  | AMT02 | list for PID |  |  |
| --- | --- | --- | --- | --- | --- | --- |
| | PID08 | 1073 | Yes/No Condition or Response Code | | O | ID 1/1 |

Code indicating a Yes or No condition or response
This data element is yes/no response to the PID04 question in a structured PID segment
    N    No
    Y    Yes

Segment: N9 Reference Number
Position: 280
Loop: N9
Level: Heading
Usage: Optional
Max Use: 1
Purpose: To transmit identifying numbers and descriptive information as specified by the reference number qualifier
Syntax Notes: 1 At least one of N902 or N903 is required.

Data Element Summary

| | Ref. Des. Attributes | Data Element | Name | | | |
| --- | --- | --- | --- | --- | --- | --- |
| Must Use | N901 | 128 | Reference Number Qualifier | | M | ID 2/2 |

Code qualifying the Reference Number.
    L1    Letters or Notes

| Must Use | N902 | 127 | Reference Number | M | AN 1/30 |
| --- | --- | --- | --- | --- | --- |

Reference number or identification number as defined for a particular Transaction Set, or as specified by the Reference Number Qualifier.
Jack USOCs

| Must Use | N903 | 369 | Free-form Description | M | AN 1/45 |
| --- | --- | --- | --- | --- | --- |

Free-form descriptive text

Segment: MSG Message Text
Position: 290
Loop: N9
Level: Heading
Usage: Optional
Max Use: 1000
Purpose: To provide a free form format that would allow the transmission of text information.
Syntax Notes:
Semantic Notes:
Comments: 1 MSG02 is not related to the specific characteristics of a printer, but identifies top of page, advance a line, etc.

Data Element Summary

| | Ref. Des. Attributes | Data Element | Name | | | |
| --- | --- | --- | --- | --- | --- | --- |
| Must Use | MSG01 | 933 | Free-Form Message Text | | M | AN 1/264 |

Free-form message text
Phone jack USOCs information

Segment: CTT Transaction Totals
Position: 010
Loop:
Level: Summary
Usage: Mandatory

118

|  | Ref. Des. Attributes | Data Element | Name | | |
|---|---|---|---|---|---|
| Must Use | CTT01 | 354 | Number of Line Items<br>Total number of line items in the transaction set<br>Will always be 0/zero | M | N0 1/6 |

Segment: SE Transaction Set Trailer
Position: 030
Loop:
Level: Summary
Usage: Mandatory
Max Use: 1
Purpose: To indicate the end of the transaction set and provide the count of the transmitted segments (including the beginning (ST) and ending (SE) segments).
Syntax Notes:
Semantic Notes:
Comments: 1 SE is the last segment of each transaction set.

Data Element Summary

|  | Ref. Des. Attributes | Data Element | Name | | |
|---|---|---|---|---|---|
| Must Use | SE01 | 96 | Number of Included Segments<br>Total number of segments included in a transaction set including ST and SE segments | M | N0 1/10 |
| Must Use | SE02 | 329 | Transaction Set Control Number<br>Identifying control number that must be unique within the transaction set functional group assigned by the originator for a transaction set<br>Must match value in ST02 | M | AN 4/9 |

870 Order Status Report

Functional Group ID=RS

Introduction:

This contains the format and establishes the data contents of the Order Status Report Transaction Set (870) for use within the context of an Electronic Data Interchange (EDI) environment. The transaction set can be used to report on the current status of a requirement forecast, an entire purchase order, selected line items on a purchase order, selected products/services on a purchase order, or purchase orders for a specific customer in their entirety or on a selection basis. The transaction set can also be used to report on the current status of single or multiple requisitions. The report format allows for the inclusion of "reasons" relative to the status. This transaction set may also be used to update the supplier's scheduled shipment or delivery dates. This transaction set can result from either an inquiry or a prearranged schedule agreed to by the trading partners. Only selected segments are listed.

Notes:

The transaction set can be used to convey jeopardies which occur on an order after the 855 transaction set has been sent.

The number of line items (CTT01) is the accumulation of the number of HL segments.

Heading:

| | Pos. No. | Seg. ID | Name | Req. Des. | Max.Use | Loop Repeat | Notes and Comments |
|---|---|---|---|---|---|---|---|
| Must Use | 010 | ST | Transaction Set Header | M | 1 | | |
| Must Use | 020 | BSR | Beginning Segment for Order Status Report | M | 1 | | |
| | 040 | REF | Reference Numbers | O | 12 | | |

Detail:

| | Pos. No. | Seg. ID | Name | Req. Des. | Max.Use | Loop Repeat | Notes and Comments |
|---|---|---|---|---|---|---|---|
| | | | LOOP ID - HL | | | 1000 | |
| Must Use | 010 | HL | Hierarchical Level | M | 1 | | |
| | | | LOOP ID - ISR | | | 104 | |
| | 030 | ISR | Item Status Report | O | 1 | | |
| | 040 | PID | Product/Item Description | O | 6 | | |
| | 080 | DTM | Date/Time/Period | O | 10 | | |

Summary:

| | Pos. No. | Seg. ID | Name | Req. Des. | Max.Use | Loop Repeat | Notes and Comments |
|---|---|---|---|---|---|---|---|
| Must Use | 010 | CTT | Transaction Totals | M | 1 | | n1 |
| Must Use | 020 | SE | Transaction Set Trailer | M | 1 | | |

Transaction Set Notes

The number of line items (CTT01) is the accumulation of the number of HL segments.

| | |
|---|---|
| Segment: | ST Transaction Set Header |
| Position: | 010 |
| Loop: | |
| Level: | Heading |
| Usage: | Mandatory |
| Max Use: | 1 |
| Purpose: | To indicate the start of a transaction set and to assign a control number |
| Syntax Notes: | |
| Semantic Notes: | 1 The transaction set identifier (ST01) used by the translation routines of the interchange partners to select the appropriate transaction set definition (e.g., 810 selects the Invoice Transaction Set). |

Data Element Summary

| | Ref. Des. Attributes | Data Element | Name | | |
|---|---|---|---|---|---|
| Must Use | ST01 | 143 | Transaction Set Identifier Code Code uniquely identifying a Transaction Set 870 X12.1 Order Status Report Refer to value codes in 850 transaction set | M | ID 3/3 |
| Must Use | ST02 | 329 | Transaction Set Control Number Identifying control number that must be unique within the transaction set functional group assigned by the originator for a transaction set Must match value in SE02 | M | AN 4/9 |

| | |
|---|---|
| Segment: | BSR Beginning Segment for Order Status Report |
| Position: | 020 |
| Loop: | |
| Level: | Heading |
| Usage: | Mandatory |

120

|  | Max Use: | 1 | | | |
|---|---|---|---|---|---|
|  | Purpose: | To indicate the beginning of an Order Status Report. | | | |
|  | Semantic Notes: | 1 BSR03 indicates a status report document number assigned by the sender. | | | |
|  |  | 2 BSR04 indicates the date of this report from the sender. | | | |

Data Element Summary

| | Ref. Des. Attributes | Data Element | Name | | |
|---|---|---|---|---|---|
| Must Use | BSR01 | 850 | Status Report Code | M | ID 1/2 |
| | | | Code indicating the reason for sending the report | | |
| | | | 04      Response to Requisition | | |
| | | |          Current status data is provided based upon the processing of an outstanding requisition | | |
| Must Use | BSR02 | 847 | Order/Item Code | M | ID 1/2 |
| | | | Code identifying a group of orders and items | | |
| | | | PA      Selected Orders - All Items | | |
| Must Use | BSR03 | 127 | Reference Number | M | AN 1/30 |
| | | | Reference number or identification number as defined for a particular Transaction Set, or as specified by the Reference Number Qualifier. Service Order Number | | |
| Must Use | BSR04 | 373 | Date | M | DT 6/6 |
| | | | Date (YYMMDD) | | |
| | | | Date of Status Report | | |
| | BSR05 | 848 | Product/Date Code | O | ID 1/2 |
| | | | Code indicating whether the inquiry is based on products and/or date parameters | | |
| | | | PD      Selected Products and Selected Date Parameters | | |
| | BSR06 | 849 | Location Code | O | ID 1/2 |
| | | | Code indicating the selection of a supplier's and/or buyer's locations or group of locations | | |
| | | | SL      Selected Buyer Location(s) | | |

| | Segment: | REF Reference Numbers |
|---|---|---|
| | Position: | 040 |
| | Loop: | |
| | Level: | Heading |
| | Usage: | Optional |
| | Max Use: | 12 |
| | Purpose: | To specify identifying numbers. |
| | Syntax Notes: | 1   At least one of REF02 or REF03 is required. |

Data Element Summary

| | Ref. Des. Attributes | Data Element | Name | | |
|---|---|---|---|---|---|
| Must Use | REF01 | 128 | Reference Number Qualifier | M | ID 2/2 |
| | | | Code qualifying the Reference Number. | | |
| | | | PO      Purchase Order Number | | |
| Must Use | REF02 | 127 | Reference Number | M | AN 1/30 |
| | | | Reference number or identification number as defined for a particular Transaction Set, or as specified by the Reference Number Qualifier. Customer's Purchase Order Number | | |

| | Segment: | HL Hierarchical Level |
|---|---|---|
| | Position: | 010 |
| | Loop: | HL |
| | Level: | Detail |
| | Usage: | Mandatory |
| | Max Use: | 1 |

121

|  |  |
|---|---|
| Purpose: | To identify dependencies among and the content of hierarchically related groups of data segments |
| Syntax Notes: | |
| Semantic Notes: | |
| Comments: | 1 The HL segment is used to identify levels of detail information using a hierarchical structure, such as relating line-item data to shipment data, and packaging data to line-item data. |
| | 2 HL01 shall contain a unique alphanumeric number for each occurrence of the HL segment in the transaction set. For example, HL01 could be used to indicate the number of occurrences of the HL segment, in which case the value of HL01 would be "1" for the initial HL segment and would be incremented by one in each subsequent HL segment within the transaction. |
| | 3 HL02 identifies the hierarchical ID number of the HL segment to which the current HL segment is subordinate. |
| | 4 HL03 indicates the context of the series of segments following the current HL segment up to the next occurrence of an HL segment in the transaction. For example, HL03 is used to indicate that subsequent segments in the HL loop form a logical grouping of data referring to shipment, order, or item-level information. |
| | 5 HL04 indicates whether or not there are subordinate (or child) HL segments related to the current HL segment. |

Data Element Summary

| Attributes | Ref. Des. | Data Element | Name | | | |
|---|---|---|---|---|---|---|
| Must Use | HL01 | 628 | Hierarchical ID Number | | M | AN 1/12 |
| | | | A unique number assigned by the sender to identify a particular data segment in a hierarchical structure | | | |
| Must Use | HL03 | 735 | Hierarchical Level Code | | M | ID 1/2 |
| | | | Code defining the characteristic of a level in a hierarchical structure | | | |
| | | | D | Product Description | | |
| | HL04 | 736 | Hierarchical Child Code | | O | ID 1/1 |
| | | | Code indicating whether if there are hierarchical child data segments subordinate to the level being described. | | | |
| | | | 0 | No Additional Subordinates | | |

|  |  |
|---|---|
| Segment: | ISR Item Status Report |
| Position: | 030 |
| Loop: | ISR |
| Level: | Detail |
| Usage: | Optional |
| Max Use: | 1 |
| Purpose: | To specify detailed purchase order/item status |

Data Element Summary

| Attributes | Ref. Des. | Data Element | Name | | | |
|---|---|---|---|---|---|---|
| Must Use | ISR01 | 368 | Shipment/Order Status Code | | M | ID 2/2 |
| | | | Code indicating the status of an order or shipment or the disposition of any difference between the quantity ordered and the quantity shipped for a line item or transaction | | | |
| | | | PH | Product On Hold | | |

|  |  |
|---|---|
| Segment: | PID Product/Item Description |
| Position: | 040 |

122

|  | Loop: | ISR |
|---|---|---|
|  | Level: | Detail |
|  | Usage: | Optional |
|  | Max Use: | 6 |
|  | Purpose: | To describe a product or process in coded or free-form format |
|  | Syntax Notes: | 1 If PID04 is present, then PID03 is required. |
|  |  | 2 At least one of PID04 or PID05 is required. |
|  |  | 3 If PID07 is present, then PID03 is required. |
|  | Semantic Notes: | 1 Use PID03 to indicate the organization that publishes the code list being referred to. |
|  |  | 2 PID04 should be used for industry-specific product description codes. |
|  | Comments: | 1 If PID01 = "S", then PID04 is used. If PID01 = "X", then both PID04 and PID05 are used. |
|  |  | 2 Use PID06 when necessary to refer to the product surface or layer being described in the segment. |
|  |  | 3 PID07 specifies the individual code list of the agency specified in PID03. |

Data Element Summary

| Ref. Des. Attributes | Data Element | Name | | |
|---|---|---|---|---|
| Must Use PID01 | 349 | Item Description Type | M | ID 1/1 |
| | | Code indicating the format of a description | | |
| | | S Structured (From Industry Code List) | | |
| | | X Semi-structured (Code and Text) | | |
| Must Use PID03 | 559 | Agency Qualifier Code | M | ID 2/2 |
| | | Code identifying the agency assigning the code values | | |
| | | AS Assigned by Seller | | |
| Must Use PID04 | 751 | Product Description Code | M | AN 1/12 |
| | | A code from an industry code list which provides specific data about a product characteristic | | |
| | | 01 Facilities shortage | | |
| | | 02 Assignment problems | | |
| | | 04 End user not ready | | |
| | | 05 Missed appointment | | |
| | | 06 No access | | |
| | | 07 Other | | |
| | | 08 Call to renegotiate the Due Date | | |
| PID07 | 822 | Source Subqualifier | O | AN 1/15 |
| | | A reference that indicates the table or text maintained by the Source Qualifier | | |
| | | AMT05 Jeopardy List for 850 Transactions | | |

|  | Segment: | DTM Date/Time/Period |
|---|---|---|
|  | Position: | 080 |
|  | Loop: | HL |
|  | Level: | Detail |
|  | Usage: | Optional |
|  | Max Use: | 10 |
|  | Purpose: | To specify pertinent dates and times |
|  | Syntax Notes: | 1 At least one of DTM02 or DTM03 is required. |

Data Element Summary

| Ref. Des. Attributes | Data Element | Name | | |
|---|---|---|---|---|
| Must Use DTM01 | 374 | Date/Time Qualifier | M | ID 3/3 |
| | | Code specifying type of date or time, or both date and time | | |
| | | 055 Confirmed | | |

|  |  |  | 067 | Current Schedule Delivery |  |  |
|---|---|---|---|---|---|---|
| Must Use | DTM02 | 373 | Date | | M | DT 6/6 |
|  |  |  | Date (YYMMDD) | | | |
|  | DTM03 | 337 | Time | | O | TM 4/6 |
|  |  |  | Time expressed in 24-hour clock time (HHMM) | | | |
|  |  |  | (Time range: 0000 through 2359) | | | |
|  |  |  | 0900/AM | | | |
|  |  |  | 1300/PM | | | |
|  |  |  | Absence indicates all day | | | |
|  | DTM05 | 624 | Century | | O | N0 2/2 |
|  |  |  | The first two characters in the designation of the year (CCYY) | | | |
|  |  |  | 19 | Century code | | |

Segment: CTT Transaction Totals
Position: 010
Loop:
Level: Summary
Usage: Mandatory
Max Use: 1
Purpose: To transmit a hash total for a specific element in the transaction set
Comments: 1  This segment is intended to provide hash totals to validate transaction completeness and correctness.

Data Element Summary

| | Ref. Des. Attributes | Data Element | Name | | | |
|---|---|---|---|---|---|---|
| Must Use | CTT01 | 354 | Number of Line Items | | M | N0 1/6 |
|  |  |  | Total number of line items in the transaction set | | | |

Segment: SE Transaction Set Trailer
Position: 020
Loop:
Level: Summary
Usage: Mandatory
Max Use: 1
Purpose: To indicate the end of the transaction set and provide the count of the transmitted segments (including the beginning (ST) and ending (SE) segments).
Comments: 1  SE is the last segment of each transaction set.

Data Element Summary

| | Ref. Des. Attributes | Data Element | Name | | | |
|---|---|---|---|---|---|---|
| Must Use | SE01 | 96 | Number of Included Segments | | M | N0 1/10 |
|  |  |  | Total number of segments included in a transaction set including ST and SE segments | | | |
| Must Use | SE02 | 329 | Transaction Set Control Number | | M | AN 4/9 |
|  |  |  | Identifying control number that must be unique within the transaction set functional group assigned by the originator for a transaction set | | | |
|  |  |  | Must match value in ST02 | | | |

997 Functional Acknowledgment

Functional Group ID=FA

Introduction:
This contains the format and establishes the data contents of the Functional Acknowledgment Transaction Set (997) for use within the context of an Electronic Data Interchange (EDI) environment. The transaction set can be used to define the control structures for a set of acknowledgments to indicate the results of the syntactical analysis of the electronically encoded documents. The encoded documents are the transaction

124 sets, which are grouped in functional groups, used in defining transactions for business data interchange. This standard does not cover the semantic meaning of the information encoded in the transaction sets.

|          | Pos. No. | Seg. ID | Name | Req. Des. | Max.Use | Loop Repeat | Notes and Comments |
|----------|----------|---------|------|-----------|---------|-------------|--------------------|
| Must Use | 010 | ST | Transaction Set Header | M | 1 | | n1 |
| Must Use | 020 | AK1 | Functional Group Response Header | M | 1 | | n2 |
|          |     |     | LOOP ID - AK2 | | | 999999 | |
|          | 030 | AK2 | Transaction Set Response Header | O | 1 | | n3 |
|          |     |     | LOOP ID - AK3 | | | 999999 | |
|          | 040 | AK3 | Data Segment Note | O | 1 | | c1 |
|          | 050 | AK4 | Data Element Note | O | 99 | | |
| Must Use | 060 | AK5 | Transaction Set Response Trailer | M | 1 | | |
| Must Use | 070 | AK9 | Functional Group Response Trailer | M | 1 | | |
| Must Use | 080 | SE | Transaction Set Trailer | M | 1 | | |

Transaction Set Notes

1. These acknowledgments shall not be acknowledged, thereby preventing an endless cycle of acknowledgments of acknowledgments.

2. The Functional Group Header Segment (GS) is used to start the envelope for the Functional Acknowledgment Transaction Sets. In preparing the functional group of acknowledgments, the application sender's code and the application receiver's code, taken from the functional group being acknowledged, are exchanged; therefore, one acknowledgment functional group responds to only those functional groups from one application receiver's code to one application sender's code.

3. There is only one Functional Acknowledgment Transaction Set per acknowledged functional group.

4. AK1 is used to respond to the functional group header and to start the acknowledgment for a functional group. There shall be one AK1 segment for the functional group that is being acknowledged.

5. AK2 is used to start the acknowledgment of a transaction set within the received functional group. The AK2 segments shall appear in the same order as the transaction sets in the functional group that has been received and is being acknowledged.

Transaction Set Comments

1. The data segments of this standard are used to report the results of the syntactical analysis of the functional groups of transaction sets; they report the extent to which the syntax complies with the standards for transaction sets and functional groups. They do not report on the semantic meaning of the transaction sets (for example, on the ability of the receiver to comply with the request of the sender).

|                 |                                                                                     |
|-----------------|-------------------------------------------------------------------------------------|
| Segment:        | ST Transaction Set Header                                                       |
| Position:       | 010                                                                                 |
| Loop:           |                                                                                     |
| Level:          |                                                                                     |
| Usage:          | Mandatory                                                                           |
| Max Use:        | 1                                                                                   |
| Purpose:        | To indicate the start of a transaction set and to assign a control number           |
| Syntax Notes:   |                                                                                     |
| Semantic Notes: | 1   The transaction set identifier (ST01) used by the translation routines of the interchange partners to select the appropriate transaction set definition (e.g., 810 selects the Invoice Transaction Set). |
| Comments:       |                                                                                     |

Data Element Summary

Ref.   Data

125

|  | Des. Attributes | Element | Name | | |
|---|---|---|---|---|---|
| Must Use | ST01 | 143 | Transaction Set Identifier Code<br>Code uniquely identifying a Transaction Set<br>997　　X12.20 Functional Acknowledgment | M | ID 3/3 |
| Must Use | ST02 | 329 | Transaction Set Control Number<br>Identifying control number that must be unique within the transaction set functional group assigned by the originator for a transaction set | M | AN 4/9 |

Segment: AK1 Functional Group Response Header
Position: 020
Loop:
Level:
Usage: Mandatory
Max Use: 1
Purpose: To start acknowledgment of a functional group
Syntax Notes:
Semantic Notes:　1　AK101 is the functional ID found in the GS segment (GS01) in the functional group being acknowledged.
　　2　AK102 is the data interchange control number found in the GS segment in the functional group being acknowledged.
Comments:

Data Element Summary

|  | Ref. Des. Attributes | Data Element | Name | | |
|---|---|---|---|---|---|
| Must Use | AK101 | 479 | Functional Identifier Code<br>Code identifying a group of application related transaction sets<br>PC<br>PO | M | ID 2/2 |
| Must Use | AK102 | 28 | Group Control Number<br>Assigned number originated and maintained by the sender | M | N0 1/9 |

Segment: AK2 Transaction Set Response Header
Position: 030
Loop: AK2
Level:
Usage: Optional
Max Use: 1
Purpose: To start acknowledgment of a single transaction set
Syntax Notes:
Semantic Notes:　1　AK201 is the transaction set ID found in the ST segment (ST01) in the transaction set being acknowledged.
　　2　AK202 is the transaction set control number found in the ST segment in the transaction set being acknowledged.
Comments:

Data Element Summary

|  | Ref. Des. Attributes | Data Element | Name | | |
|---|---|---|---|---|---|
| Must Use | AK201 | 143 | Transaction Set Identifier Code<br>Code uniquely identifying a Transaction Set<br>850　　X12.1 Purchase Order<br>860　　X12.15 Purchase Order Change Request - Buyer Initiated | M | ID 3/3 |

126

| | | | | | |
|---|---|---|---|---|---|
| Must Use | AK202 | 329 | Transaction Set Control Number | M | AN 4/9 |

Identifying control number that must be unique within the transaction set functional group assigned by the originator for a transaction set

Segment: AK3 Data Segment Note
Position: 040
Loop: AK3
Level:
Usage: Optional
Max Use: 1
Purpose: To report errors in a data segment and identify the location of the data segment
Syntax Notes:
Semantic Notes:
Comments:

Data Element Summary

| | Ref. Des. Attributes | Data Element | Name | | |
|---|---|---|---|---|---|
| Must Use | AK301 | 721 | Segment ID Code | M | ID 2/3 |
| | | | Code defining the segment ID of the data segment in error | | |
| Must Use | AK302 | 719 | Segment Position in Transaction Set | M | N0 1/6 |

The numerical count position of this data segment from the start of the transaction set: the transaction set header is count position 1

Segment: AK4 Data Element Note
Position: 050
Loop: AK3
Level:
Usage: Optional
Max Use: 99
Purpose: To report errors in a data element and identify the location of the data element Data Element Summary

| | Ref. Des. Attributes | Data Element | Name | | |
|---|---|---|---|---|---|
| Must Use | AK401 | 722 | Element Position in Segment | M | N0 1/2 |

This is used to indicate the relative position of the data element in error in this data segment. The count starts with 1 for the data element immediately following the segment ID. This value is 0 for an error in the segment ID.

| | AK402 | 725 | Data Element Reference Number | O | N0 1/4 |
|---|---|---|---|---|---|
| | | | Reference number used to locate the Data Element Dictionary. | | |
| Must Use | AK403 | 723 | Data Element Syntax Error Code | M | ID 1/3 |
| | | | Code indicating the error found after syntax edits of a data element | | |
| | AK404 | 724 | Copy of Bad Data Element | O | AN 1/99 |
| | | | This is a copy of the data element in error | | |

Segment: AK5 Transaction Set Response Trailer
Position: 060
Loop: AK2
Level:
Usage: Mandatory
Max Use: 1
Purpose: To acknowledge acceptance or rejection and report errors in a transaction set Data Element Summary Ref.    Data

127

| | Des. Attributes | Element | Name | | |
|---|---|---|---|---|---|
| Must Use | AK501 | 717 | Transaction Set Acknowledgment Code | M | ID 1/1 |

Code indicating accept or reject condition based on the syntax editing of the transaction set
- A     Accepted
- R     Rejected

| | AK502 | 718 | Transaction Set Syntax Error Code | O | ID 1/3 |

Code indicating error found based on the syntax editing of a transaction set
1. Transaction Set Not Supported
2. Transaction Set Trailer Missing
3. Transaction Set Control Number in Header and Trailer Do Not Match
4. Number of Included Segments Does Not Match Actual Count
5. One or More Segments in Error
6. Missing or Invalid Transaction Set Identifier
7. Missing or Invalid Transaction Set Control Number

| | AK503 | 718 | Transaction Set Syntax Error Code | O | ID 1/3 |

Code indicating error found based on the syntax editing of a transaction set
1. Transaction Set Not Supported
2. Transaction Set Trailer Missing
3. Transaction Set Control Number in Header and Trailer Do Not Match
4. Number of Included Segments Does Not Match Actual Count
5. One or More Segments in Error
6. Missing or Invalid Transaction Set Identifier
7. Missing or Invalid Transaction Set Control Number

| | AK504 | 718 | Transaction Set Syntax Error Code | O | ID 1/3 |

Code indicating error found based on the syntax editing of a transaction set
1. Transaction Set Not Supported
2. Transaction Set Trailer Missing
3. Transaction Set Control Number in Header and Trailer Do Not Match
4. Number of Included Segments Does Not Match Actual Count
5. One or More Segments in Error
6. Missing or Invalid Transaction Set Identifier
7. Missing or Invalid Transaction Set Control Number

| | AK505 | 718 | Transaction Set Syntax Error Code | O | ID 1/3 |

Code indicating error found based on the syntax editing of a transaction set
1. Transaction Set Not Supported
2. Transaction Set Trailer Missing
3. Transaction Set Control Number in Header and Trailer Do Not Match
4. Number of Included Segments Does Not Match Actual Count
5. One or More Segments in Error
6. Missing or Invalid Transaction Set Identifier
7. Missing or Invalid Transaction Set Control Number

| | AK506 | 718 | Transaction Set Syntax Error Code | O | ID 1/3 |

Code indicating error found based on the syntax editing of a transaction set
1. Transaction Set Not Supported
2. Transaction Set Trailer Missing
3. Transaction Set Control Number in Header and Trailer Do Not Match

128

| | |
|---|---|
| 4 | Number of Included Segments Does Not Match Actual Count |
| 5 | One or More Segments in Error |
| 6 | Missing or Invalid Transaction Set Identifier |
| 7 | Missing or Invalid Transaction Set Control Number |

Segment: AK9 Functional Group Response Trailer
Position: 070
Loop:
Level:
Usage: Mandatory
Max Use: 1
Purpose: To acknowledge acceptance or rejection of a functional group and report the number of included transaction sets from the original trailer, the accepted sets, and the received sets in this functional group
Syntax Notes:
Semantic Notes:
Comments: 1  If AK901 is 'A' or 'E', then the transmitted functional group is accepted. If AK901 is 'R', then the transmitted group is rejected.

Data Element Summary

| Ref. Des. Attributes | Data Element | Name | | |
|---|---|---|---|---|
| Must Use AK901 | 715 | Functional Group Acknowledge Code | M | ID 1/1 |
| | | Code indicating accept or reject condition based on the syntax editing of the functional group | | |
| | | A    Accepted | | |
| | | R    Rejected | | |
| Must Use AK902 | 97 | Number of Transaction Sets Included | M | N0 1/6 |
| | | Total number of transaction sets included in the functional group or interchange (transmission) group terminated by the trailer containing this data element | | |
| | | Value should equal the same data element in the Functional Group Trailer (GE01) of the functional group being acknowledged. | | |
| Must Use AK903 | 123 | Number of Received Transaction Sets | M | N0 1/6 |
| | | Number of Transaction Sets received | | |
| Must Use AK904 | 2 | Number of Accepted Transaction Sets | M | N0 1/6 |
| | | Number of accepted Transaction Sets in a Functional Group | | |
| AK905 | 716 | Functional Group Syntax Error Code | O | ID 1/3 |
| | | Code indicating error found based on the syntax editing of the functional group header and/or trailer | | |
| AK906 | 716 | Functional Group Syntax Error Code | O | ID 1/3 |
| | | Code indicating error found based on the syntax editing of the functional group header and/or trailer | | |
| AK907 | 716 | Functional Group Syntax Error Code | O | ID 1/3 |
| | | Code indicating error found based on the syntax editing of the functional group header and/or trailer | | |
| AK908 | 716 | Functional Group Syntax Error Code | O | ID 1/3 |
| | | Code indicating error found based on the syntax editing of the functional group header and/or trailer | | |
| AK909 | 716 | Functional Group Syntax Error Code | O | ID 1/3 |
| | | Code indicating error found based on the syntax editing of the functional group header and/or trailer | | |

Segment: SE Transaction Set Trailer
Position: 080
Loop:

129

|  | Level: | |
|---|---|---|
|  | Usage: | Mandatory |
|  | Max Use: | 1 |
|  | Purpose: | To indicate the end of the transaction set and provide the count of the transmitted segments (including the beginning (ST) and ending (SE) segments). |
|  | Comments: | 1  SE is the last segment of each transaction set. |

Data Element Summary

| | Ref. Des. Attributes | Data Element | Name | | |
|---|---|---|---|---|---|
| Must Use | SE01 | 96 | Number of Included Segments <br> Total number of segments included in a transaction set including ST and SE segments | M | N0 1/10 |
| Must Use | SE02 | 329 | Transaction Set Control Number <br> Identifying control number that must be unique within the transaction set functional group assigned by the originator for a transaction set | M | AN 4/9 |

What is claimed is:

1. A method for electronically exchanging information related to telecommunications services, the method comprising:

(a) obtaining the telecommunications service information to be exchanged, the data being in a plurality of predefined segments;

(b) associating a segment identification code with each of the plurality of predefined segments, at least one of the segments corresponding to one of the telecommunications services;

(c) concatenating the segment identification codes and associated telecommunications services information according to a predefined sequence; and (d) transmitting the concatenated segment identification codes and associated telecommunications services information from a telecommunications reseller to a telecommunications wholeseller.

2. The method of claim 1 wherein the predefined segment identification codes are determined by a standards organization.

3. The method of claim 1 wherein (b) comprises associating at least one unique segment identification code selected from the group consisting of: jeopardy notification, account loss notification, telephone number selection, due date selection, and customer service record retrieval.

4. The method of claim 1 wherein (d) comprises transmitting over a TCP/IP socket connection.

5. The method of claim 1 further comprising:

(e) parsing the telecommunications service information as a function of the predefined segments;

(f) identifying a corresponding telecommunications service; and (g) automatically generating an acknowledgement containing segment identification codes for the corresponding telecommunications service.

6. The method of claim 1 further comprising:

(e) retrieving customer service information;

(f) formatting the customer service information as a function of the segment identification codes; and (g) transmitting the formatted customer service information to the telecommunications services reseller.

7. The method of claim 1 further comprising:

(e) identifying a request related to telephone number selection from the telecommunications services information;

(f) searching for available telephone numbers; and (g) responding with a segment identification code and at least one available telephone number.

8. The method of claim 1 further comprising:

(e) identifying a request related to a due date selection from the telecommunications services information;

(f) searching for available due dates; and (g) responding with a segment identification code and at least one available due date.

9. The method of claim 1 further comprising:

(e) transmitting an error response from the wholeseller to the reseller in response to (d).

10. The method of claim 1 further comprising:

(e) providing a telecommunications service to an end-user responsive to the telecommunications service information.

11. The method of claim 1 further comprising:

(e) requiring further information from the reseller within a set time period after performing (d).

12. A method for electronically exchanging between a telecommunications wholeseller and a telecommunications reseller information related to telecommunications services, the method comprising:

(a) collecting the telecommunications service information in at least one electronic document;

(b) translating the telecommunications service information from the electronic document to a standard telecommunications transaction data set;

(c) associating a segment identification code with each of a plurality of segments the telecommunications service information;

(d) concatenating the segment identification codes and associated telecommunications services information in a single data stream; and (e) transmitting the concatenated segment identification codes and associated telecommunications services information from a telecommunications reseller to a telecommunications wholeseller.

* * * * *